(12) United States Patent
Surcouf et al.

(10) Patent No.: US 7,593,620 B2
(45) Date of Patent: Sep. 22, 2009

(54) FILE AND CONTENT MANAGEMENT

(75) Inventors: Andre Surcouf, Paris Cedex (FR);
Nicolas Gaude, Paris Cedex (FR);
Pascal Butel, Paris Cedex (FR); Cedric Trouilhet, Paris Cedex (FR)

(73) Assignee: THOMSON Licensing S.A., Boulogne-Billancourt (FR)

( * ) Notice: Subject to any disclaimer, the term of this patent is extended or adjusted under 35 U.S.C. 154(b) by 937 days.

(21) Appl. No.: 10/225,433

(22) Filed: Aug. 21, 2002

(65) Prior Publication Data

US 2003/0078930 A1 Apr. 24, 2003

(30) Foreign Application Priority Data

Aug. 21, 2001 (EP) ................... 01402202
Dec. 24, 2001 (EP) ................... 01310888

(51) Int. Cl.
*H04N 5/91* (2006.01)
*G06F 7/00* (2006.01)

(52) U.S. Cl. ............... 386/69; 386/94; 386/95; 707/1

(58) Field of Classification Search .............. 707/1, 707/100, 104.1; 386/69, 94, 95
See application file for complete search history.

(56) References Cited

U.S. PATENT DOCUMENTS

| | | | | |
|---|---|---|---|---|
| 5,796,830 | A * | 8/1998 | Johnson et al. | 380/286 |
| 6,411,771 | B1 * | 6/2002 | Aotake | 348/700 |
| 6,480,669 | B1 * | 11/2002 | Tsumagari et al. | 386/95 |
| 6,948,183 | B1 * | 9/2005 | Peterka | 725/25 |
| 7,050,700 | B2 * | 5/2006 | Ishikawa | 386/95 |

FOREIGN PATENT DOCUMENTS

| | | |
|---|---|---|
| WO | WO 99/06998 | 2/1999 |
| WO | WO 99/35787 | 7/1999 |
| WO | WO 00/36606 | 6/2000 |

* cited by examiner

*Primary Examiner*—Vincent Boccio
(74) *Attorney, Agent, or Firm*—Osha • Liang LLP

(57) ABSTRACT

Disclosed herein is a table mapping a data offset in a bitstream, apparatus for evaluating position in a bitstream, and a command for controlling the transfer of a bitstream.

32 Claims, 38 Drawing Sheets

Time offset

Time offset

FILE AND CONTENT MANAGEMENT

The present invention is related to the recordal, processing, storage and playback of bitstreams, particularly audio and/or visual (audio/visual) bitstreams. Three general aspects are described.

Firstly, the indexing of points in such recorded bitstreams is described, particularly in relation to the bookmaking of specific points, and to the use of regularly spaced index points in the performance of operations on such recorded bitstreams.

Secondly, the synchronisation of conditional access information with respect to such recorded bitstreams is described.

Thirdly, a command set for control of operation on such a recorded bitstream is described.

The present invention relates to a method of facilitating the searching of a file, a method of searching a file, a table, a file comprising a representation of a bitstream and a table, a storage means, a hard disk video recorder, a receiver/decoder, and a broadcast system.

The invention finds particular, but not exclusive application to the location and retrieval of data from recorded bitstreams, particularly variable bitrate bitstreams, and particularly programmes recorded under the control of a receiver/decoder.

The present invention also relates to apparatus for evaluating a position in a bit stream, apparatus for manipulating a bit stream, a method of evaluation a position in a bit stream, a method of manipulating a bit stream, a receiver/decoder, a broadcast system incorporating such apparatus, a computer program product, a computer readable medium, and a signal embodying the above computer program product.

The invention finds particular, but not exclusive, application in processing digital bit streams. This invention has more particular use in the recording phase of bit stream manipulation.

The invention also relates to a command for controlling the transfer of an audio/visual bit stream, a command set incorporating such a command, an operating system, a receiver/decoder, a computer program product, a computer readable medium, a signal tangibly embodying such a computer program product, apparatus for processing audio/visual data, an audio/visual processing device, a broadcast system, and a method of controlling the reproduction of an audio/visual bit stream.

The invention finds particular, but not exclusive, application in providing functionality in a receiver/decoder for digital television.

Digital television systems transmit television channels to the viewer in digital, rather than analogue, form. The digital channels are encoded into a digital data stream at the transmitter end, and are decoded at the receiver end using a digital receiver/decoder. To allow interactivity, an uplink may be provided, either via the same medium that delivers the television channels, or else via a different medium such as a telephone link. Further types of data, such as digital audio, software and interactive data can be or are also broadcast. As used herein, the term "digital television system" includes for example any satellite, terrestrial, cable and other system.

The term "receiver/decoder" as used herein may connote a receiver for receiving either encoded or non-encoded signals, for example television and/or radio signals, preferably in MPEG format, which may be broadcast or transmitted by some other means. The term may also connote a decoder for decoding received signals. Embodiments of such receiver/decoders may include a decoder integral with the receiver for decoding the received signals, for example, in a "set-top box", such as a decoder functioning in combination with a physically separate receiver, or such a decoder including additional functions, such as a web browser, a video recorder, or a television.

The term MPEG refers to the data transmission standards developed by the International Standards Organisation working group "Moving Pictures Expert Group" and in particular but not exclusively the MPEG-2 standard developed for digital television applications and set out in the documents ISO 13818-1, ISO 13818-2, ISO 13818-3 and ISO 13818-4. In the context of the present patent application, the term includes all variants, modifications or developments of MPEG formats applicable to the field of digital data transmission.

Generation, storage, transmission and processing of files containing representations of bitstreams, for instance variable bitrate bitstreams, is well known in the field of digital technology. However, it can be difficult and inefficient to locate desired portions of such files, corresponding for instance to particular time offsets in an associated bitstream, particularly without decoding or decompressing such files.

In known systems, searching a file, for instance for data corresponding to a particular time offset in the bitstream, is generally done iteratively, typically by assuming that the bitstream has a constant bitrate. The assumption that the bitstream has a constant bitrate is generally rather crude, and searching a file in this way is time consuming and inefficient, and indeed may make processes dependent upon the location of specified points in a file or associated bitstream impossible, or difficult and inefficient. Such processes may be, for instance, fast-forwarding, rewinding, skipping, bookmarking points in a file, controlling access to portions of a file, or analysing characteristics of a file or bitstream as a function of time or data offset.

DVDs can contain separate files which contain data offsets corresponding to points in the DVD file corresponding to the start of chapters. However, there is generally a limited number of chapters in a DVD file, and consequently a limited number of reference points, and such reference points are not directed to mapping time offsets. Such data offset files are of little use in searching for particular points in a file, other than the start of chapters.

The present invention seeks to remedy problems encountered with the above prior art.

Accordingly, there is provided a table comprising at least one record mapping a respective data offset in a file containing a representation of a bitstream to a corresponding time offset in the bitstream.

Thus, data in a file corresponding to a particular time offset in the bitstream may be accessed rapidly, and efficiently.

As used herein the term "bitstream" preferably connotes data comprising a series of bits arranged, for instance, temporally. The term bitstream is used interchangeably with the term datastream. A bitstream may comprise audio/visual data or be representative of such audio/visual data, or it may comprise, or be representative of, teletext information, subtitles, any other type of text information, numerical information, or computer data, including computer programmes.

Digital and satellite TV transmissions generally comprise at least one bitstream comprising audio/visual data or a representation of such data. However, data transmitted or stored in or between any digital device, for instance computer devices, processors, A/D convertors, televisions, HDVRs, or storage devices for instance hard disks, tapes, computer storage devices, CDs, or DVDs may comprise a bitstream or a representation of a bitstream.

A time offset may be the offset in time of a particular point in a bitstream from a defined point, for instance the start of the bitstream. A data offset in a file may be a position in memory in relation to a defined position, for instance the start of a file. If a bitstream is stored as file comprising a series of bits in a memory, then the data offset may be the number of bits from the start of the file, for instance.

As used herein the term "table" preferably connotes data comprising at least one data point. A table may map such at least one data point to at least one other data point of the same or different type, directly or indirectly. A table may be in the form of a database, spreadsheet, or a file stored for instance in an electronic data storage device, for instance a hard disk, floppy disk, CD, DVD, or optical storage device, or a non-electronic storage device, for instance, a print-out. The term "table" as used herein also connotes an algorithm or process for generating such data point or points.

In particular, audio/visual data may be in the form of a bitstream representative of a frame or series of frames. Such a bitstream may comprise a series of bits representative of pixels or points in such frames. A film or other sequence of moving images may comprise a series of frames, and each frame may be representative of a different image. Associated audio information, and indeed other information, such as conditional access or entitlement information, may also be included in such bitstreams.

Preferably, the bitstream is a variable bitrate bitstream.

Thus, data in a file corresponding to a particular time offset in the bitstream may be accessed rapidly and efficiently, even if there is not a linear relationship between data offset throughout the file and time offset throughout the bitstream.

As used herein, the term "variable bitrate bitstream" preferably connotes a bitstream comprising a series of bits representative of data which may vary with a parameter, for instance time or location, and for which the number of bits representative of one portion of the data at a particular value or range of values of the parameter may be different to the number of bits representative of another portion of data at another value or range of values of the parameter.

So, for instance, if a bitstream comprises a series of bits representative of an image frame, and the number of bits required to represent a portion of this image, for instance a foreground object, is greater than the number of bits required to represent another portion of the image, for instance a plain background, then the bitstream may be a variable bitrate bitstream and the data offset in the bitstream, or in a file containing a representation of such bitstream, may not vary linearly with a spatial offset in the image frame itself.

In a bitstream comprising, for instance, a series of bits arranged temporally, the bitrate may be the number of bits per unit time in the bitstream, and a variable bitrate bitstream, may then be a bitstream in which the number of bits per unit time may vary with time offset.

If a bitstream comprises a series of bits representative of a series of periodically spaced, time-varying image frames, for instance a film, and the number of bits necessary to represent one frame is less than the number of bits necessary to represent another frame then the bitstream may be a variable bitrate bitstream, and a data offset in a file containing a representation of the bitstream may not vary linearly with a time offset in the bitstream, or in the film itself.

Such variable bitrate bitstreams may comprise compressed or encoded digital data (or representations of such data), such as data transmitted to, stored at, or generated by HDVRs, or indeed any video or audio device, such as devices included in, or associated with a set top box, or computers, processors or mass storage devices, such as a hard disks, or DVDs. Such variable bitrate bitstreams may include data in a variety of compression formats, including MPEG-2, MPEG-4, MP3 protected by different ciphering algorithms including DVB-CS, DES, 3DES, and may contain video and or audio data, teletext information, subtitles, any other type of text information, superimpose data, computer data, or representations of such data.

In fact, bitstreams including data in many, if not all, industry-standard compression or encryption formats, including those mentioned above, may intrinsically have variable bitrates.

For instance, many compression formats use techniques which map changes to reference data from one time period to another, rather than producing independent data sets for each time period. In particular, MPEG data includes key frames, which can be used to regenerate a portion of data, particularly audiovisual data, for instance a frame in a film, independently of other portions of data in the bitstream, and delta frames which map changes from associated key frames. The bitrate associated with key frames in the bitstream would generally be higher than the bitrate associated with delta frames.

The term "key frame" as used herein preferably connotes a portion of data which can independently be used to regenerate a respective further portion of data, independently of any other portion of data. Typically the respective further portion of data is audiovisual data, and the key frame may typically be included in a bitstream.

A key frame may, for instance, independently be used to regenerate image data for display on a screen, for instance a particular scene in a film.

The term "key frame" may be contrasted with the term "delta frame", which as used herein preferably connotes a portion of data which can be used to regenerate a respective further portion of data, in dependence upon another portion of data. Typically the said another portion of data is a key frame, and the delta frame maps changes from this key frame.

For instance a film may comprise a series of images which are displayed consecutively on a screen. Data representing one image may be in the form of a key frame, and the image may be regenerated from the key frame independently of any other portion of data. Data representing subsequent images may be in the form of delta frames, and these images may be regenerated from the delta frames in dependence upon the key frame. Typically the delta frames would map changes in the images from the image represented by the key frame data. A bitstream may comprise a series of key frames interleaved in time with series of delta frames mapping changes from the preceding key frame.

Under MPEG-2 protocol, video data comprises a series of key frames, known as intraframes (I-frames) interleaved with interframes (P-frames) and bidirectional frames (B-frames), both of which can be classed as delta frames according to the use of this term above. An interframe (P-frame) maps changes from the preceding frame, whereas a B-frame maps changes from either or both preceding and following frames. The interleaving of the P-frames and B-frames with the I-frames is dependent upon the encoder, and need not be regular.

If the file is encoded, then preferably the at least one record maps a data offset in the encoded file to a corresponding time offset in the bitstream.

Thus, the searching of a file for data at particular time offsets, or corresponding data offsets, is enabled without the need to decode the file, thus preserving security measures and increasing efficiency of access to data.

Such encoded files may include files subject, for instance, to any combination of compression and encryption processes, such as MPEG-2 and DVB-CS or MP3 and 3DES for instance.

Preferably, the table comprises at least three records, and the time offsets are periodic.

Thus periodically spaced points in time in the bitstream may be accessed quickly and efficiently, enabling quick, smooth and efficient operation of time-dependent processes such as skipping, fast-forwarding and rewinding.

Periodic time offsets may be located in particular parts of the bitstream, for instance chapters, or throughout the whole bitstream, with at least one period.

Preferably, the period of the time offsets is varied. Thus the speed of processes such as searching, fast-forwarding, rewinding, or skipping may be varied.

A period may vary throughout the bitstream, or parts of the bitstream and may vary with time. Periodicities may be varied by a user, or may be varied automatically in response, for instance, to a user's behaviour or to the characteristics of a bitstream, or to the characteristics of data, for instance audio/visual data, represented by the bitstream. Generally, a period would remain the same throughout a particular file track, or programme.

For instance, if a particular bitstream comprises a representation of a film, then index points may be inserted in a table corresponding to portions of the bitstream with a high bitrate, which may, for example, be associated with action sequences in a film. Alternatively, the table may be updated and, for instance, points may be inserted corresponding to a particular portion of a bitstream automatically if a user performs a large number of operations corresponding to that portion of the bitstream, for instance fast forwarding, pausing or rewinding. Such time offsets may also be inserted at a user's request.

In addition, time offsets and data offsets may correspond to other preferred points in the file or associated bitstream, such as the start or end of chapters.

Preferably, the period of the time offsets is chosen to match a characteristic of the bitstream, and is preferably 0.5, 1, 2 or 10 seconds.

In the case of an MPEG-2 bitstream for instance, key frames may occur with a frequency of 2 Hz, and thus if time offsets of index points are chosen with a period of 0.5 seconds, the index points may correspond to the key frames. Similarly, if the frequency with which key frames occur in a bitstream varies, the period of the time offsets of the index points can vary so that index points and key frames coincide.

The period of the time offsets can also be chosen to match other characteristics of the bitstream.

Preferably, the bitstream comprises at least one portion of bitstream data which can independently be used to regenerate a respective at least one portion of audiovisual data, and the time offset of the at least one record corresponds to the respective at least one portion of bitstream data.

Such portion of data may be a key frame, for instance in an MPEG bitstream, and or may be representative, for example, of a background image, or overlay image. Such portion of data may be accessed directly and immediately, and representative output of audio/visual data may be obtained rapidly at different points throughout the bitstream.

Preferably, the at least one portion of bitstream data comprises a key frame.

Preferably, the bitstream comprises MPEG data, and the at least one portion of bitstream data comprises an intra-frame.

Preferably, the bitstream comprises at least one further portion of bitstream data which can be used to regenerate a portion of audiovisual data in conjunction with the at least one portion of bitstream data, and preferably the at least one further portion of bitstream data comprises a delta frame.

Thus smooth, rapid, and efficient operation of processes such as fast-forwarding, rewinding and skipping can be enabled. The potential maximum speed of these operations may also thus be increased, as the speed with which key frames can be located may be increased, and as there may be no need to process dependent portions of data, such as delta frames, or only a limited number of such dependent portions of data may need to be processed.

Preferably, the table is generated automatically during recordal of the representation of the bitstream in the file.

Thus, no further processing of the recorded bitstream is necessary after recordal of the bitstream is complete, and the HDVR index table is in place even if the recording is interrupted or terminated.

Preferably, at least one record in the table is mapped to a respective at least one further record, and preferably the said at least one further record comprises conditional access information or content management information.

Such content management information or conditional access information may be, for instance, a control word (CW), or CMMs, ECMs, EMMs, URMs, or associated information, which may be associated with data located at a particular value or range of values of data offset or time offset. Typically, the bitstream may be divided into time segments, or cryptoperiods (encompassing a range of time offsets), and the further record may be associated with a particular cryptoperiod or plurality of cryptoperiods. The further record may also be associated with, for instance, chapters, or with files as a whole, or with particular users or groups of users. Access to data may be enabled rapidly and efficiently by reading stored related information corresponding to particular data offsets or time offsets. Such rapid access to data may be particularly important in respect of processes such as fast-forwarding, rewinding, or skipping.

In particular, the further record may comprise a CMM or plurality of CMMs.

If the point in the table maps to a data offset in a file which does not correspond to the start of a cryptoperiod, then the HDVR would generally not have access to the CMM, or a pointer to such CMM, or other content management or conditional access information, necessary to decode the data at that point. The HDVR would typically have to read consecutively forward or backward through the file in order to find the next set of such information or pointer to such information in order to begin decoding data. By mapping at least one record in the table to at least one further record, conditional access or content management information applicable to the point in the file indexed by the record can be provided, and data from this point can be decoded immediately, without first having to read through the file to find such information. This feature is of particular advantage if data at a number of points in a file needs to be read consecutively and rapidly, for instance in performance of certain trick mode operations, such as fast forwarding or rewinding.

The further record may also comprise, for instance, comments, which could be displayed on a screen, or commands, such as television control commands. Alternatively, the data could be related to a parental control mechanism. Such parental control mechanism may be directed to particular chapters, but may also be directed to cryptoperiods and pluralities of cryptoperiods, and user defined portions of a file.

The further record may be stored in the table of records, or in a separate file or table, or the table of records and or the related information may be stored with the file, for instance in a header.

Preferably, the said at least one further record is stored in a further table.

The entries in such a further table may be mapped easily to entries in the table mapping data offsets to time offsets.

Preferably, the said at least one further record is inserted upon command of a user.

Thus, a user may add, or indeed remove, information relating to characteristics of a programme or a bitstream. For instance, a user may select particular scenes within a recorded film to which they wish to control access, and such access could be controlled by addition or amendment of a record activating a parental control mechanism.

Preferably, the said at least one record in the table is mapped to the respective at least one further record upon command of a user.

Thus, a user can control which records are associated with which further records.

Preferably, the file is encoded and the at least one record maps a data offset in the encoded file to a corresponding time offset in the bitstream.

Preferably, records are inserted in dependence upon characteristics of the bitstream.

Preferably, at least one record is inserted upon command of a user.

Thus, points in a file may be bookmarked by a user for ease of access.

The records may be inserted, or indeed deleted or modified, by a user 'on-the-fly', whilst, for instance, viewing a programme, or reading a file, or maybe inserted in the file at points corresponding to user-specified intervals throughout the bitstream.

Preferably, at least one record is inserted automatically.

Thus, the user may bookmark particular parts of the bitstream of interest without having to review the file or the bitstream, in whole or part, directly or indirectly. For instance, a user may bookmark parts of a film a representation of which is stored in a file containing a representation of a bitstream, without having to view the film.

Particular types of data, or a portion of the bitstream where, for instance, the ratio of data to time in the bitstream is within a certain range (which may correspond, for instance, to action sequences in a film, or to scenes in a film with highly contrasting images, such as explosions, or lightning strikes) may be located and bookmarked.

Preferably, the table is adapted for storage in a file with the representation of the bitstream.

Thus the file and associated table may be easily, for instance, stored, processed or transmitted together. For example, the table may be generated at a broadcast centre and transmitted with the file, and thus an HDVR, or other device, may be able to read the table and use the information contained within it, without requiring the capability to generate the table itself. Also, the broadcaster may retain centralised control over files and associated tables.

The table may also be generated and or stored at an HDVR, or within any device included in, or associated with a set top box, or within any device adapted to read digital data.

In a related aspect of the invention, there is provided a method of facilitating the searching of a file containing a representation of a bitstream, comprising generating a table comprising at least one record mapping a respective data offset in a file containing a representation of a bitstream to a corresponding time offset in the bitstream.

As before, the bitstream is preferably a variable bitrate bitstream.

Preferably, the table comprises at least three records, and the time offsets are periodic.

If the time offsets are periodic, then their period is preferably chosen to match a characteristic of the bitstream, and is preferably 0.5, 1, 2 or 10 seconds.

Preferably, the bitstream comprises at least one portion of bitstream data which can independently be used to regenerate a respective at least one portion of audiovisual data, and the time offset of the at least one record corresponds to a respective at least one of portion of bitstream data. The at least one portion of bitstream data could comprise a key frame, such as an intra-frame if the bitstream comprises MPEG data, for example.

As before, preferably the bitstream comprises at least one further portion of bitstream data which can be used to regenerate a portion of audiovisual data in conjunction with the at least one portion of bitstream data, and the at least one further portion of bitstream data may comprise a delta frame.

Preferably, the table is generated automatically during recordal of the representation of the bitstream in the file.

Again, at least one record in the table is mapped to a respective at least one further record, and preferably the said at least one further record comprises conditional access information or content management information.

Preferably, the said at least one further record is stored in a further table.

As before, the said at least one further record is inserted upon command of a user.

Preferably, the at least one record in the table is mapped to the respective at least one further record upon command of a user.

Preferably, the file is encoded and the at least one record maps a data offset in the encoded file to a corresponding time offset in the bitstream.

Preferably, at least one record is inserted in dependence upon characteristics of the bitstream.

Preferably, at least one record is inserted upon the command of a user.

Preferably, at least one record is inserted automatically.

Preferably the table is stored in a file containing the representation of the bitstream.

In a further aspect, there is provided a method of searching a file containing a representation of a bitstream for a desired portion of data, comprising the steps of jumping to a position in the file, and reading data from this position until the desired portion of data is found.

This can provide a more efficient way to find a particular point in a file than alternative methods which advance through the file bit-by-bit until they reach the desired point, for example.

Again, preferably the bitstream is a variable bitrate bitstream.

Thus, a particular point in a file can be found more efficiently than using methods which advance through the file bit-by-bit until they reach the desired point, for example, even if there is not a linear relationship between data offset in the file and time offset in the bitstream.

Preferably, the desired portion of data is representative of bitstream data which can independently be used to regenerate a further portion of data The further portion of data may, for instance be audiovisual data, and the desired portion of data may be a key frame.

Preferably, the step of jumping to a position in the file comprises reading a record from a table as herein described and jumping to the data offset given in the record.

Preferably, the step of jumping to a position in the file comprises reading a record from a table as herein described and jumping to the data offset given in the record, and the at least one further record is used in the step of reading data.

The at least one further record may be conditional access information, or content management information, and may in particular be a CMM or a plurality of CMMs. The further record may be used to decode the data in the file.

Preferably, the data offset in the record corresponds to the desired position in the file.

Thus the desired point can be found by jumping to the point in the file corresponding to the data offset in the file, without the need to read additional data before locating the desired point in the file.

In a further aspect, there is provided a method of searching a file containing a representation of a bitstream for a plurality of desired portions of data, comprising searching for each desired portion of data using a method as described herein.

Thus a series of desired points in the file can be located quickly and efficiently, and data at these points can be read.

Preferably, the desired portions of data are representative of portions of bitstream data which are periodically spaced in time.

Thus, portions of the bitstream which are equally spaced in time can be located and read quickly and efficiently, which may enable quick and efficient performance of trick mode operations, such as fast forwarding or rewinding, on the stored bitstream.

Preferably, the desired portions of data are used to effect a fast forwarding or rewinding operation.

The desired portions of data are located and read, typically using associated CMMs, and the resulting data, usually audiovisual data, may be output to a display device.

Preferably, the time period between the portions of bitstream data represented by the desired portions of data is chosen to effect a given fast-forwarding or rewinding speed.

Preferably, the time period between the portions of bitstream data represented by the desired portions of data is chosen in dependence-upon a characteristic of a means used to carry out the method.

The maximum rate at which data may be located, read and displayed by a means, such as an HDVR in conjunction with a display device, is dependent upon characteristics of such means, and may be dependent upon either hardware or software characteristics. A given fast forwarding or rewinding speed, for instance, may only be sustainable if a certain proportion of the data in the stored file is played back. For instance, it may not be possible to play back all data in the file at a faster than normal rate. On the other hand, if the proportion of data which is played back is limited too severely, image quality for instance may be degraded.

Preferably, the characteristic is the maximum sustainable rate of retrieval or processing of data from the file.

By varying the time period between the portions of bitstream data, the maximum sustainable rate of retrieval or processing of data from the file can be obtained, for given characteristics of the means. Thus, for instance, the optimum picture quality may be obtained for a given fast forwarding or rewinding speed.

Preferably, the characteristic is a read/write hard disk access time, or a parsing demultiplexer bandwidth, or an operating system scheduling accuracy.

Preferably, the given fast-forwarding or rewinding speed is varied upon command of a user.

In a further aspect, there is provided a file, comprising a representation of a bitstream, and a table as described herein.

In yet further aspects, there is provided a processor for generation of a table as described herein, and a processor for analysis of characteristics of a bitstream and insertion of records in such a table in dependence upon this analysis.

There is also provided a storage means for storage of a table as described herein, and preferably the storage means is adapted for storage of the file containing a representation of a bitstream.

There is also provided a hard disk video recorder comprising a storage means as described herein and preferably further comprising a processor as described herein, and a receiver/decoder comprising such a hard disk video recorder. Preferably there is also provided a broadcast system incorporating such a receiver/decoder.

In a further aspect, there is provided a receiver/decoder adapted to communicate with a hard disk video recorder as described herein, and a broadcast system incorporating such a receiver/decoder.

The invention further provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

Turning to consideration of further aspects of known systems, some known systems are able record to hard disk received scrambled bit streams (that is, the encoded digital television signals). In one such system, the bit stream is retained in the compressed and scrambled form when recorded it, but the recording is then only valid for the duration of the exploitation key (which is replaced on a regular basis). One technique which overcomes this problem essentially consists of extracting Entitlement Control Messages (ECMs) from the bit stream before it is recorded, decrypting the ECMs as per usual, re-encrypting the ECMs with an internal exploitation key (unique to each subscriber), and inserting the ECMs back into the bit stream in their original positions (all the time not altering the control words used to scramble the bit stream). This has the desired effect of increasing security, but is complicated to implement, not least because it demands that the position of each ECM within the bit stream be determined precisely, which is very computationally-intensive.

The present invention also seeks to remedy problems in the above and other prior art.

Accordingly, in a further aspect of the invention, there is provided apparatus for evaluating a position in a bit stream, comprising means for estimating the position.

By estimating the position, instead of determining it exactly, for example, the process of evaluating the position can be made more efficient.

The position is preferably the spatial position of a data packet, such as an MPEG table, within the bit stream. It may alternatively be the temporal position within the bit stream, measured in seconds, for example. Preferably the apparatus is adapted to operate in respect of a bit stream being processed in real-time, but it may also be adapted to operate in respect of a static and/or random access bit stream. Furthermore, the bit stream preferably contains packetised (such as MPEG format) and/or audio/visual data.

The term "audio/visual" as used herein preferably connotes either audio or visual matter, or a combination of the two. In the context of a broadcast signal received by a receiver/decoder, the term may encompass subtitle, teletext, synchronisation and other data transmitted in close relation to audio and video components making up a television programme.

The means for estimating the position is preferably adapted to estimate the position in dependence on a known position in the bit stream. The known position could be, for example, a transition between different portions of the bit stream. The dependence of the estimation on a known position in the bit stream can allow the estimate to be made more precisely.

In a preferred embodiment, the apparatus further comprises means for selecting the known position from a plurality of alternatives. This can allow the estimate to be further refined, by increasing the selectivity of the process.

Consequently, the means for selecting the known position is preferably adapted to select the known position in dependence on its proximity to the position to be evaluated.

Thus, while the position to be estimated may not itself be easily or at all determinable exactly, it may be possible to determine known positions which are near to the position to be estimated, preferably in preference to other known positions which are not as close to the position to be evaluated. This can allow the accuracy with which the position is estimated to be more appropriately limited in accordance with at least one known position in the bit stream.

The means for selecting the known position may be adapted to select systematically one of the two known positions closest to the position to be evaluated. This can further improve the accuracy of the estimation. In particular, the known position may be chosen to be the closest position either before or after the estimated position. In either case, this can bias the estimate of the position either generally backwards or generally forwards in the bit stream, respectively. Alternatively, the known position may be chosen to be the closest position in either direction, which can result in no general bias of the estimate.

Furthermore, the means for selecting the known position may be adapted to select the known position as a transition in the bit stream between a first and second portion of the bit stream. Such first and second portions could be, for example, segments of the bit stream transferred in direct memory access (DMA) data transfers.

This can make the estimation more efficient by making use of existing divisions of the bit stream when determining the known position. One of the portions of the bit stream may contain the position to be estimated.

Preferably the means for estimating the position may be adapted to estimate the position as an offset from the known position, thereby allowing time-displacement effects to be taken into account in the estimate. The offset may be zero, in which case the estimated position is equal to the known position or it may be positive or negative.

Furthermore, the means for estimating the position may be adapted to estimate the position in dependence on a buffer size. Preferably the position is estimated by, amongst other things, adding the buffer size to the known position. The buffer size (preferably defined as a maximum size, or alternatively expected or exact size) may relate to a buffer used to transport the bit stream, such as a FIFO, for example. By estimating the position in dependence on the buffer size, in effect consideration can be taken of the uncertainty and/or delay arising from the use of such a buffer.

Alternatively or additionally, the means for estimating the position may be adapted to estimate the position in dependence on a security parameter. In particular, the position may be estimated by, amongst other things, adding the security parameter to the known position. The security parameter may be negative or positive, and is preferably employed as a 'safety factor' to ensure that the estimate either exceeds or remains within a critical value, and can alternatively or additionally encapsulate into a single correction factor a plurality of uncertainties or biases influencing the estimate (such as possible timing errors, software latencies, unknown packet sizes, and so on).

In the preferred embodiment, the apparatus may further comprise means for storing the bit stream. This means for storing preferably comprises a controller for causing the bit stream to be stored, but may alternatively or additionally comprise a corresponding storage device, such as a hard disk. This can improve the versatility of the apparatus.

In this case, the apparatus may further comprise means for storing data associated with the bit stream separately from the bit stream. The data associated with the bit stream preferably comprises at least one of the estimated position, data corresponding to the estimated position, and information which can allow the data corresponding to the estimated position to be synchronised with the stored bit stream. The means for storing data associated with the bit stream separately from the bit stream is preferably adapted to store conditional access data.

This important feature is also provided in respect of a related aspect of the invention, which provides apparatus for manipulating a bit stream, comprising means for receiving conditional access data, means for synchronising the conditional access data with the bit stream, and means for storing the bit stream.

By synchronising conditional access data with the bit stream, reliance can be reduced on any conditional access data within the bit stream itself.

As mentioned above, the apparatus preferably further comprises means for storing the conditional access data separately to the bit stream. However, the apparatus may instead comprise means for storing the conditional access data in the bit stream, by multiplexing or otherwise reinserting the data into the bit stream, for example. In the former case, the conditional access data may be included in a separate part of a file also containing the stored bit stream, or it may be stored in a separate file or in a different storage medium.

This can improve the efficiency with which the conditional access data is managed, for example by allowing faster access to the generally smaller volume (with respect to the corresponding bitstream) of conditional access data.

The means for synchronising is preferably adapted to create a reference between the conditional access data and a corresponding position in the bit stream. The apparatus more preferably further comprises means for storing the or each reference with or in close proximity to the conditional access data and/or bit stream. This can facilitate the task of synchronising the conditional access data with the bit stream.

The apparatus may in addition comprise means for storing the reference in a table, which can further facilitate access to the conditional access data, for example, during reproduction of the bit stream.

The means for synchronising is adapted to select the referenced position (that is, the 'corresponding position' in the reference between the conditional access data and a corresponding position) from a range of safe values.

The range of safe values preferably comprises an actual position in the bit stream corresponding to the conditional access data, this being the position in the bit stream at which the conditional access data (or a copy thereof) is actually transmitted.

If the means for synchronising is adapted to select the referenced position such that it falls within a portion of the bit stream to which the conditional access data corresponds, the means for synchronising is preferably further adapted to select the referenced position such that it falls within a cryptoperiod to which the conditional access data corresponds.

This matching of the referenced position with the cryptoperiod-to which the conditional access data corresponds can improve the quality of the synchronisation between the bit stream and conditional access data.

Preferably the means for synchronising is adapted to select the referenced position in dependence on an event signifying the receipt of the conditional access data by the receiving means. This can allow the bit stream and conditional access data to be yet more closely synchronised.

As previously mentioned, the apparatus may further comprise means for estimating a position in the bit stream, but also with the referenced position being selected in dependence on the estimated position.

If as is preferred, the apparatus preferably further comprises means for transferring the bit stream in a plurality of discrete segments, the means for estimating the position is preferably adapted to estimate the position in dependence on an end of one of the segments, and furthermore the apparatus preferably further comprises means for predetermining the size of at least one segment. This can improve the flexibility of the estimation process, as the variation of the size of the at least one segment can directly or indirectly affect the estimate itself and the stability of the estimation process.

The predetermination preferably involves setting the size of the segment, although it may alternatively involve detecting the size of the segment. Possibly depending on factors such as system performance, FIFO and hard disk size, each segment could be as small as 1 bit and as large as 100 Mb or even greater, for example. For efficiency, values between approximately 1 Mb and, say, 6 Mb may be appropriate for a typical MPEG audio/visual bit stream, however. The means for transferring may, for example, be a direct memory access (DMA) controller, a mass storage device, a FIFO and/or FIFO manager, and so on.

In a related aspect of the invention, there is provided apparatus for manipulating a bit stream, comprising means for transferring the bit stream in a plurality of discrete segments, and means for estimating a position in the bit stream in dependence on a property of one of the segments.

Such a property could be segment size, for example.

As mentioned previously, preferably the means for estimating a position is adapted to estimate the position of conditional access data, such as an ECM, in the bit stream. Also as mentioned previously, the apparatus preferably further comprises means for predetermining the size of a segment, which as noted can increase the flexibility of the estimation.

The means for predetermining the size is ideally adapted to predetermine a size equivalent to less than a portion of the bit stream associated with the position. Such a portion may be a predetermined number of cryptoperiods, in which case the number of cryptoperiods need not be an integer, and indeed may be, for example, slightly less than a whole number to take into account the effect of FIFO buffers. This can ensure the safety of the estimation.

The means for predetermining the size may also or alternatively be adapted to predetermine the size in dependence on a characteristic of the bit stream. By determining the size of a segment in dependence on a characteristic of the bit stream, account can be taken of factors related to the bit stream which may affect the accuracy of the estimate, for example.

Furthermore, the means for predetermining the size may be adapted to predetermine the size in dependence on a bit rate of the bit stream. Preferably this bit rate is an average bit rate, which may be computed in respect of the segment in question, or any other portion of the bit stream which preferably contains the position.

If the means for predetermining the size is adapted to predetermine a constant size, the means for predetermining the size may moreover comprise a static filter. If, on the other hand, the means for predetermining the size is adapted to predetermine a variable size, the means for predetermining the size preferably comprises a dynamic filter.

Both types of filter preferably accept as an input at least one characteristic of the bit stream, and produce as an output a desired segment size. Indeed, preferably a number of filter coefficients are used, corresponding to a series of characteristics of the bit stream. Such characteristics could be as described above. The filter can be implemented in software, under the control of a digital signal processor (DSP), coprocessor, or main processor, for example. The term 'filter' as used herein preferably connotes a process or apparatus for transforming at least one input into at least one output; such filters could be seen as the product of a mathematical formula whose variables are the filter inputs.

Furthermore, the means for predetermining the size may comprise at least one of a rapid dynamic filter, an inertial dynamic filter, and a hybrid dynamic filter. The rapid and inertial filters may be characterised in having relatively few and relatively many input values, respectively. The hybrid filter may be characterised in having properties of both the rapid and inertial filters, and is preferably effectively a combination of a rapid and an inertial filter, with the overall filter output selected as the output of a particular one of these two sub-filters in dependence on a particular constraint, such as whether or not a particular input is increasing or decreasing.

The means for estimating the position may be adapted to take into account an error in at least one previous estimate. Such an error could be, for example, a time difference observed a posteriori between an estimated position and an actual position. This can allow the estimate to be refined over time.

The apparatus may further comprise means for estimating the position in dependence on at least one characteristic of the bit stream. This can produce a yet more accurate estimate particularly where, for example, more information is available regarding the bit stream.

This important feature is also provided independently. Accordingly, in a related aspect of the invention, there is provided apparatus for evaluating a position in a bit stream, comprising means for estimating the position in dependence on at least one characteristic of the bit stream.

The or each characteristic is preferably at least one of a bit rate of the bit stream, the relative position within the bit stream, and the time elapsed-between parts of the bit stream.

The apparatus may further comprise means for estimating a measure of separation between the occurrence of the position and the occurrence of an event relating to the position. Such a measure of separation could be the time At discussed below, for example. This can provide more information with which to make a better estimate.

The means for estimating the position in the bit stream is preferably adapted to incorporate the measure of separation, preferably in conjunction with an estimate of the bit rate of the bit stream close to the position in the bit stream. This can further refine the estimation process.

The means for estimating a measure of separation is preferably adapted to measure the separation between the occurrence of the position and the end of a processing operation. The processing operation is preferably related to the processing of data associated with the position in the bit stream.

In a further related aspect of the invention, there is provided a receiver/decoder incorporating apparatus (in any of the various aspects) as aforesaid.

There is also provided, in a yet further aspect, a method of evaluating a position in a bit stream, comprising estimating the position.

In another aspect of the invention, there is provided a method of manipulating a bit stream, comprising receiving conditional access data, synchronising the conditional access data with the bit stream, and storing the bit stream.

In a further aspect of the invention, there is provided a method of manipulating a bit stream, comprising transferring the bit stream in a plurality of discrete segments, and estimating a position in the bit stream in dependence on a property of one of the segments.

In a yet further aspect of the invention, there is provided a method, of evaluating a position in a bit stream, comprising estimating the position in dependence on at least one characteristic of the bit stream.

In another aspect of the invention, there is provided a broadcast system comprising a broadcast centre and a receiver/decoder as aforesaid.

In a further aspect of the invention, there is provided a computer program product adapted to carry out a method as aforesaid.

In a yet further aspect of the invention, there is provided a computer readable medium having stored thereon a computer program product as aforesaid.

In another aspect of the invention, there is provided a signal tangibly embodying a computer program product as aforesaid.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention also provides a signal embodying a computer program for carrying out any of the methods described herein and/or for embodying any of the apparatus features described herein, a method of transmitting such a signal, and a computer product having an operating system which supports a computer program for carrying out any of the methods described herein and/or for embodying any of the apparatus features described herein.

Turning to consideration of further prior art, video cassette recorders and also audio cassette recorders have become ubiquitous, having application in both domestic and professional environments. However, their principal shortcoming is that data signals are recorded on a tape, and can therefore only be accessed serially. The tape must be fast-wound if a section of it is to be skipped, or to access a particular part of a recording. This is a relatively slow procedure. Moreover, many tape recorders, particularly of the low-cost type most commonly found in domestic applications, are incapable of reproducing a recording at a speed other than that at which it was recorded (for a slow-motion or accelerated motion effect) or a single frozen frame of a recording without significant distortion of the display.

High-capacity mass data storage devices, and in particular, hard disc drives, now have a storage capacity large enough to enable them to store a significant amount of digitally-encoded video and/or audio signals, particularly when such signals are encoded using an efficient compression algorithm such as MPEG. Any given piece of data stored on the device can be accessed, at least from the point of view of a human operator, essentially instantaneously. The availability of such devices has led to development of apparatus for recording and reproducing video and/or audio signals in which the signals are stored on such a mass-storage device.

Implementation of video and/or audio playback apparatus using such mass storage has the potential to offer a user far greater operational flexibility than a conventional tape-based video and/or audio recorder, and gives developers the opportunity to provide video and/or audio playback products that have a range of capabilities beyond those of a conventional tape recorder. It is a further aim of this invention to provide means by which a developer can make use these features offered by such playback apparatus.

Accordingly, in a further aspect of the invention, there is provided a command for controlling the transfer of an audio/visual bit stream, wherein the transfer speed is represented as a parameter.

The transfer is preferably the reproduction of audio/visual data, from a mass storage device to an audiovisual playback device (such as an MPEG decoder and/or video output device), for example. Alternatively (and not exclusively), the transfer may be the recording of audio/visual data, from a live broadcast (or other) signal source to a mass storage device, for example.

By being able to set the transfer speed via a parameter of the command, a number of different effects can be achieved with a call to the same command. Such a command could, for example, be used to control the operations of a virtual (or real) video recorder or other random access or sequential access storage device. The set_speed( ) command described later is an example of such a command, applied principally to the reproduction of audio/visual data.

The term "audio/visual" as used herein preferably connotes either audio or visual matter, or a combination of the two. In the context of a broadcast signal received by a receiver/decoder, the term may encompass subtitle, teletext, synchronisation and other data transmitted in close relation to audio and video components making up a television programme.

The term "command" as used herein preferably connotes a physical manifestation of a software routine programmed to carry out a specified function, preferably in the form of electrical impulses in a memory or in a more permanent form, such as a recording of the routine on a suitable data carrier, for example. Preferably the manifestation of the routine is immediately executable by a processor, being stored as object code, for example. The term may also be extended to cover the actual invocation of such a routine, either in the form of a physically-embodied instruction to execute the routine, or as an actual signal—such as a remote procedure call (RPC)—designed to cause the routine to execute.

The speed may be positive, zero and/or negative. In the case where the transfer is a reproduction, if the speed is positive, the reproduction would preferably be one of normal playback, slow playback, fast forwarding, and stop/pause. Alternatively, if the speed is negative, the reproduction would preferably be one of fast rewind and slow rewind. Thus, by allowing such a range of speeds, the flexibility offered by the command can be increased.

If the range of speeds is limited by hardware or other considerations, the maximum speed is preferably the equivalent of 2, 5, 10, 50, 100 or 500 times a normal transfer speed. Correspondingly, the minimum speed may be the equivalent of 1, 0, −1, −2, −5, −10, −50, −100 or −500 times the normal transfer speed (a minimum of 0 or more preventing the possibility of 'rewinding' the stream, in the reproduction case, and a minimum of 0 or less opening the possibility of storing an audio/visual bit stream in reverse, in the recording case). The range of speeds may be a continuous range, allowing smooth transitions between different transfer speeds, for example, or a discrete set of speeds, for example, possibly taking into account hardware limitations. The parameter of the command may, in fact, be an arbitrary speed which is converted into one of the discrete set of speeds, as appropriate, during the execution of the command or subsequently.

The speed is preferably related to the parameter by a multiple of a normal transfer speed (such as the normal playback speed in the reproduction case). This can greatly simplify procedures invoking the command, since they might not need to calculate corresponding bit rates for reproduction of the bit stream, for example. In the recording case, the parameter may, for example, specify the desired frame rate (such that if it was lower than the normal frame rate, the command would cause frames to be discarded from the stored bit stream at an appropriate rate).

If the speed was equal to the parameter multiplied by a normal transfer speed, for example, a parameter of 1 would be equivalent to a normal transfer speed, a parameter of 0 would result in the transfer being paused, and a parameter greater than 1 would correspond to fast forwarding (in the reproduction case) or recording at a lower quality/speed (in the recording case), for example. Alternatively, there may be a more complex relationship between speed and parameter, whereby a constant value is subtracted from either the speed or parameter, for example.

Preferably a position from which the transfer is to take place is represented as a parameter. This can allow further flexibility in the transfer of an audio/visual bit stream. In the case where the transfer is the reproduction of audio/visual data, the position from which the transfer is to take place is preferably an offset into the audio/visual data, and may be set to the nearest bit, byte, given other data multiple, given period of time, or frame of data, or may otherwise or additionally be specified in terms of programme or track numbers. Otherwise, in the recording case, for example, the position can be relative to a position on a mass storage device, setting the position at which recording is to start or continue.

This important feature is also provided independently. Accordingly in a further aspect of the invention there is provided a command for controlling the transfer of an audio/visual bit stream, wherein the position from which the transfer is to take place is represented as a parameter. The set_pos ( ) routine described later is an example of such a function.

The parameter specifying the position from which reproduction is to take place may be related to a measure of time, which can free the invoking routine from calculations relating the time to the data offset in the bit stream.

If, instead, the parameter specifying the position from which reproduction is to take place is related to an offset in the bit stream (or location on a mass storage device, for example), the command can be more simply implemented, resulting in a saving of memory and increasing the speed of execution.

In another aspect of the invention, the is provided a command set, comprising at least one command as aforesaid. This can allow a wide range of more specialised commands to be implemented easily, by using any of the above-mentioned commands as building blocks.

This important feature is also provided independently, and accordingly there is also provided a command set for controlling the transfer of an audio/visual bit stream, comprising a command having the position from which reproduction is to take place represented as a parameter, and a command having the transfer speed represented as a parameter.

In a further related aspect of the invention, there is provided a command for controlling the transfer of an audio/visual bit stream, the command adapted to invoke at least one command as aforesaid.

The command may be adapted to selectively invoke different further commands in dependence on a state relating to the transfer of the audio/visual bit stream. Such a state could be, for example, whether the transfer was paused or not (in other words, whether or not the transfer speed was zero); in this case, the command could, for example, call one further command when the transfer is paused, and a different further command when the transfer is in progress.

This can allow the further commands to be simplified, since they could be written without having to take into consideration certain values of the abovementioned state.

Alternatively or additionally, the command may be adapted to invoke a command (preferably for setting the transfer speed) as aforesaid, with a parameter equivalent to a normal transfer speed, and invoke a command (preferably for setting the position of reproduction) as aforesaid, with a parameter equivalent to a position in the audio/visual bit stream. Preferably such a command is adapted to start playback in the audio/visual bit stream, and may itself correspond to or be invoked by a 'play' or a 'seek and play' command. Also, such a command preferably has at least one parameter in the same format as at least one parameter of one or both of the invoked commands.

The command may be adapted to invoke a command (preferably for setting the transfer speed) as aforesaid, with a parameter equivalent to zero speed. This command is preferably adapted to stop or pause playback of an audio/visual bit stream, and may itself correspond to or be invoked by a 'pause' or a 'stop' command. The invoked command may also cause the display of the audio/visual bit stream to be ceased.

The command may alternatively be adapted to invoke a command (preferably for setting the transfer speed) as aforesaid, with a parameter equivalent to a greater than normal playback speed. Preferably the command is adapted to fast-forward an audio/visual bit stream, and may itself correspond to or be invoked by a 'fast-forward' command. Furthermore, the command may be adapted to further invoke the command with a different parameter, for example to cause the bit stream to be reproduced faster the longer a 'fast-forward' button is depressed.

The command may be adapted to invoke a command (preferably for setting the transfer speed) as aforesaid, with a parameter equivalent to a less than normal transfer speed. This command may be adapted to play in slow motion an audio/visual bit stream, and may itself correspond to or be invoked by a 'slow motion' command.

The command may instead or additionally be-adapted to invoke a command (preferably for setting the transfer speed) as aforesaid, with a parameter equivalent to a negative playback speed. Preferably this command is adapted to play in reverse an audio/visual bit stream, and may itself correspond to or be invoked by a 'rewind' command.

Furthermore, the command may be adapted to invoke a command (preferably for setting the transfer speed) as aforesaid, with a parameter equivalent to a normal playback speed. Preferably this command is adapted to resume playback of an audio/visual bit stream, and may itself correspond to or be invoked by a 'play', 'pause' or 'un-pause' command.

The command may be adapted to invoke a command (preferably for setting the position of reproduction) as aforesaid, with a parameter equivalent to the location. Preferably this command is adapted to jump to a location in the audio/visual bit stream, and may itself correspond to or be invoked by a 'next chapter up', 'previous chapter', 'play', 'next index', or 'previous index' command.

The command may be adapted to cause the or a further audio/visual bit stream to be stored. Thus flexibility can be achieved by combining commands to reproduce a bit stream with the ability to store (preferably to record) the or a further bit stream.

In a related aspect of the invention, there is provided a command for controlling the transfer of an audio/visual bit stream, the command adapted to invoke at least one command as aforesaid (including, particularly, the commands which invoke further commands).

Despite providing up to three levels of abstraction or more, this has been found pursuant to the present invention to provide the advantage of further computational simplicity.

In particular, if the command corresponds to a user-selectable audio/visual control operation, each layer of commands can itself be relatively simple, and have a relatively simple interface with the layers above and below, and yet cause sophisticated low-level actions to occur in response to a single high-level user (or other) request.

In a further aspect of the invention, there is provided a method of controlling the transfer of an audio/visual bitstream, comprising comparing a command as described herein to a control criterion, and generating a further command in dependence upon whether the command matches the control criterion.

Thus, invalid or undesired commands or sequences of commands may be amended, or default commands may be substituted in their place.

Preferably, the further command is compared to the control criterion, and the further command is then amended in dependence upon whether it matches the control criterion.

The comparison between the further command and the control criterion, and amendment of the further command may be repeated, either up to a maximum number of repetitions or indefinitely, until a further command is generated which matches the control criteria.

Preferably, the control criterion is dependent upon a characteristic of the transfer of the audio/visual bitstream, preferably of the transfer occurring at the time of receipt of the command.

Thus, greater control over the transfer of an audio/visual bitstream may be obtained upon receipt of sequences of commands, or upon receipt of commands which specify operations which are relative to a current characteristics of the transfer of the audio/visual bitstream.

For instance certain sequences of commands, or operations on a bitstream, which are not allowed or which are undesirable may be detected and replaced.

For instance it may not be allowed to jump to a point in the bitstream and then fast forward, and a command to fast forward may be replaced by a command to play if it is received immediately after a command to jump to a point in the bitstream Other commands may be relative to a current characteristic of the transfer of the audio/visual bitstream. For instance, a command may specify jumping forward to a position relative to the current position. The acceptability of this command may be dependent both upon the command itself and the current position.

Preferably, the characteristic of the transfer of the audio/visual bitstream is a transfer speed and or a position in the bitstream.

Preferably, the control criterion is dependent upon conditional access and or parental control data.

In a further related aspect of the invention, there is provided an operating system, comprising at least one command as aforesaid.

In another aspect of the invention, there is provided a receiver/decoder, comprising at least one command as aforesaid.

In a yet further aspect of the invention, there is provided a receiver/decoder, adapted to invoke at least one command as aforesaid.

In another aspect of the invention, there is provided a computer program product, comprising at least one command as aforesaid.

In a further aspect of the invention, there is provided a computer readable medium, comprising a computer program product as aforesaid.

In another aspect of the invention, there is provided a signal, tangibly embodying a computer program product as aforesaid.

In a further aspect of the invention, there is provided apparatus for processing audio/visual data, comprising means (such as an input) for receiving audio/visual data, means (such as an output) for outputting audio/visual data, and means (such as a processor and associated memory) for executing at least one command as aforesaid.

In a related aspect of the invention, there is provided apparatus for processing audio/visual data, comprising an input, an output, and a processor and associated memory, the processor being adapted to execute at least one command as aforesaid.

In another aspect of the invention, there is provided an audio/visual processing device, comprising apparatus as aforesaid.

In another aspect of the invention there is provided a broadcast system, comprising a receiver/decoder as aforesaid.

In a further aspect of the invention there is provided a method of controlling the transfer of an audio/visual bit stream, comprising invoking a command to set the transfer speed, and passing the transfer speed as a parameter to the command.

In another aspect of the invention there is provided a method of controlling the transfer of an audio/visual bit stream, comprising invoking a command to set a position from which reproduction is to take place, and passing the position as a parameter.

The invention extends to methods and/or apparatus substantially as herein described with reference to the accompanying drawings.

Any feature in one aspect of the invention may be applied to other aspects of the invention, in any appropriate combination. In particular, method aspects may be applied to apparatus aspects, and vice versa.

Furthermore, features implemented in hardware may generally be implemented in software, and vice versa. Any reference to software and hardware features herein should be construed accordingly.

Preferred features of the present invention will now be described, purely by way of example, with reference to the accompanying drawings, in which.

Figure 32A:
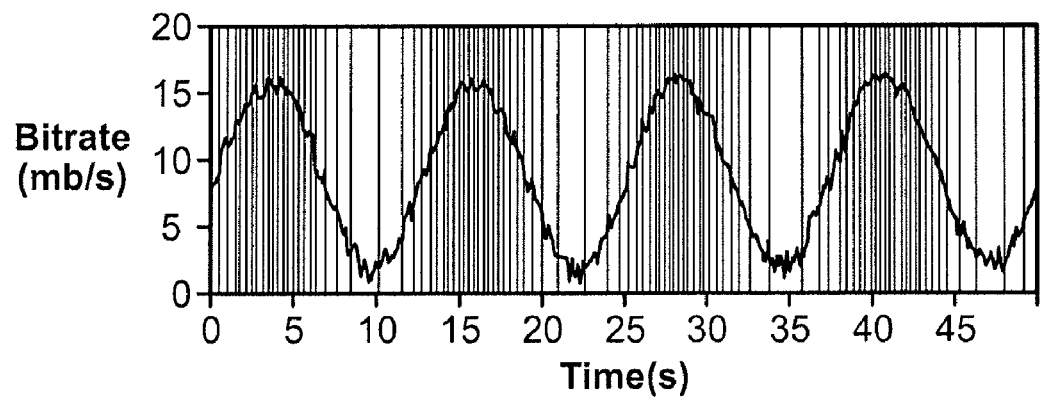
Figure 33A:
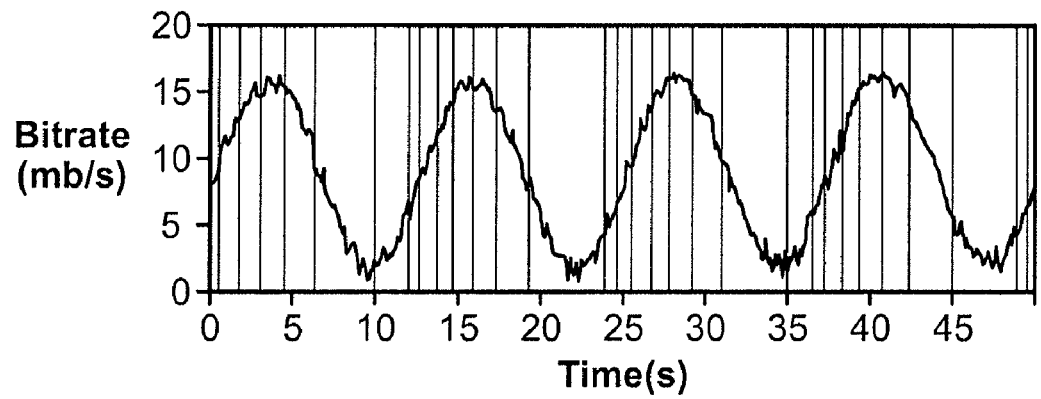
Figure 34A:
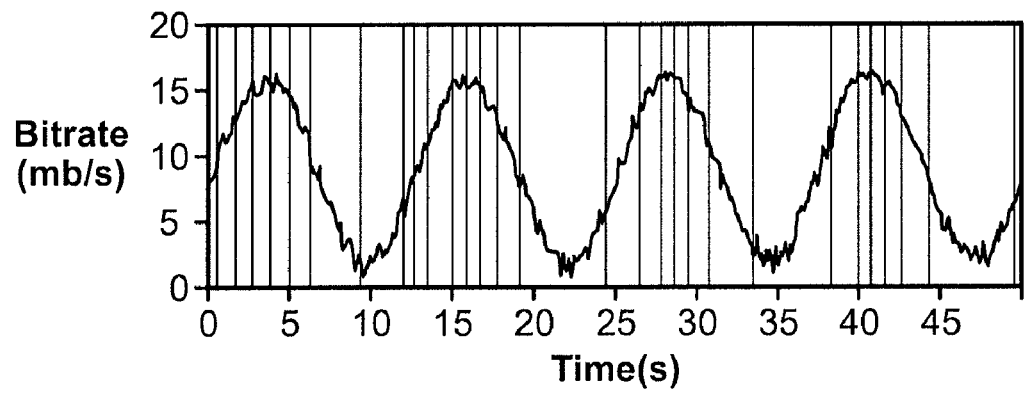
Figure 35A:
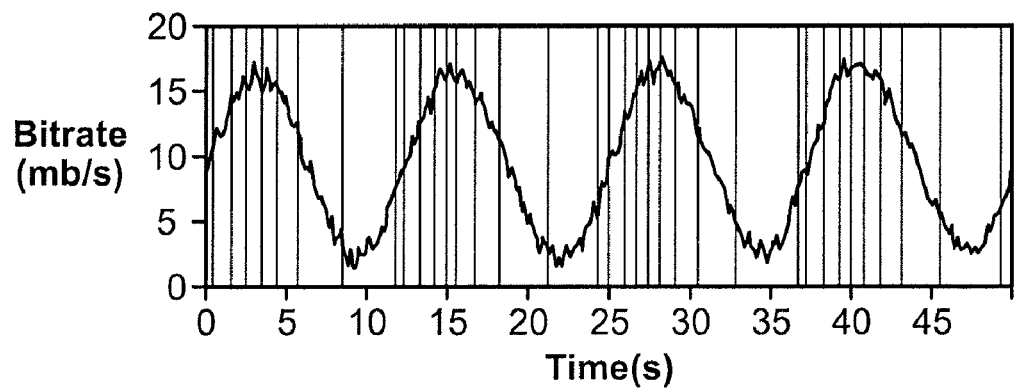
Figure 36A:
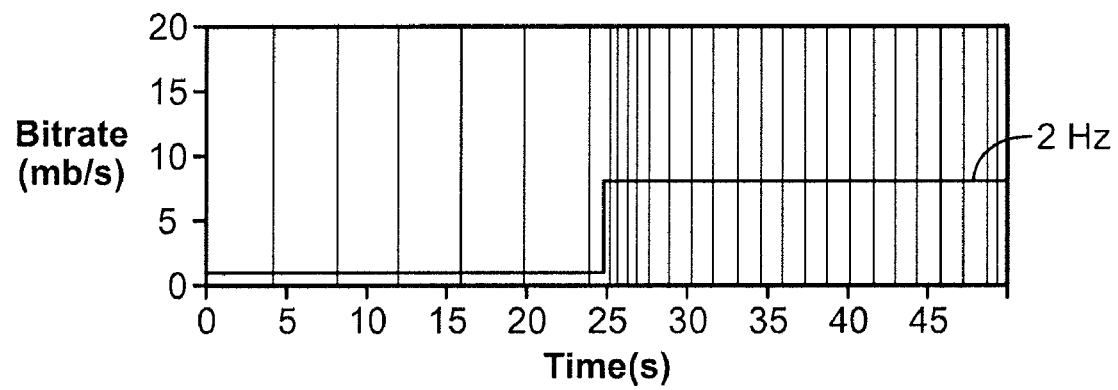
Figure 36B:
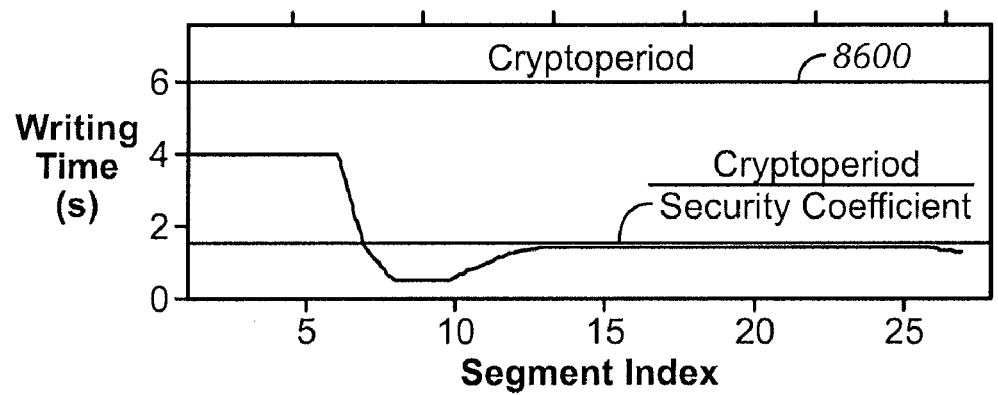
Figure 37A:
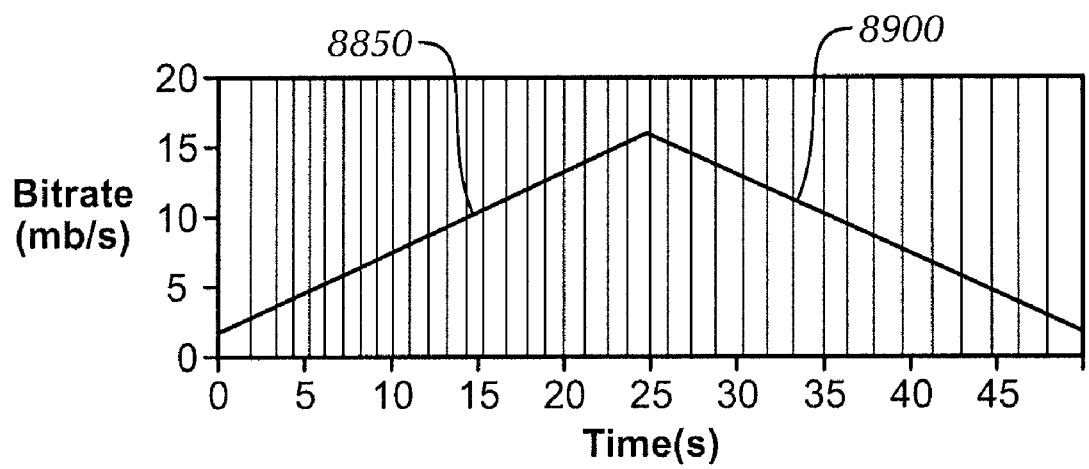
Figure 37B:
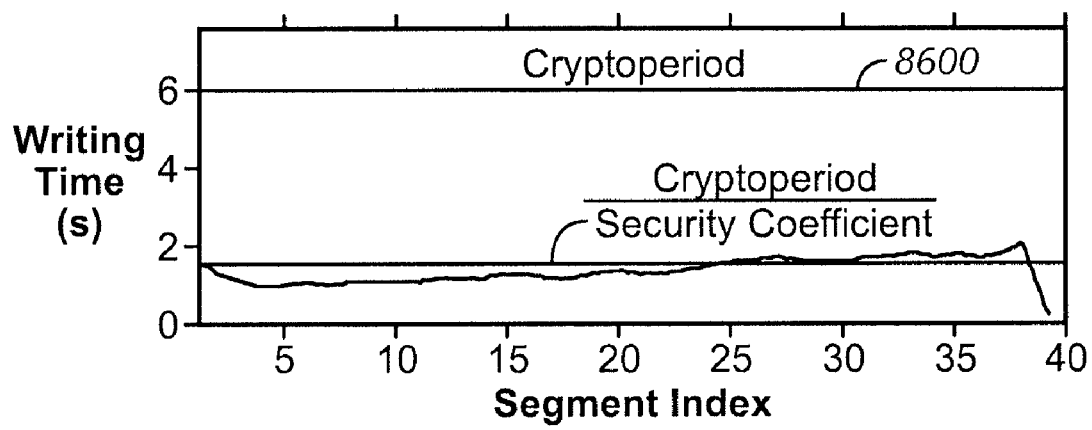
Figure 38A:
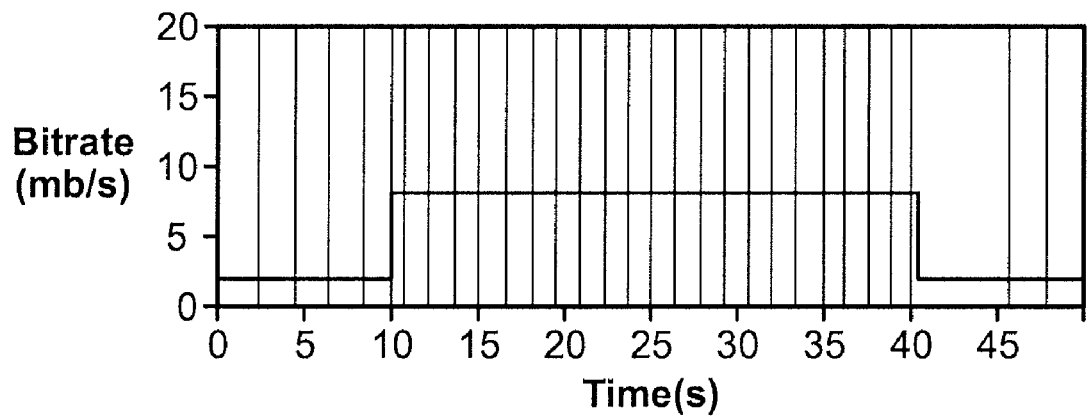
Figure 38B:
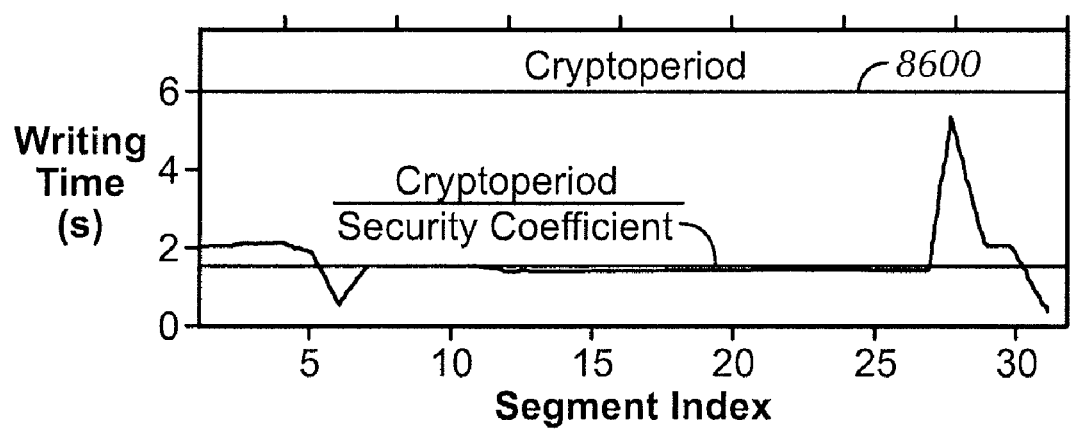
Figure 39A:
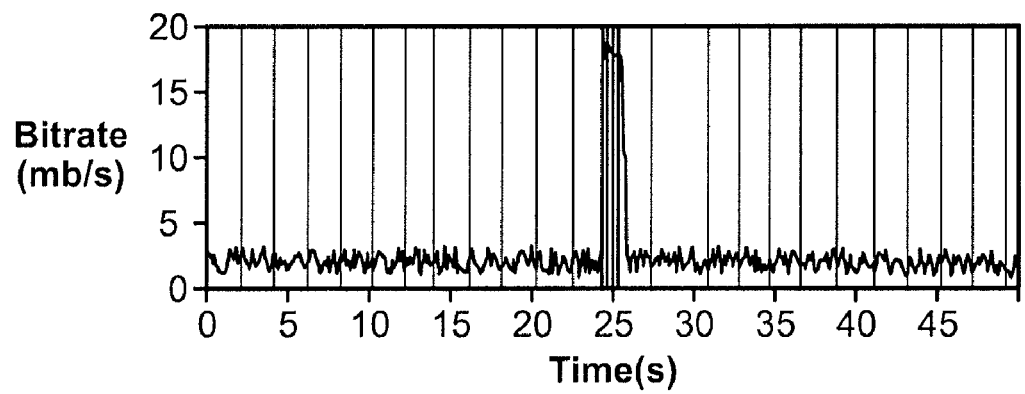

FIGS. 32A and B are an illustration of filtering a sinusoidal bit stream using a rapid filter;

FIGS. 33A and B are an illustration of filtering a sinusoidal bit stream using an inertial filter;

FIGS. 34A and B are an illustration of filtering a sinusoidal bit stream using a hybrid filter;

FIGS. 35A and B are an illustration of filtering a sinusoidal bit stream using a static filter;

FIGS. 36A and B are an illustration of filtering a constant bit rate bit stream using a hybrid filter;

FIGS. 37A and B are an illustration of filtering a triangular bit stream using a hybrid filter;

FIGS. 38A and B are an illustration of filtering a top hat bit stream using a hybrid filter; and FIGS. 39A and B are an illustration of filtering a peak in a bit stream using a hybrid filter.

Figure 40:
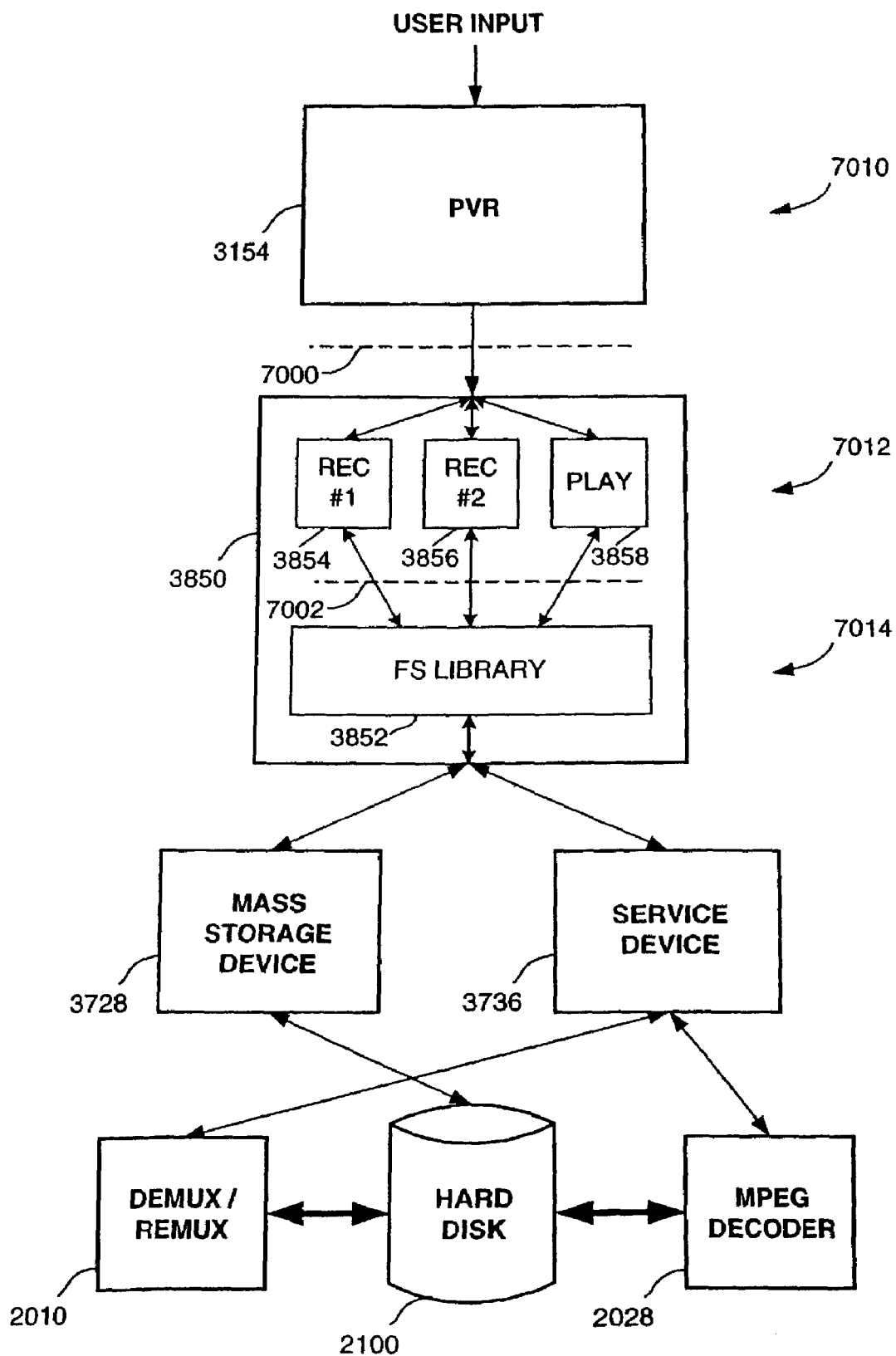
Figure 41:
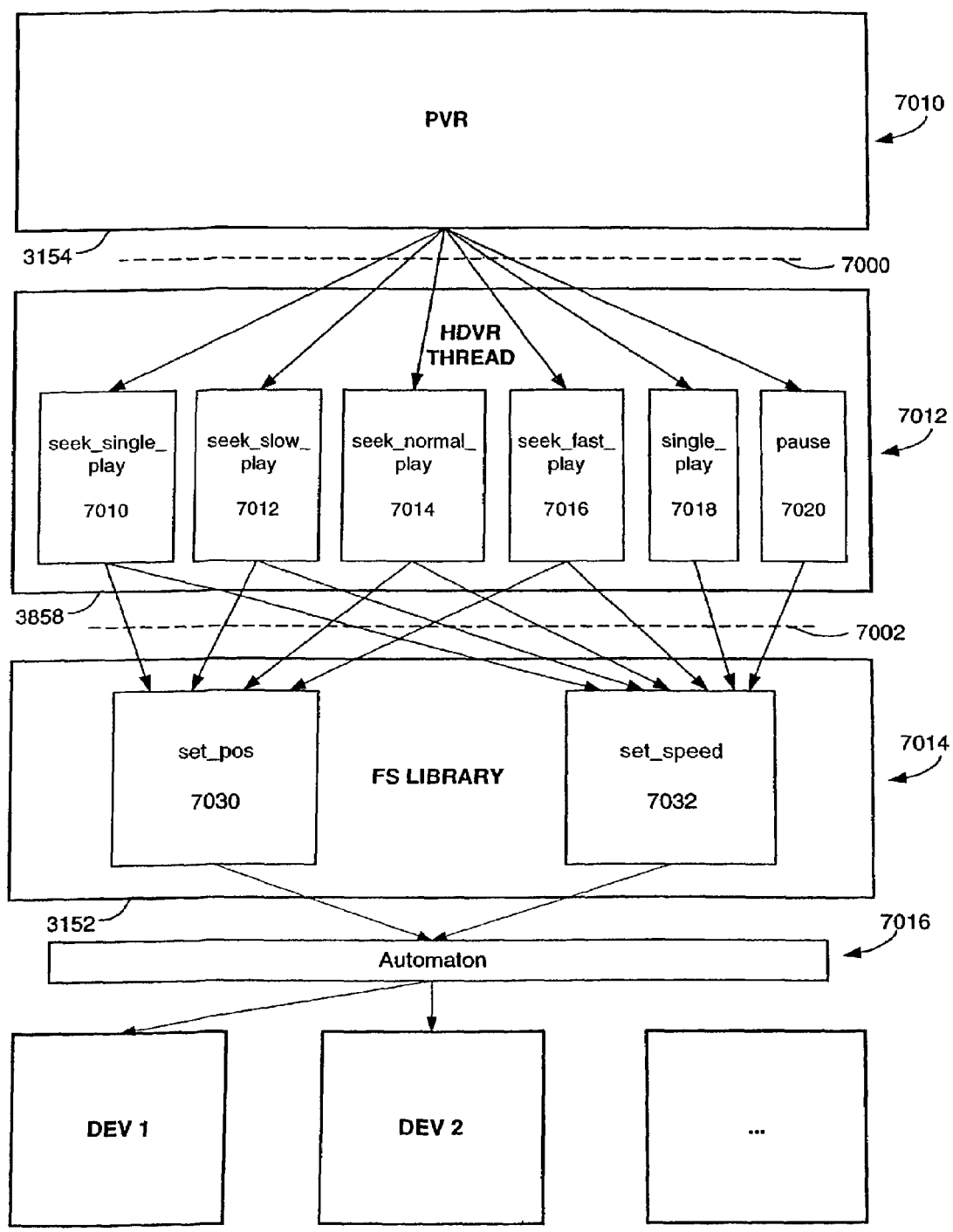
Figure 42:
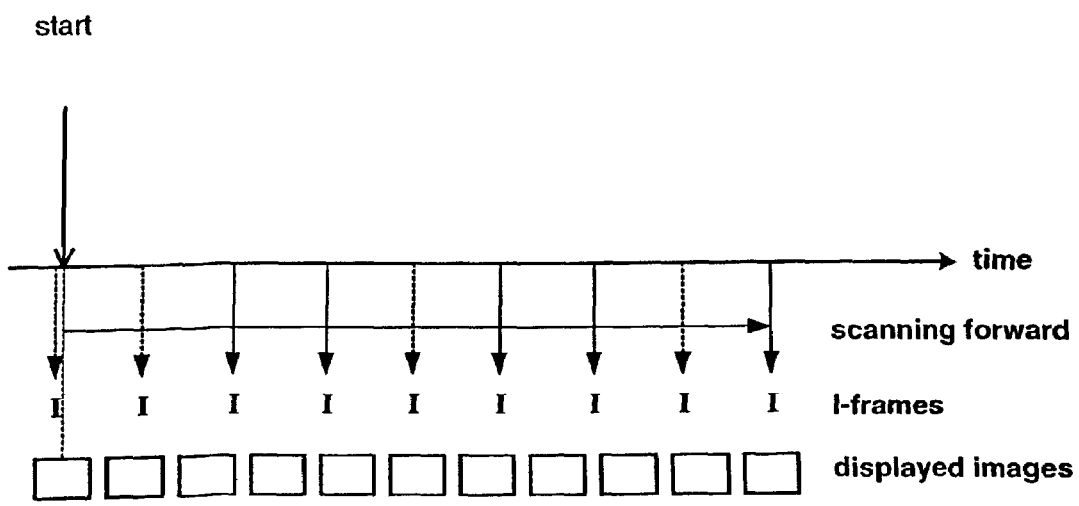
Figure 43:
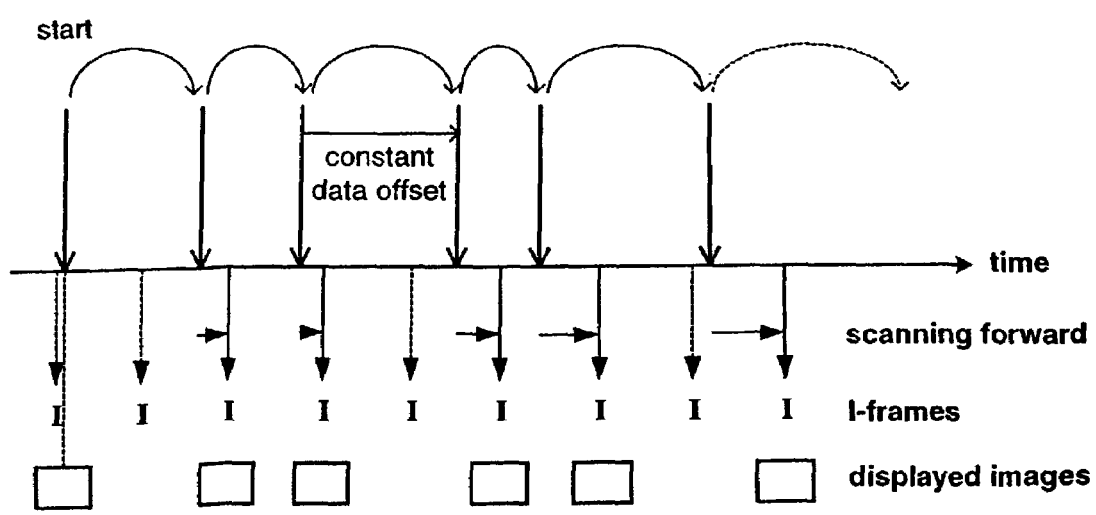
Figure 44:
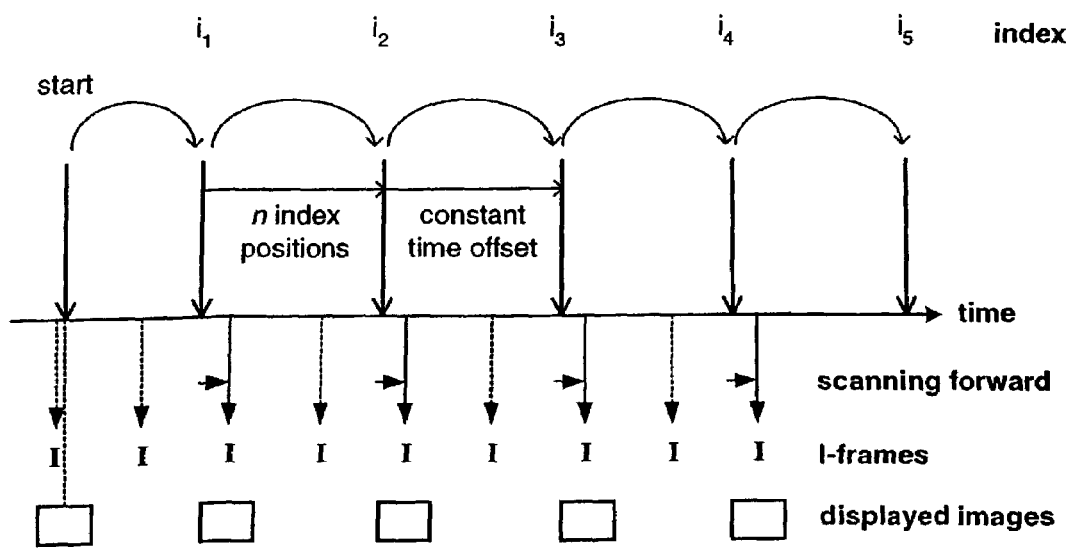
Figure 45:
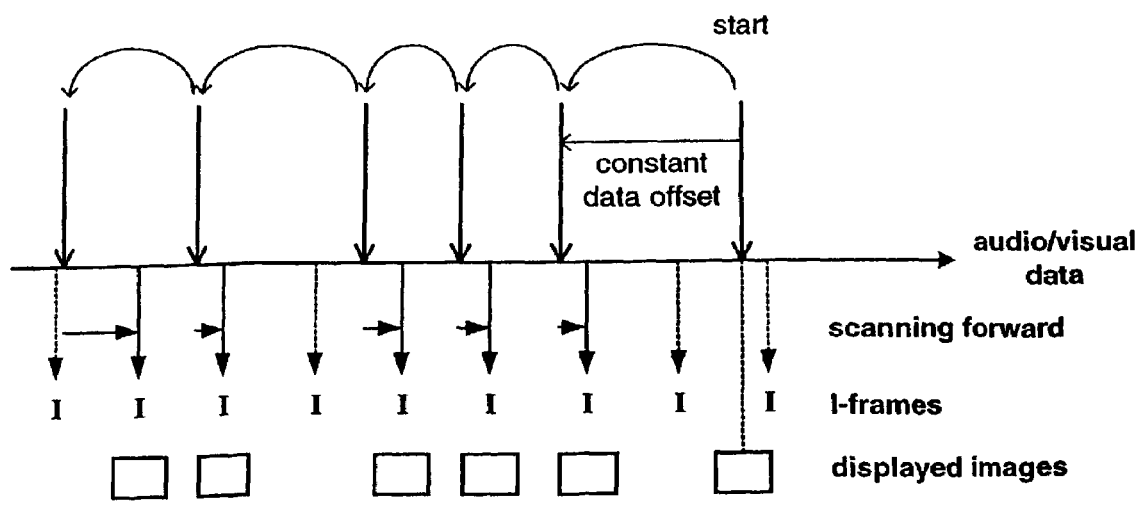
Figure 46:
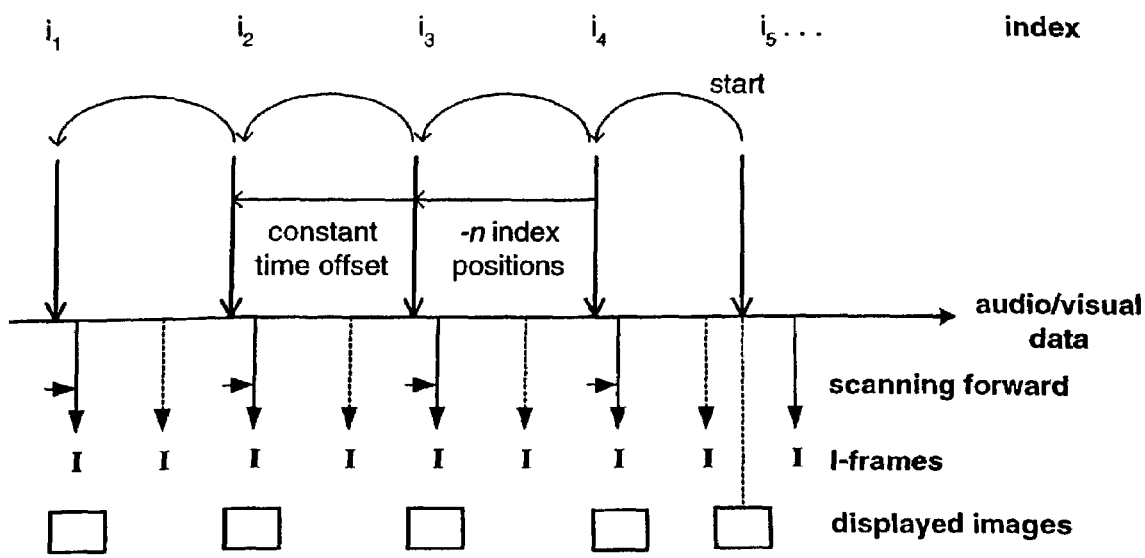
Figure 47:
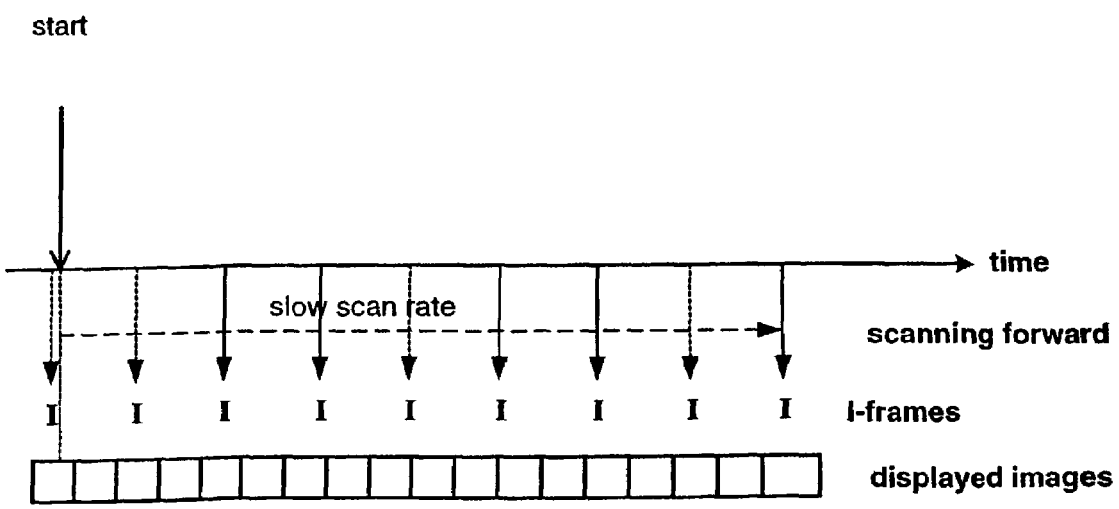

FIG. 40 is a schematic of a personal video recorder system;

FIG. 41 is a schematic of three layers of commands for a personal video recorder system;

FIG. 42 is an illustration of a conventional fast-forward operation;

FIG. 43 is an illustration of a first alternative fast-forward operation;

FIG. 44 is an illustration of a further fast-forward operation;

FIG. 45 is an illustration of a first rewind operation;

FIG. 46 is an illustration of a further rewind operation;

FIG. 47 is an illustration of a slow-play operation; and

Figure 48:
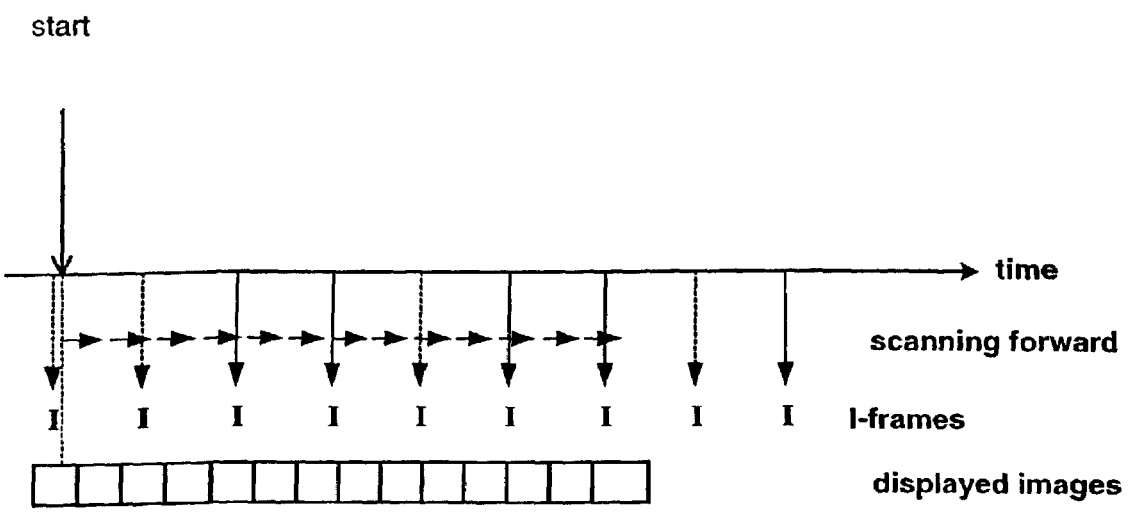

FIG. 48 is an illustration of an alternative slow-play operation.

SYSTEM OVERVIEW

Figure 1:
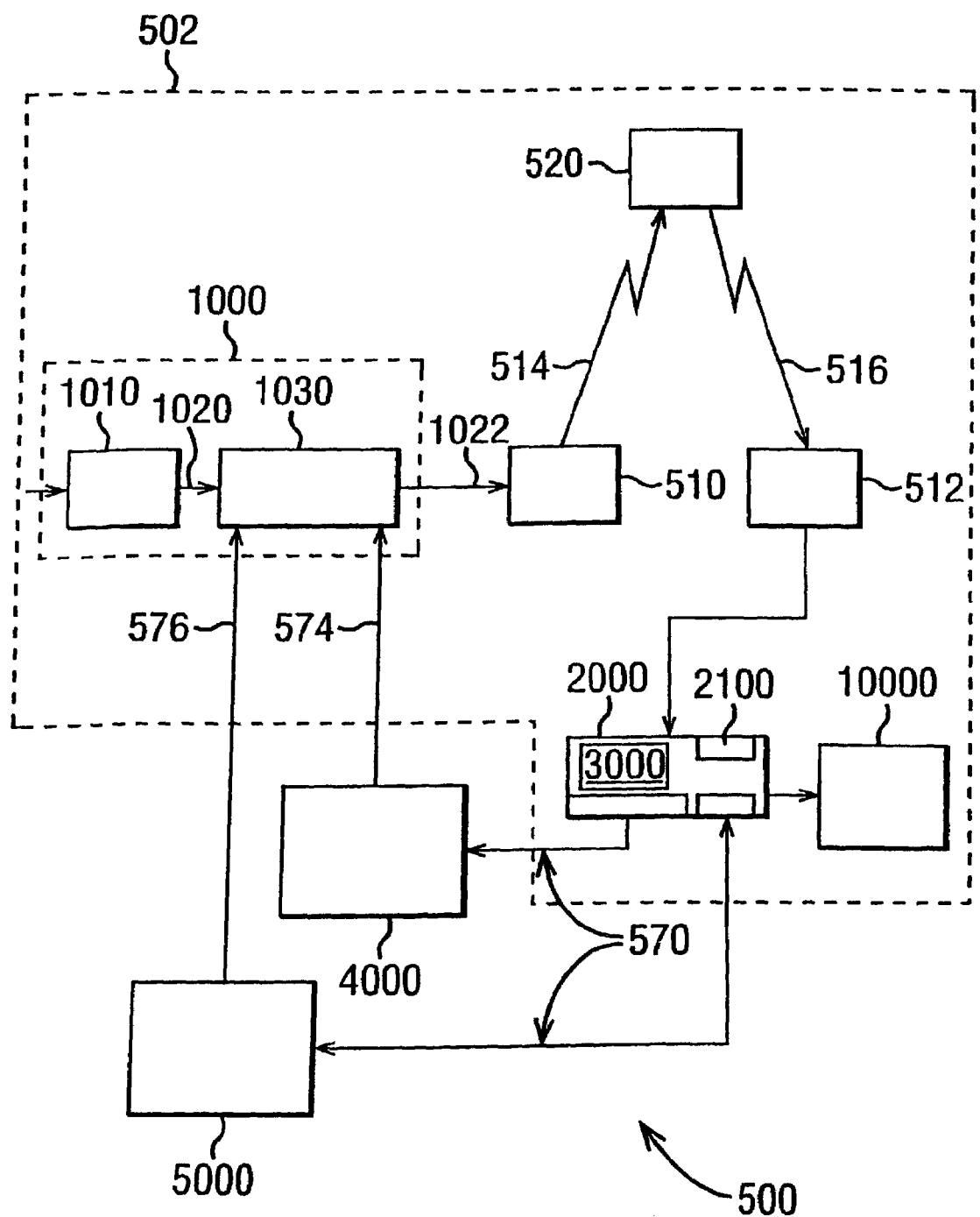
FIG. 1 is an overview of a satellite digital television system.

An overview of a digital television system 500 is shown in FIG. 1. As will be discussed below, the system 500 comprises a broadcast centre 1000, a receiver/decoder 2000, a software/hardware architecture 3000 of the receiver/decoder, an interactive system 4000, and a conditional access system 5000, as will all be discussed below.

The system 500 includes a mostly conventional digital television system 502 that uses the known MPEG-2 compression system to transmit compressed digital signals. In more detail, MPEG-2 compressor 1010 in a broadcast centre 1000 receives a digital signal stream (typically a stream of video signals). The compressor 1010 is connected by linkage 1020 to a multiplexer and scrambler 1030.

The multiplexer 1030 receives a plurality of further input signals, assembles the transport stream and transmits compressed digital signals to a transmitter 1010 of the broadcast centre via linkage 1022, which can of course take a wide variety of forms including telecommunications links. The transmitter 510 transmits electromagnetic signals via uplink 514 towards a satellite transponder 520, where they are electronically processed and broadcast via notional downlink 516 to earth receiver 512, conventionally in the form of a dish owned or rented by the end user. Other transport channels for transmission of the data are of course possible, such as terrestrial broadcast, cable transmission, combined satellite/cable links, telephone networks etc.

The signals received by receiver 512 are transmitted to an integrated receiver/decoder 2000 owned or rented by the end user and connected to the end user's television set 10000. The receiver/decoder 2000 decodes the compressed MPEG-2 signal into a television signal for the television set 10000. Although a separate receiver/decoder is shown in FIG. 1, the receiver/decoder may also be part of an integrated digital television. As used herein, the term "receiver/decoder" includes a separate receiver/decoder, such as a set-top box, and a television having a receiver/decoder integrated therewith.

In the receiver/decoder 2000 a hard disk 2100 is provided, on which audiovisual and other data can be stored. This allows advanced recording and playback facilities for programmes received by the receiver/decoder, and also allows large amounts of other types of data, such as electronic programme guide data, to be stored in the receiver/decoder.

A content management and protection system (CMPS) 2300 (not shown) in the receiver/decoder provides the ability securely and flexibly to control the recording and playback of data on the hard disk 2100 (or other storage device).

In a multichannel system, the multiplexer 1030 handles audio and video information received from a number of parallel sources and interacts with the transmitter 510 to broadcast the information along a corresponding number of channels. In addition to audiovisual information, messages or applications or any other sort of digital data may be introduced in some or all of these channels interlaced with the transmitted digital audio and video information.

An interactive system 4000 is connected to the multiplexer 1030 and the receiver/decoder 2000, and is located partly in the broadcast centre and partly in the receiver/decoder. It enables the end user to interact with various applications via a back channel 570. The back channel may be, for example a Public Switched Telephone Network (PSTN) channel (for example, a modemmed back channel) or an Out of Band (OOB) channel.

A conditional access system 5000, also connected to the multiplexer 1030 and the receiver/decoder 2000 and again located partly in the broadcast centre and partly in the receiver/decoder, enables the end user to access digital television broadcasts from one or more broadcast suppliers. A smartcard, capable of deciphering messages relating to commercial offers (that is, one or several television programmes sold by the broadcast supplier), can be inserted into the receiver/decoder 2000. Using the receiver/decoder 2000 and smartcard, the end user may purchase commercial offers in either a subscription mode or a pay-per-view mode. Typically this is achieved using the back channel 570 which is used by the interactive system 4000.

As mentioned above, programmes transmitted by the system are scrambled at the multiplexer 1030, the conditions and encryption keys applied to a given transmission being determined by the access control system 5000. Transmission of scrambled data in this way is well known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the receiver/decoder 2000 having access to an equivalent to the exploitation key stored on a smartcard inserted in the receiver/decoder to decrypt the encrypted control word and thereafter descramble the transmitted data. A paid-up subscriber will receive, for example, in a broadcast monthly EMM (Entitlement Management Message) the exploitation key necessary to decrypt the encrypted control word so as to permit viewing of the transmission.

Figure 2:
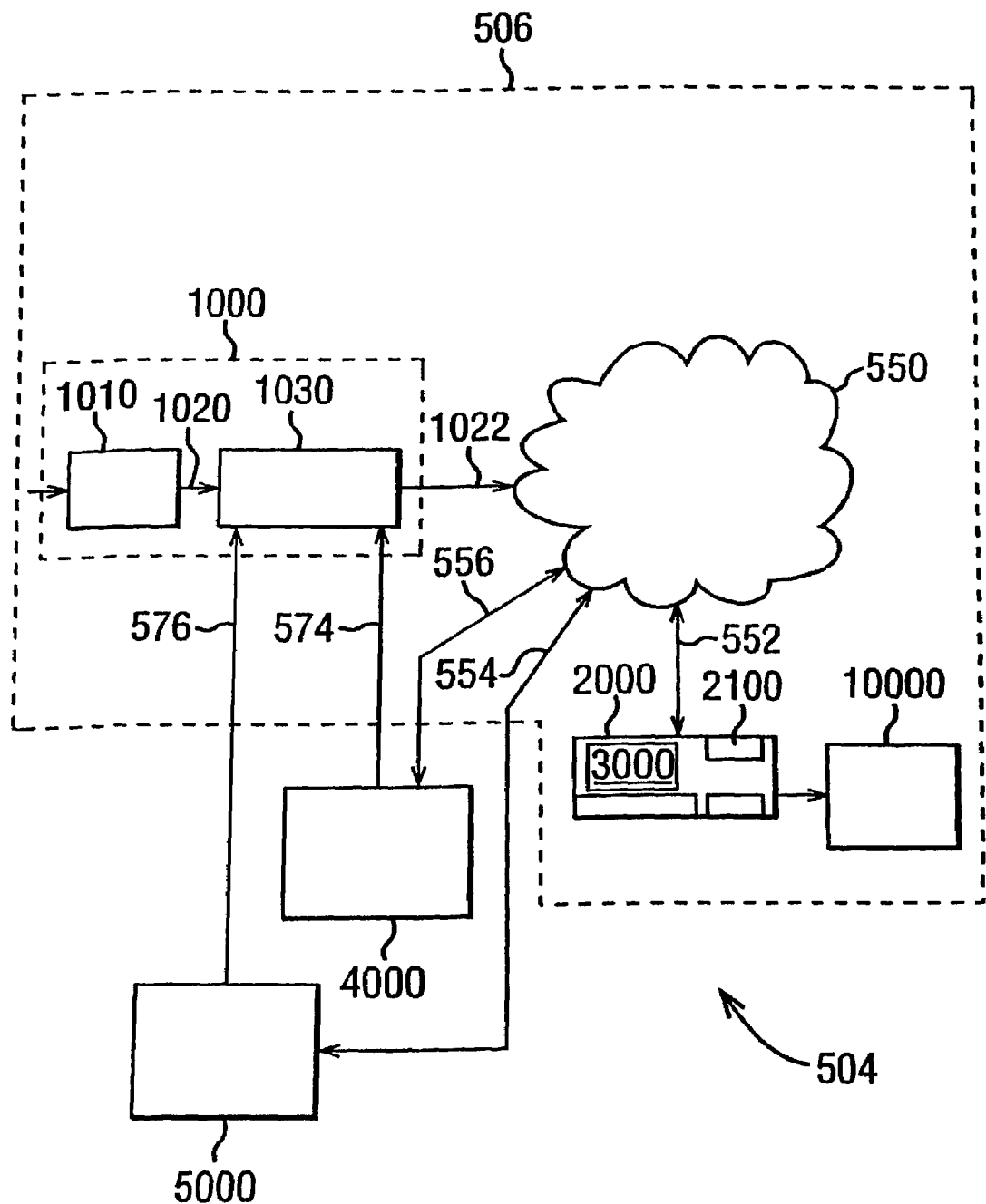
FIG. 2 is an overview of a cable digital television system.

FIG. 2 illustrates an alternative embodiment of a digital television system 504, utilising a cable network as the broadcast medium for the compressed digital signals. In this figure, like parts are indicated with like numerals.

The satellite transponder and transmitting and receiving stations are replaced by a cable network 550. Additionally, in this particular embodiment, the modemmed back channel between the receiver/decoder 2000 and the interactive system 4000 and conditional access system 5000 is removed, replaced by linkages 554, 556 between the cable network 550 and the conditional access system 5000 and interactive system 4000 respectively. The receiver/decoder 2000 thus communicates with the other systems via the cable network 550, utilising a cable modem or other means to allow it to send and receive data via the same link as it receives data from the broadcast centre.

The cable network 550 may be any form of wide area network (WAN), such as a dedicated connection, the internet, local cable distribution network, wireless connection, or any combination of the above. In the present embodiment, the hybrid fibre coax (HFC) network is used. It is appreciated that the various means of communication between the receiver/decoder 2000 and the other components of the television system are interchangeable.

Conditional Access System

Figure 3:
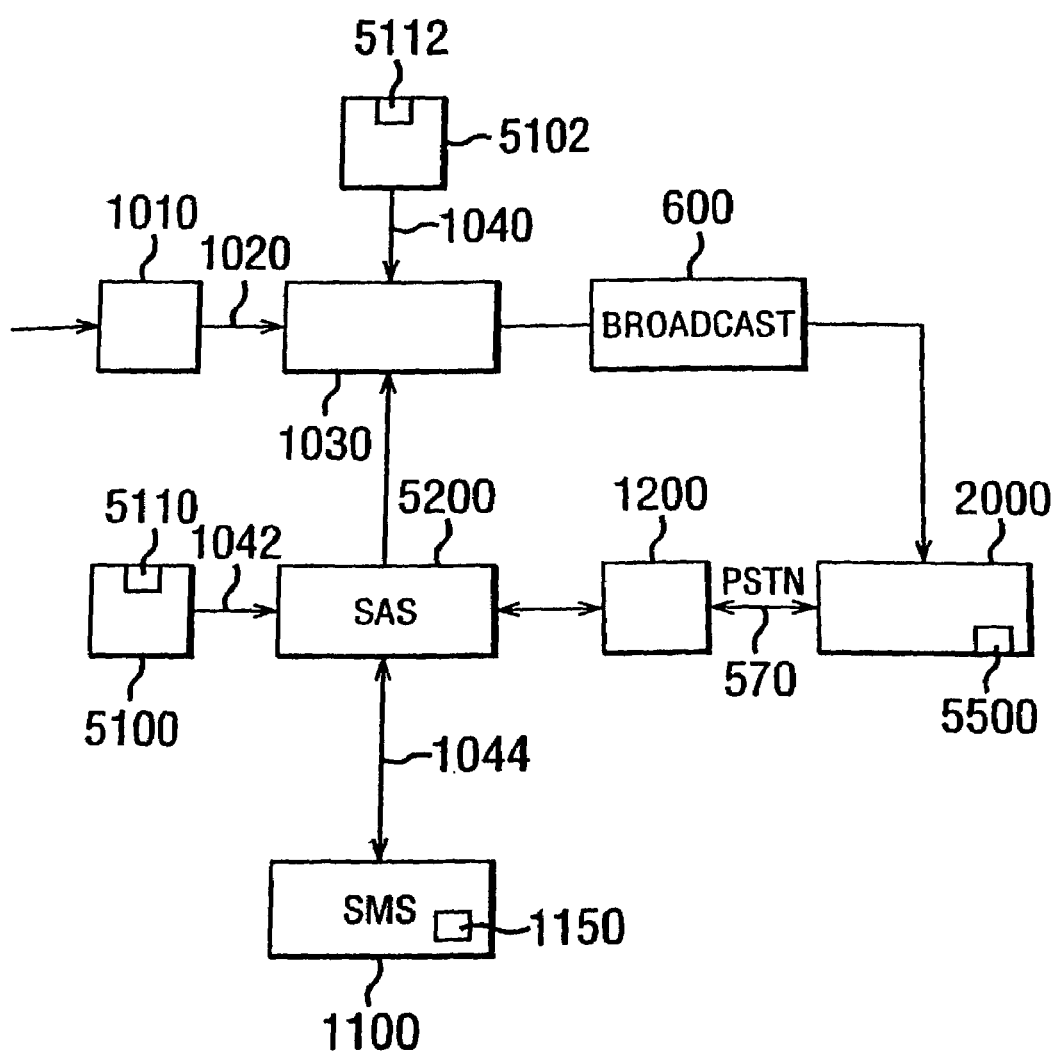
FIG. 3 is an overall system view, with the head-end shown in more detail.

With reference to FIG. 3, in overview the conditional access system 5000 includes a Subscriber Authorization System (SAS) 5200. The SAS 5200 is connected to one or more Subscriber Management Systems (SMS) 1100, one SMS for each broadcast supplier, by a link 1044, which may be a TCP-IP link or other type of link. Alternatively, one SMS could be shared between two commercial operators, or one operator could use two SMSs, and so on.

First encrypting units in the form of ciphering units 5100 utilising "mother" smartcards 5110 are connected to the SAS by linkage 1042. Second encrypting units again in the form of ciphering units 5102 utilising mother smartcards 5112 are connected to the multiplexer 1030 by linkage 1040. The receiver/decoder 2000 receives a "daughter" smartcard 5500. The receiver/decoder is connected directly to the SAS 5200 via communications servers 1200 and the modemmed back channel 570. The SAS sends amongst other things subscription rights to the daughter smartcard on request.

In variants of the preferred embodiment, internet or cable connections either complement or replace the PSTN 570 and communications servers 1200.

The smartcards contain confidential information from one or more commercial operators. The "mother" smartcard encrypts different kinds of messages and the "daughter" smartcards decrypt the messages, if they have the rights to do so.

With reference to FIG. 3, in the broadcast centre, the digital video signal is first compressed (or bit rate reduced), using the MPEG-2 compressor 1010. This compressed signal is then transmitted to the multiplexer and scrambler 1030 in order to be multiplexed with other data, such as other compressed data.

The scrambler generates a control word used in the scrambling process and included in the MPEG-2 stream in the multiplexer 1030. The control word is generated internally and enables the end user's integrated receiver/decoder 2000 to descramble the programme.

Access criteria, indicating how the programme is commercialised, are also added to the MPEG-2 stream. The programme may be commercialised in either one of a number of "subscription" modes and/or one of a number of "Pay Per View" (PPV) modes or events. In the subscription mode, the end user subscribes to one or more commercial offers, or "bouquets", thus getting the rights to watch every channel inside those bouquets. In the Pay Per View mode, the end user is provided with the capability to purchase events as he wishes.

Both the control word and the access criteria are used to build an Entitlement Control Message (ECM); this is a message sent in relation with one scrambled program; the message contains a control word (which allows for the descrambling of the program) and the access criteria of the broadcast program. The access criteria and control word are transmitted to the second encrypting unit 5102 via the linkage 1040. In this unit, an ECM is generated, encrypted and transmitted on to the multiplexer and scrambler 1030.

Each service broadcast by a broadcast supplier in a data stream comprises a number of distinct components; for example a television programme includes a video component, an audio component, a sub-title component and so on. Each of these components of a service is individually scrambled and encrypted for subsequent broadcast. In respect of each scrambled component of the service, a separate ECM is required.

The multiplexer 1030 receives electrical signals comprising encrypted EMMs from the SAS 5200, encrypted ECMs from the second encrypting unit 5102 and compressed programmes from the compressor 1010. The multiplexer 1030 scrambles the programmes and transmits the scrambled programmes, the encrypted EMMs and the encrypted ECMs as electric signals to broadcast system 600, which may be for example a satellite system as shown in FIG. 1, or other broadcast system. The receiver/decoder 2000 demultiplexes the signals to obtain scrambled programmes with encrypted EMMs and encrypted ECMs.

The receiver/decoder receives the broadcast signal and extracts the MPEG-2 data stream. If a programme is scrambled, the receiver/decoder 2000 extracts the corresponding ECM from the MPEG-2 stream and passes the ECM to the "daughter" smartcard 5500 of the end user. This slots into a housing in the receiver/decoder 2000. The daughter smartcard 5500 controls whether the end user has the right to decrypt the ECM and to access the programme. If not, a negative status is passed to the receiver/decoder 2000 to indicate that the programme cannot be descrambled. If the end user does have the rights, the ECM is decrypted and the control word extracted. The decoder 2000 can then descramble the programme using this control word. The MPEG-2 stream is decompressed and translated into a video signal for onward transmission to television set 10000.

If the programme is not scrambled, no ECM will have been transmitted with the MPEG-2 stream and the receiver/decoder 2000 decompresses the data and transforms the signal into a video signal for transmission to television set 10000.

The subscriber management system (SMS) 1100 includes a database 1150 which manages, amongst others, all of the end user files, commercial offers (such as tariffs and promotions), subscriptions, PPV details, and data regarding end user consumption and authorization. The SMS may be physically remote from the SAS.

The SMS 1100 transmits messages to the SAS 5200 which imply modifications to or creations of Entitlement Management Messages (EMMs) to be transmitted to end users. The SMS 1100 also transmits messages to the SAS 5200 which imply no modifications or creations of EMMs but imply only a change in an end user's state (relating to the authorization granted to the end user when ordering products or to the amount that the end user will be charged). The SAS 5200 also sends messages (typically requesting information such as call-back information or billing information) to the SMS 1100, so that it will be apparent that communication between the two is two-way.

Receiver/Decoder

Figure 4:
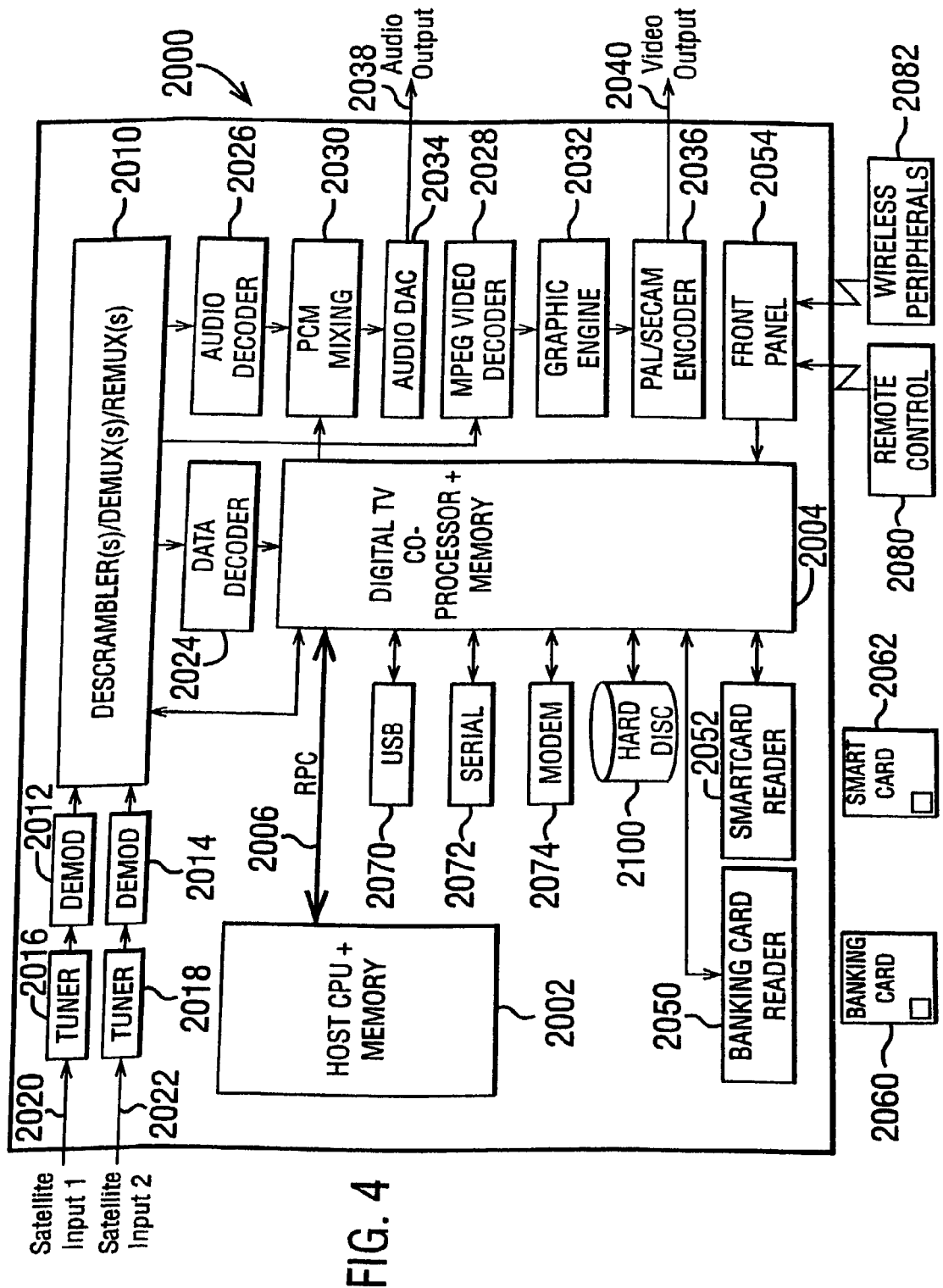
FIG. 4 is a schematic of the component architecture of the receiver/decoder.

Referring to FIG. 4, the various elements of receiver/decoder 2000 will now be described in terms of functional blocks.

The receiver/decoder 2000, which may be, for example, a digital set-top box (DSTB), comprises a central host processor 2002 and a digital TV coprocessor 2004, both having associated memory elements (not shown) and joined by a coprocessor bus 2006. The coprocessor 2004 is adapted to receive input data from a USB interface 2070, a serial interface 2072, a parallel interface (not shown), a modem 2074 (connected to the modem back channel 570 of FIG. 1), and switch contacts on the front panel 2054 of the decoder.

The receiver/decoder is additionally adapted to receive inputs from an infra-red remote control 2080 (and optionally from other wireless peripherals 2082 such as Bluetooth-enabled devices) and also possesses two smartcard readers 2050, 2052 adapted to read bank and subscription smartcards 2060, 2062 respectively. The subscription smartcard reader 2052 engages with an inserted subscription card 2062 and with a conditional access unit (not shown) to supply the necessary control word to a demultiplexer/descrambler/remultiplexer unit 2010 to enable the encrypted broadcast signal to be descrambled. The decoder also includes a conventional tuner 2016 and demodulator 2012 to receive and demodulate the satellite transmission before being filtered and demultiplexed by the demodulator/descrambler unit 2010. A second tuner 2018 and second demodulator 2014 are also provided, to allow, amongst other things, a second channel to be received and decoded in parallel with the first.

A hard disk 2100 is also provided, allowing storage of programme and application data received and generated by the receiver/decoder. In conjunction with the two tuners 2016, 2018, two demodulators 2012, 2014, the descrambler/demultiplexer/remultiplexer 2010, and the data decoder 2024 and audio decoder 2026, advanced recording and playback features are provided, allowing simultaneous recordings of one or more programmes while a further programme is being viewed, and more general transfers to and from the hard disk to and from the display devices and/or inputs and outputs, all occurring in parallel.

The audio output 2038 and video output 2040 in the receiver/decoder are fed by the PCM mixer 2030 and audio DAC 2034, and the MPEG video decoder 2028, graphic engine 2032 and PAL/SECAM encoder 2036 respectively. Alternative or complementary outputs may of course be provided.

As used in this description, an application is preferably a piece of computer code for controlling high level functions of preferably the receiver/decoder 2000. For example, when the end user positions the focus of remote control 2080 on a button object seen on the screen of the television set (not shown) and presses a validation key, the instruction sequence associated with the button is run. Applications and the associated middleware are executed by the host processor 2002, with remote procedure calls (RPCs) being made to the digital TV coprocessor 2004 across the coprocessor bus 2006 as and when required.

An interactive application proposes menus and executes commands at the request of the end user and provides data related to the purpose of the application. Applications may be either resident applications, that is, stored in the ROM (or FLASH or other non-volatile memory) of the receiver/decoder 2000, or broadcast and downloaded into the RAM, FLASH memory or hard disk of the receiver/decoder 2000.

Applications are stored in memory locations in the receiver/decoder 2000 and represented as resource files. The resource files comprise graphic object description unit files, variables block unit files, instruction sequence files, application files and data files.

The receiver/decoder contains memory (not shown) divided into at least one RAM volume, a FLASH volume and at least one ROM volume, but this physical organization is distinct from the logical organization. The memory may further be divided into memory volumes associated with the various interfaces. From one point of view, the memory can be regarded as part of the hardware; from another point of view, the memory can be regarded as supporting or containing the whole of the system shown apart from the hardware.

Architecture of Receiver/Decoder

Figure 5:
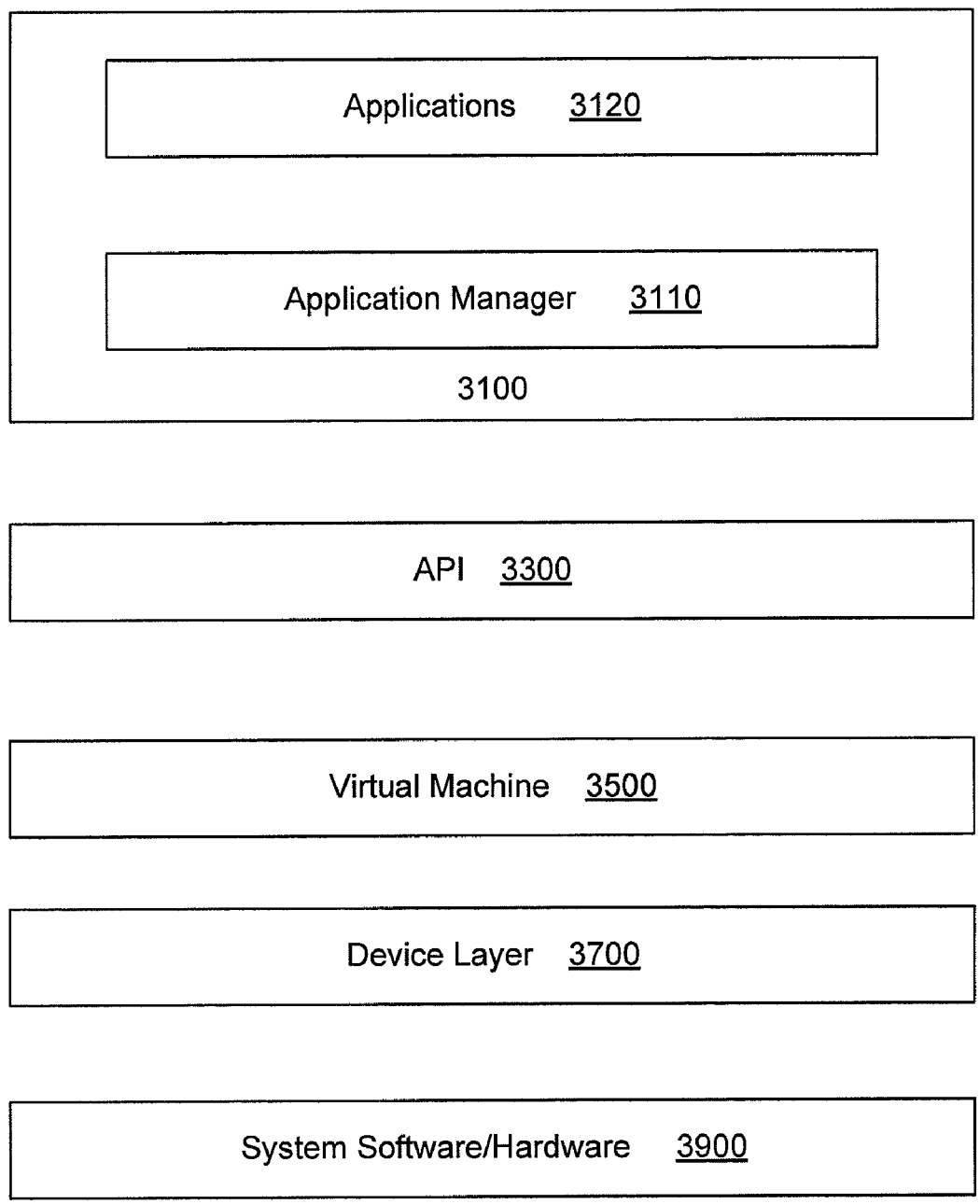
FIG. 5 is a diagram of the software architecture of the receiver/decoder.

With reference to FIG. 5, the software/hardware architecture 3000 of the receiver/decoder contains five software layers, organized so that the software can be implemented in any receiver/decoder and with any operating system. The various software layers are application layer 3100, application programming interface (API) layer 3300, virtual machine layer 3500, device interface layer 3700 (often abbreviated just to 'device layer') and system software/hardware layer 3900.

The application layer 3100 encompasses applications 3120 that are either resident in or downloaded to the receiver/decoder. They may be interactive applications used by customers, written in, for example, Java, HTML, MHEG-5 or other languages, or they may be applications used by the receiver/decoder for other purposes, for example for running such interactive applications. This layer is based on a set of open Application Programming Interfaces (APIs) provided by the Virtual Machine layer. This system allows applications to be downloaded to the hard disk, flash memory or RAM memory in the receiver/decoder on-the-fly or on demand. The application code can be transmitted in compressed or uncompressed format using protocols such as Data Storage Media Command and Control (DSMCC), Network File Server (NFS) or other protocols.

The API layer 3300 provides high-level utilities for interactive application development. It includes several packages that make up this high-level API. The packages provide all the functionality necessary to run interactive applications. The packages are accessible by the applications.

In a preferred embodiment the APT is adapted for applications written in the Java, PanTalk or such similar programming languages. Furthermore, it can facilitate the interpretation of HTML and other formats, such as MHEG-5. Besides these features, it also includes other packages and service modules that are detachable and extensible as requirements dictate.

The virtual machine layer 3500 is composed of language interpreters and various modules and systems. This layer, managed by a kernel 3650 (not shown), consists of everything necessary to receive and execute interactive applications in the receiver/decoder.

The device interface layer 3700 includes a Device Manager and software devices (generally referred to herein as just 'devices'). Devices are software modules which consist of the logical resources necessary for management of external events and physical interfaces. The device interlace layer, under the control of the Device Manager, manages communication channels between drivers and applications and provides enhanced error exception checking. Some examples of managed (hardware) devices are: card readers 3722 (not shown), modems 3730 (not shown), network 3732 (not shown), PCMCIA (Personal Computer Memory Card International Association), LED display and so on. Programmers do not have to deal with this layer directly, since the API layer controls the devices from above.

The system software/hardware layer 3900 is provided by the manufacturer of the receiver/decoder. Because of the modularity of the system and because services supplied by the higher-level operating system (such as event scheduling and memory management) are part of the virtual machine and kernel, the higher layers are not tied to a particular real-time operating system (RTOS) or to a particular processor.

Typically the virtual machine layer 3500, occasionally in combination with the device interface layer 3700 and/or API 3300, is referred to as the 'middleware' of the receiver/decoder.

Figure 6:
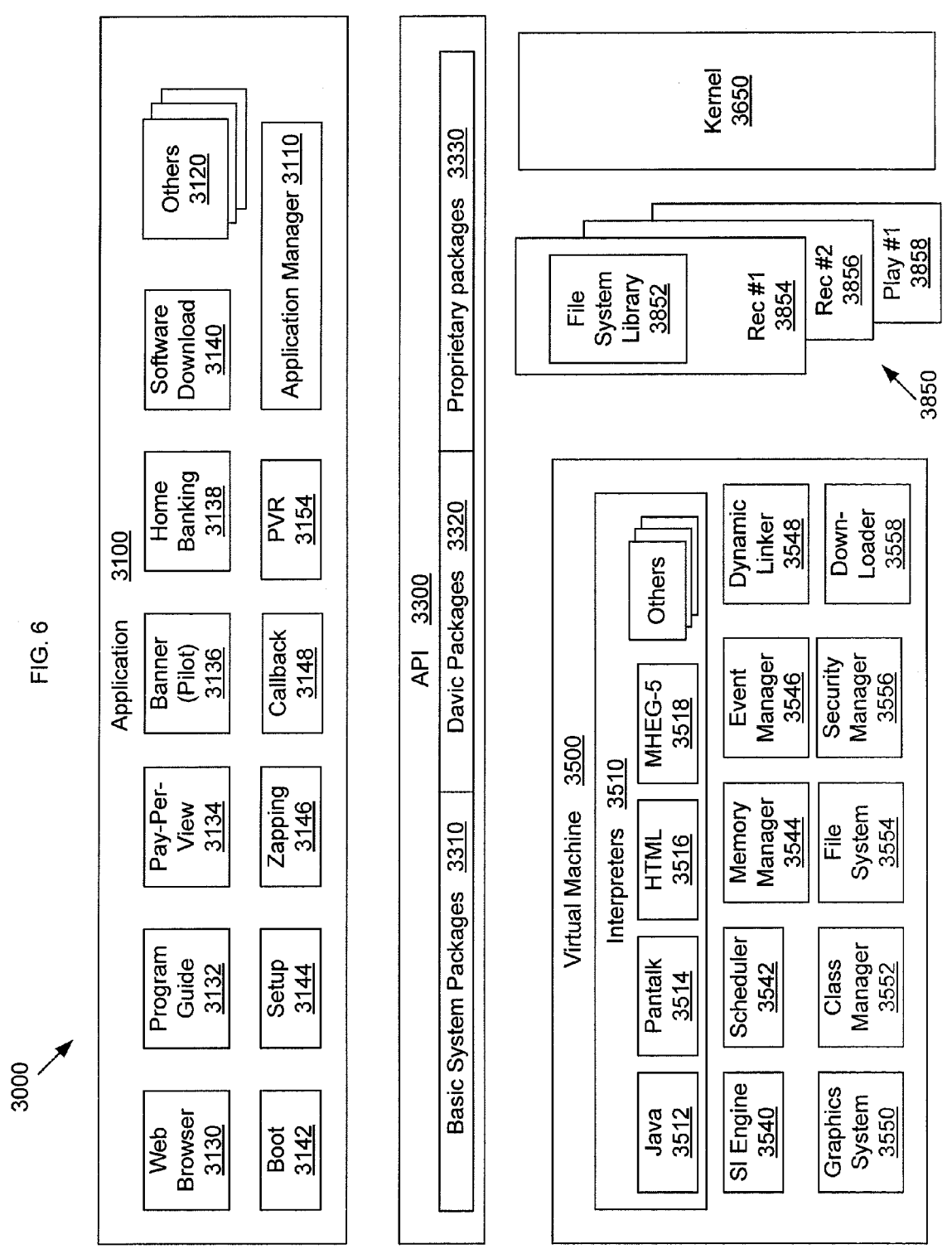
FIG. 6 is a diagram showing the top half of FIG. 5 in more detail.

With reference to FIG. 6 the software architecture of the receiver/decoder 3000 corresponding to the top half of FIG. 5 (comprising the application layer 3100, API layer 3300 and virtual machine layer 3500) will now be described in more detail.

Interactive applications are applications that the user interacts with, for example, to obtain products and services, such as electronic program guides, telebanking applications and games.

There are two types of application in the application layer 3100, plus the Application Manager 3110. There are interactive applications such as a Web Browser 3130 which can be added at any time as long as they conform to the API 3300, and there are resident applications which manage and support the interactive applications. The resident applications are substantially permanent and include the following:

Boot. The Boot application 3142 is the first application launched when the receiver/decoder is powered on. The Boot application first starts the Application Manager 3110, and then starts the "Manager" software modules in the virtual machine 3500, such as the Memory Manager 3544 and the Event Manager 3546.

Application Manager. The Application Manager 3110 manages the interactive applications that are run in the receiver/decoder, that is, it starts, stops, suspends, resumes, handles events and deals with communication between applications. It allows multiple applications to run at once, and thus is involved in the allocation of resources among them. This application is completely transparent to the user.

SetUp. The purpose of the SetUp application 3144 is to configure the receiver/decoder, primarily the first time it is used. It performs actions such as scanning for TV channels, setting the date and time, establishing user preferences, and so on. However, the SetUp application can be used at any time by the user to change the receiver/decoder configuration.

Zapping. The Zapping application 3146 is used to change channels using the Program-up, Program-down and numeric keys. When another form of zapping is used, for example, through a banner (pilot) application, the Zapping application is stopped.

Callback. The Callback application 3148 is used to extract the values of various parameters stored in the receiver/decoder memory and return these values to the commercial operator via modemmed back channel 1070 (not shown), or by other means.

Other applications in the application layer 3100 include a program guide application 3132, a pay-per-view application 3134, a banner (pilot) application 3136, a home banking application 3138, a software download application 3140 and a PVR (personal video recorder) application 3154 (see below).

As noted above, the Application Programming Interface (API) layer 3300 contains several packages. These include basic system packages 3310, used, for example, to access basic features of the virtual machine, DAVIC packages 3320, and proprietary packages 3330, used to access features of the software architecture unique to the principal software vendor.

Considered in more detail, the virtual machine 3500 includes the following:

Language Interpreters 3510. Different interpreters can be installed to conform to the type of applications to be read. These include Java interpreters 3512, PanTalk interpreters 3514, HTML interpreters 3516, MHEG-5 interpreters 3518 and others.

Service Information (SI) Engine. The SI Engine 3540 loads and monitors common Digital Video Broadcasting (DVB) or Program System Information Protocol (PSIP) tables and puts them into a cache. It allows access to these tables by applications which need the data contained in them.

Scheduler 3542. This module allows for pre-emptive, multithreaded scheduling with each thread having its own event queue.

Memory Manager 3544. This module manages the access to memory. It also automatically compresses data in memory when necessary and performs automatic garbage collection.

Event Manager 3546. This module allows events to be triggered according to priority. It manages timer and event grabbing and allows applications to send events to each other.

Dynamic Linker 3548. This module allows the resolution of addresses arising from native Java functions, loads native methods from a Java class downloaded into RAM and resolves calls from downloaded native codes towards ROM.

Graphics System 3550. This system is object-orientated and optimized. It includes graphic window and object management as well as a vectorial font engine with multi-language support.

Class Manager 3552. This module loads classes and resolves any class referencing problems.

File System 3554. This module is compact and optimized to manage a hierarchical file system with multiple ROM, flash, RAM and DSMCC volumes. Flash integrity is guaranteed against any incidents.

Security Manager 3556. This module authenticates applications and controls the access of applications to sensitive memory and other zones of the set-top box.

Downloader 3558. This module uses automatic data loading from a remote DSMCC carousel or through the NFS protocol, with downloaded files accessed in the same way as resident ones. Memory clear-up, compression and authentication are also provided.

Furthermore, the DAVIC resource notification model is supported so that client resources are efficiently managed.

A kernel 3650 manages the various different processes running in the virtual machine 3500 and device interface layer 3700 (not shown). For efficiency and reliability reasons, the kernel implements relevant parts of the POSIX standard for operating systems.

Under control of the kernel, the virtual machine (running Java and Pantalk applications) runs in its own thread, separate to other 'server' elements of the operating system, such as the mass storage server 3850 (not shown). Corresponding provisions, such as requiring Thread IDs to be passed as parameters in system calls, are also made in the API layer 3300 to allow the applications 3120 to benefit from the multithreaded environment.

By providing multiple threads, more stability can be achieved. For example, if the virtual machine 3500 ceases to operate for some reason, by suffering a crash or being blocked for a long time by an application trying to access a device, other time-critical parts of the system, such as the hard disk server, can continue to operate.

As well as the virtual machine 3500 and kernel 3650, a hard disk video recorder (HDVR) module 3850 is provided for handling the recording and playback functions of the hard disk 2210 or other attached mass storage component. The server comprises two separate threads 3854, 3856 handling recording, one thread 3858 for handling playback, and a file system library 3852 for interfacing with the mass storage components.

An appropriate one of the threads 3854, 3856, 3858 in the hard disk video recorder (HDVR) 3850 receives commands (such as a command to start recording a particular programme) from clients such as the personal video recorder (PVR) application 3154, in response to the user pressing a 'record' button, for example.

In turn, the thread in question then interacts with the service device 3736 (shown in FIG. 7) to set up and synchronise the parts of the receiver/decoder handling the bitstream to be recorded or played back. In parallel, the thread also interacts with the file system library 3852 to coordinate the recording or playback operation at appropriate places on the hard disk 2210 (not shown).

The file system library 3852 then sends commands to the mass storage device 3728 (also shown in FIG. 7) which tell the mass storage device 3728 which sub-transport stream (STS) to transfer (via a FIFO buffer), and on which hard disk target the stream should be stored. Allocation of clusters on the hard disk and general file management is carried out by the file system library 3852, the mass storage device itself being concerned with lower level operations.

The service device 3736 mentioned above is unique amongst the devices in that it does not relate to a physical component of the receiver/decoder. It instead provides a high level interface which groups together in a single 'instance' the various sets of tuner, demultiplexer, remultiplexer and hard disk devices in the receiver/decoder, freeing higher level processes from the difficulties of coordinating the various subdevices.

Figure 7:
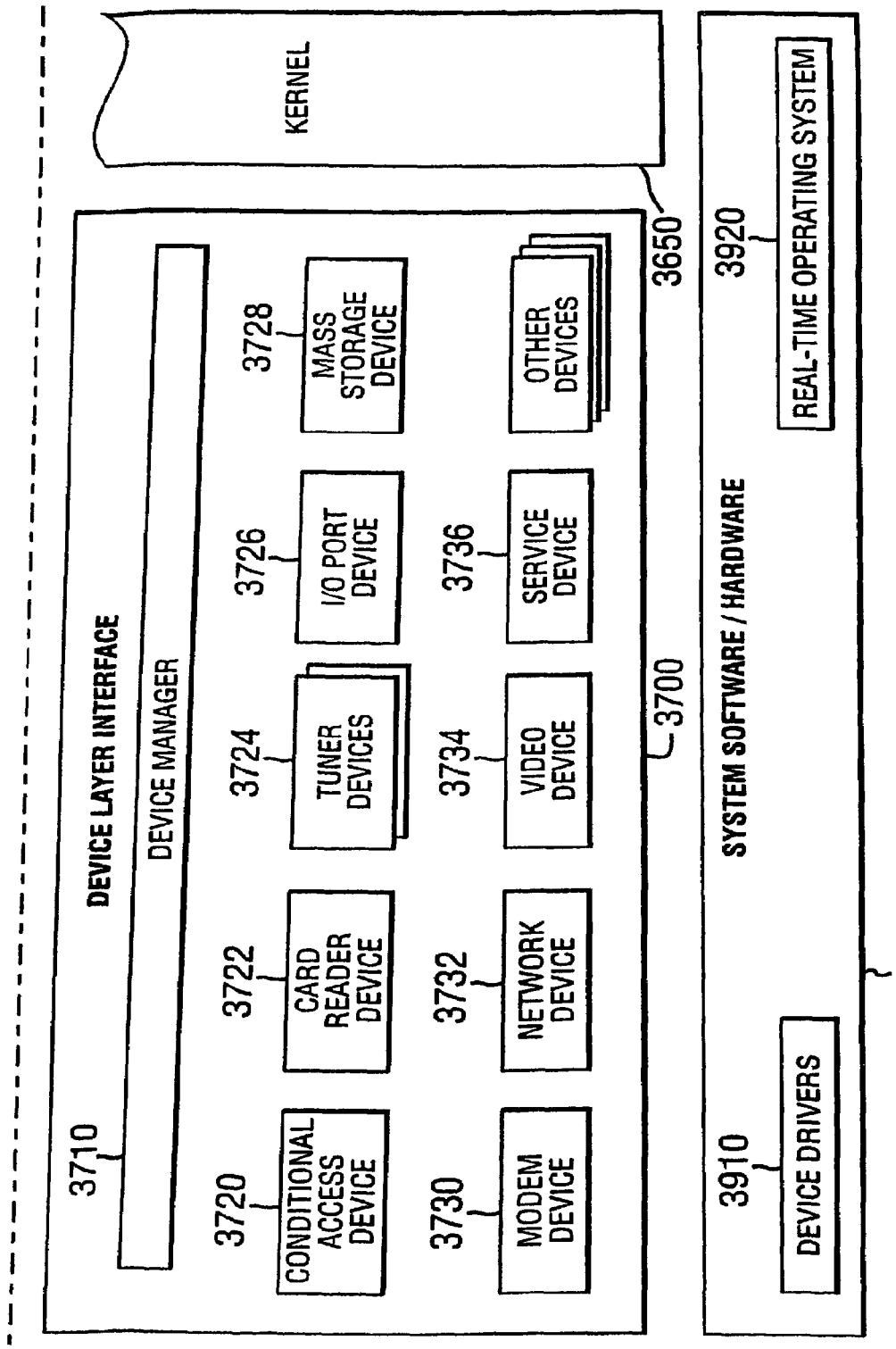
FIG. 7 is a diagram showing the bottom half of FIG. 5 in more detail.

With reference to FIG. 7 the software architecture of the receiver/decoder 3000 corresponding to the bottom half of FIG. 5 (comprising the device interface layer 3700 and the system software and hardware layer 3900) will now be described in more detail.

Further devices provided in the device layer include the conditional access device 3720, tuner devices 3724 corresponding to the two (or potentially more) tuners 2016, 2018 of FIG. 4, the video device 3734, the I/O port device 3726, and the service device 3736 and mass storage device 3728 mentioned above.

In broad terms, a device can be regarded as defining a logical interface, so that two different devices may be coupled to a common physical port. Certain devices may communicate among themselves, and all devices also operate under the control of the kernel 3650.

Before using the services of any device, a program (such as an application instruction sequence) has to be declared as a "client", that is, a logical access-way to the device or the device manager 3710. The manager gives the client a client number which is referred to in all accesses to the device. A device can have several clients, the number of clients for each device being specified depending on the type of device. A client is introduced to the device by a procedure "Device: Open Channel". This procedure assigns a client number to the client. A client can be taken out of the device manager 3710 client list by a procedure "Device: Close Channel".

The access to devices provided by the device manager 3710 can be either synchronous or asynchronous. For synchronous access, a procedure "Device: Call" is used. This is a means of accessing data which is immediately available or a functionality which does not involve waiting for the desired response. For asynchronous access, a procedure "Device: I/O" is used.

This is a means of accessing data which involves waiting for a response, for example scanning tuner frequencies to find a multiplex or getting back a table from the MPEG stream. When the requested result is available, an event is put in the queue of the engine to signal its arrival. A further procedure "Device: Event" provides a means of managing unexpected events.

Figure 8:
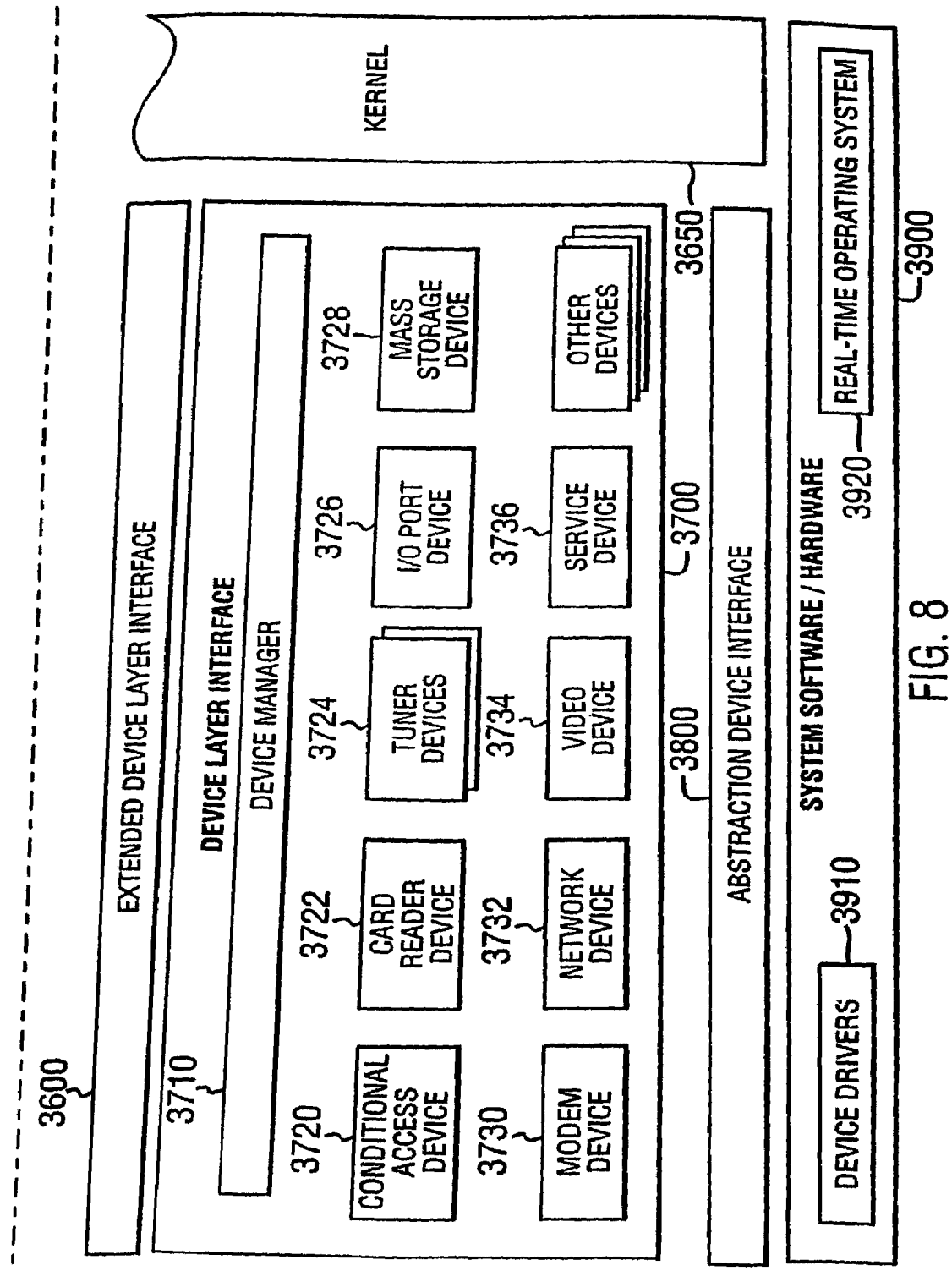
FIG. 8 is a diagram showing an alternative embodiment of the bottom half of FIG. 5.

In a second embodiment of the receiver/decoder, the lower half of the architecture of the receiver/decoder is replaced by the layers shown in FIG. 8.

In this embodiment, an extended device layer interface (EDLI) 3600 is provided between the virtual machine 3500 (not shown) and the device interface layer 3700, and an abstraction device interface 3800 is provided between the device interface layer 3700 and the system software/hardware layer 3900. Otherwise, like parts are indicated with like reference numerals.

The extended device layer interface (EDLI) 3600 provides a dedicated interface between the virtual machine 3500 and the device interface layer 3700 and generally provides multithreading support to the device interface layer. Functions of the EDLI include routing asynchronous events to the appropriate thread in the middleware (since the device interface layer need not itself support multithreading) and routing messages between threads.

The abstraction device interface 3800 provides a further interface between the device interface layer 3700 and the device drivers 3910 in the system software/hardware layer 3900. By providing such an interface, the large and complex device layer 3700 can be made hardware independent to a greater degree.

Content Management and Protection System (CMPS)

Figure 9:
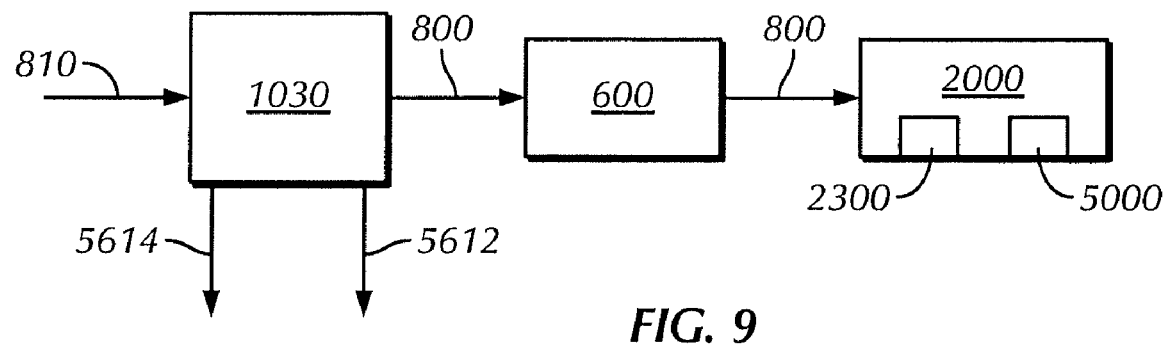
FIG. 9 is an overview of a content management and protection system.

With reference to FIG. 9, the content management and protection system (CMPS) 2300 mentioned above is distributed between the broadcast centre 1000 and the receiver/decoder 2000. The receiver/decoder component of the CMPS is provided in the form of a smartcard with associated smartcard reader, but in variants of the preferred embodiment is implemented solely in software or in other forms of hardware. The CMPS can ensure that only authorized users can record and playback content, in accordance with predefined usage rules.

An important part of the content management and protection system is the special Usage Rules Message (URM) which contains content management information relating to a given programme or transmission and is transmitted before such a programme or transmission. In essence, the Usage Rules Messages impose usage constraints on the playback and reproduction of the content, and can be directed only to specific portions of the content, such as separate 'chapters' within a programme, or to the content as a whole. Typical usage rules include restrictions on time-shifting, fast-forwarding, number of times a recording can be played back, and available reproduction modes. Another important feature, which will be described in more detail below, is that URMs relating to a given programme may be sent independently (from different locations and at different times) from the corresponding content or conditional access information.

A second class of message, the CMPS Entitlement Management Message (CMPS EMM, or CMP_EMM), is provided to transmit access rights to the CMPS. The CMPS EMM is equivalent to the conditional access entitlement management message (EMM, or CAS_EMM) referred to elsewhere, but the transmitted access rights relate to the local storage of programme data rather than broadcast programme data, as with the 'conventional' EMM.

In the preferred embodiment, shown in FIG. 9, the multiplexer and scrambler 1030 receives the CMPS EMMs 5614 and URMs 5612, multiplexes them with the bitstream containing the unscrambled content (programme data) 810 and broadcasts the resulting scrambled content 800 via the broadcast system 600. The receiver/decoder then receives the scrambled content 800, and removes and passes the CMPS EMMs and URMs to the CMPS 2300 and conditional access system 5000 as appropriate.

The URMs are encrypted with a URM exploitation key, which in a variant of the preferred embodiment is the same as the ECM exploitation key. An equivalent of the URM exploitation key is maintained in the receiver/decoder CMPS smartcard (not shown) to allow the URMs to be decrypted.

As mentioned above, access rights which allow a user to record and/or playback using the receiver/decoder are provided in the form of CMPS Entitlement Management Messages (CMPS EMM or CMP_EMM); CMPS EMMs can have the same structure as conventional EMMs, but are generally more key-oriented—a CMP_EMM typically embeds a key associated with a content or service. Rights to playback recorded content are granted in return for one-off payments (impulse purchases) or subscriptions. Various levels of access rights can also be granted in relation to any content, whereby a user could, for example, pay a first fee in exchange for the rights to replay content once, or pay a second, higher, fee in return for unlimited replays. CMP_EMMs are typically stored in the receiver/decoder CMPS smartcard, but may be stored elsewhere, such as in a conditional access smartcard, for example.

In the preferred embodiment, rights to replay a recording can either be obtained after the recording is made (the 'pay-per-view' model), or prior to the recording (the 'subscription' model). In the former case, after recording the content, the user instructs the conditional access system that he wishes to obtain the rights to playback the content. If the instruction is authorised by the subscription management system, the appropriate CMPS Entitlement Management Message ("CMP_EMM") is then transmitted to the receiver/decoder via the bidirectional link.

One of the many advantages provided by the CMPS system is that the access rights for recording and playing back programmes are entirely independent of the access rights for simply viewing the programmes, as in conventional systems. Thus, one could have the situation where one could view a programme but not record it and play it back, and conversely one could be unable to view a programme, but one could record it, obtain the necessary rights and then play it back.

Figure 10:
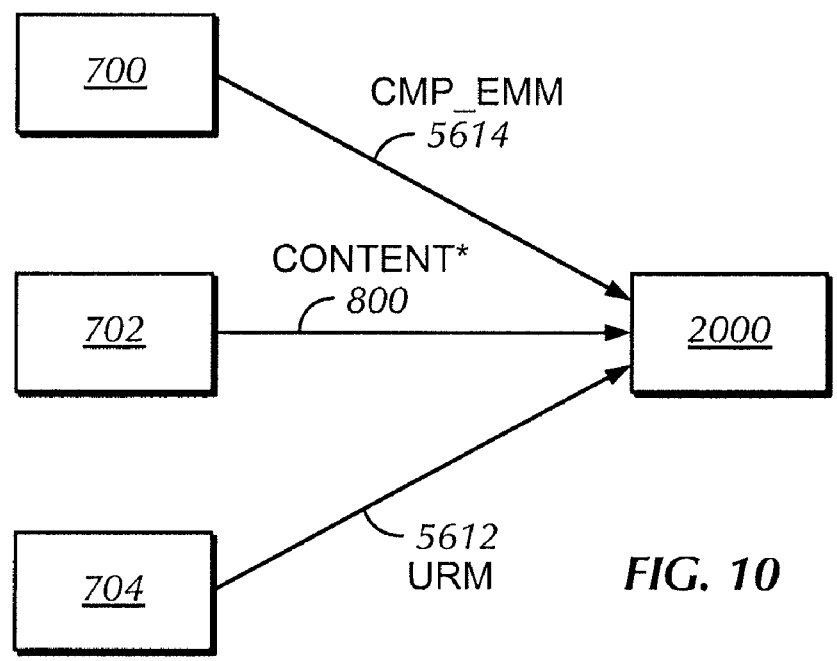
FIG. 10 is an alternative arrangement of the content management and protection system.

In a variant of the preferred embodiment particularly typical of an internet distribution model, shown in FIG. 10, the scrambled content ("CONTENT*"), CMPS EMM ("CMP_EMM") and URMs ("URM") are all delivered independently to a receiver/decoder 2000, from a first party 1200, second party 1202 and third party 1204. The first, second or third party may be, for example, a multi access portal (MAP), and the scrambled content 1300, CMPS EMMs 5614 and URMs 5612 may be delivered. Typically, a programme provider (the second party 1202) sends programme content ("CONTENT") to the multiplexer/scrambler, where the scrambled content 1300 (CONTENT*) is generated and then transmitted to the receiver/decoder 2000 in the usual fashion.

Figure 11:
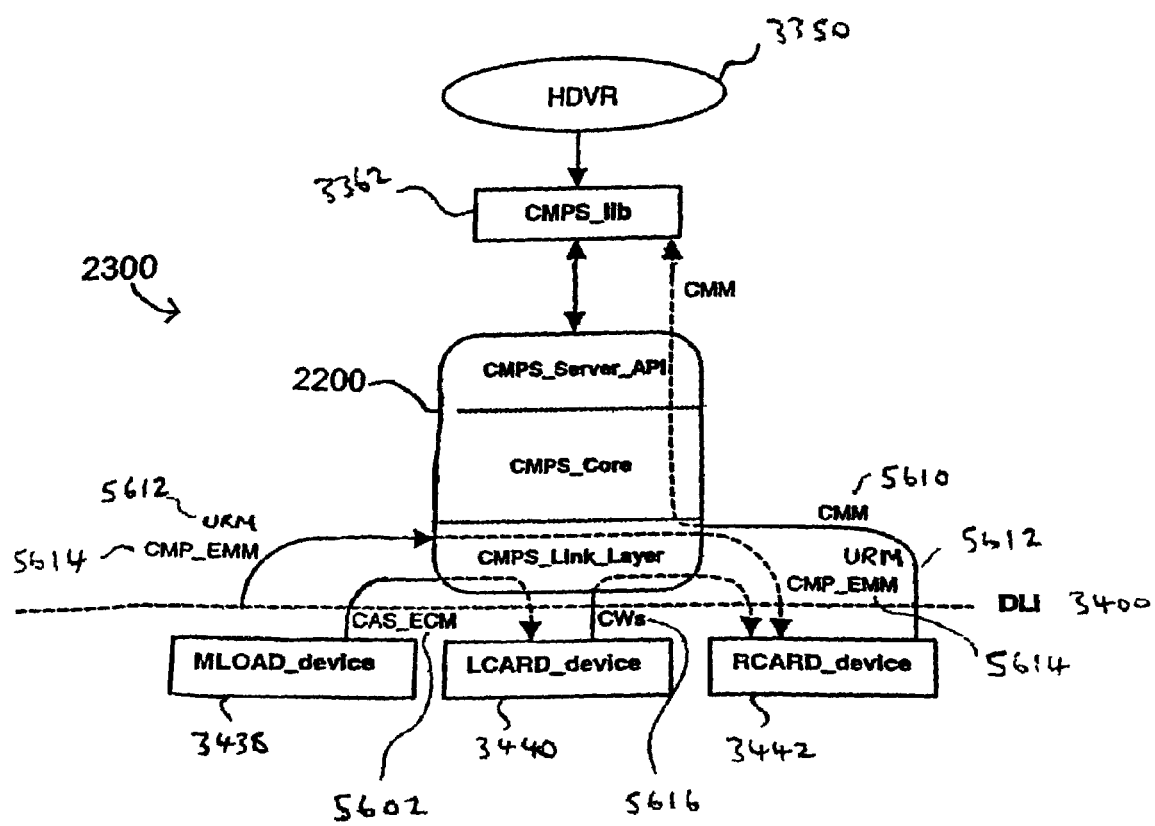
FIG. 11 is an illustration of the software architecture of the content management and protection system.

With reference to FIG. 11, the implementation of the CMPS at the receiver/decoder 2000 will now be described.

A CMPS server module 2200 is provided in the receiver/decoder middleware, and comprises a CMPS server API, a CMPS core and a link layer. The CMPS server module 2200 interfaces with a CMPS library 3362, and interfaces indirectly with the HDVR controller 3350. The CMPS server module 2200 also interfaces with the MLOAD device 3438, the LCARD device 3440 (housing the conditional access smartcard), and the RCARD device 3442 (housing a CMPS smartcard).

In operation, ECMs 5602 received in the programme data stream are isolated by the MLOAD device and then routed by the CMPS link layer to the conditional access smartcard. Control words 5600 derived from the ECMs are then routed to the CMPS smartcard, along with corresponding URMs 5612 and CMPS EMMs 5614,(which are preferably also received in the programme data stream, but may be received via other routes). The CMPS smartcard then combines and encrypts the three items of data to form content management messages 5610 (CMMs) which are then passed to the CMPS core for further processing. In response to appropriate requests, the CMMs are then passed to the HDVR controller 3350 so that they can be stored on disk along with the corresponding content data.

Figure 12:
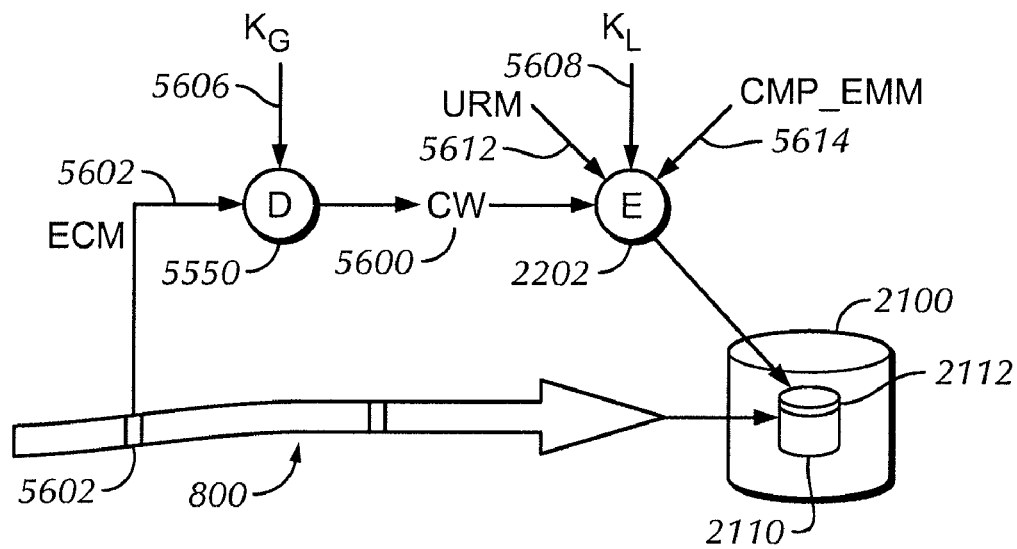
FIG. 12 is an illustration of the recording of encrypted content to a mass storage device.

In the process of recording content to disk, illustrated in FIG. 12, each ECM 5602 is passed to a decryption stage 5550 in the conditional access smartcard, where it is decrypted using a general exploitation key KG 5606. The decrypted control word 5600 then passes to an encryption stage 2202 in the CMPS smartcard, where, it is combined into a content management message (CMM) with the corresponding URM 5612 and CMPS EMM 5614, and then re-encrypted as a whole using a local exploitation key KL 5608. The CMM is then stored in a separate file 2112 to the file 2110 used to store the unaltered, scrambled content in the hard disk 2100.

Figure 13:
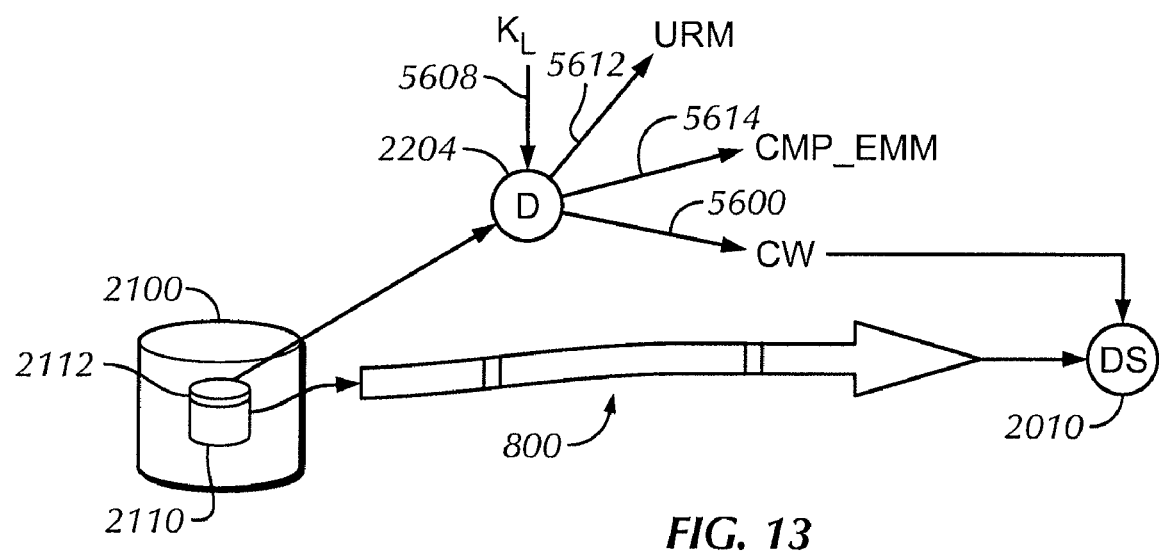
FIG. 13 is an illustration of the playback of encrypted content from a mass storage device.

In the reverse process of playing back content from disk, illustrated in FIG. 13, the scrambled content 1300 is read from the file 2110 on the hard disk 2100 and fed into the descrambler 2010. In parallel, CMMs are read from the separate file 2112 and fed into a decryption stage 2204 in the CMPS smartcard. The CMMs are decrypted with the local exploitation key 5608 and then split into the URM 5612, CMPS EMM 5614 and control word 5600. If the CMPS module decides that the user is entitled to view the material (on the basis of the URM and CMPS EMM), the control word 5600 is then sent to the descrambler 2010 at the appropriate time to allow the content to be descrambled.

Internal Format

Variable Bitrate Bitstream Transmissions

Transmissions received, processed and stored by the preferred embodiments are in the form of bitstreams, and the retrieval and processing of data from recorded bitstreams is dependent in part upon the characteristics of such bitstreams. The use of table of records, in particular HDVR and USER indices in particular embodiments, in such recordal and processing, particularly of files containing recordings of variable bitrate bitstreams, and the synchronisation, storage and retrieval of encryption information related to such files is described later. At this point the general characteristics of variable bitrate bitstreams are discussed briefly.

Figure 14:
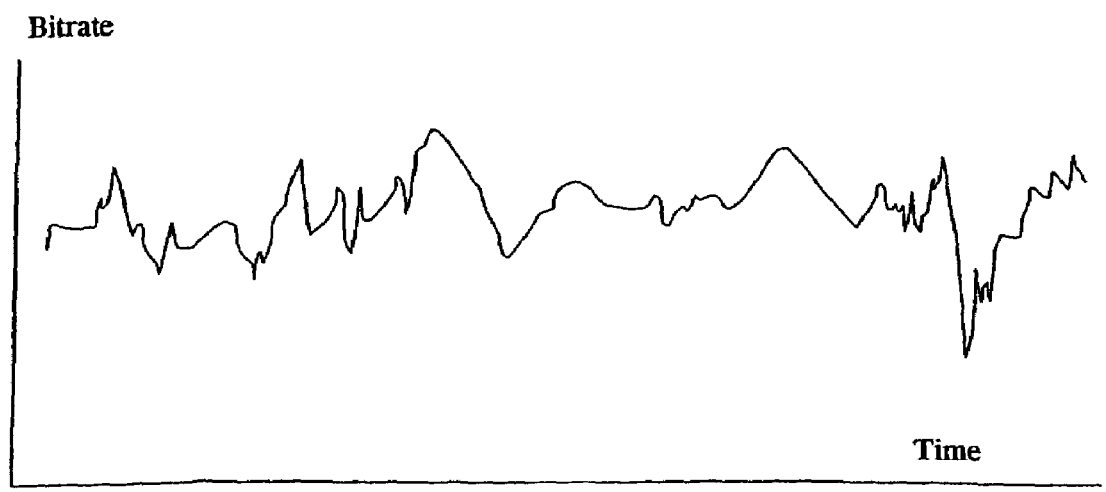
FIG. 14 is a graph of bitrate versus time for a variable bitrate bitstream.

FIG. 14 is a graph of bitrate versus time for a satellite TV transmission.

In various embodiments, variable bitrate bitstreams similar to those illustrated in FIG. 14 are received, transmitted and stored in or between computer devices, processors, A/D convertors, televisions, HDVRs, or storage devices for instance hard disks, tapes, computer storage devices, CDS, or DVDs. Such variable bitrate bitstreams include data in a variety of compression formats, including MPEG-2, MPEG-4, MP3 protected by different ciphering algorithms including DVB-CS, DES, 3DES, and contain video and or audio data, teletext information, subtitles, any other type of text information, computer data, or representations of such data.

Figure 15:
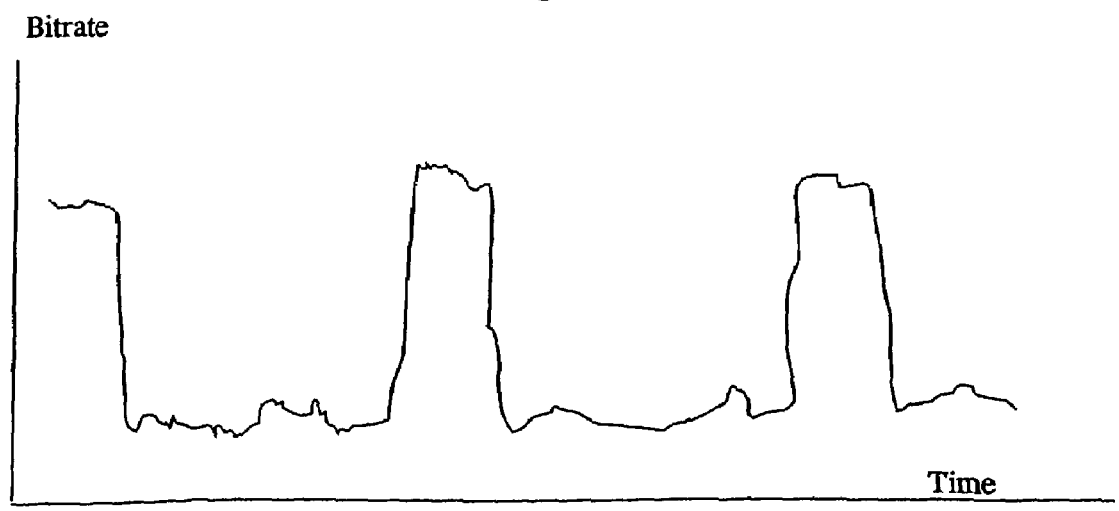
FIG. 15 is a schematic illustration of an MPEG-2 bitstream as a function of time.

FIG. 15 is an illustration of an MPEG-2 data stream as a function of time, showing schematically the position of key frames known as Intraframes (I-frames) 4500 and 4502, and delta frames in the form of B-frames, for instance at 4510, and P-frames, for instance at 4512 within the bitstream. The key frames can independently be used to regenerate a portion of audio/visual data, whereas the delta frames map changes from other frames and can be used to regenerate a portion of audiovisual data only in dependence upon such other frames. An interframe (P-frame) maps changes from the preceding frame, whereas a B-frame maps changes from either or both preceding and following frames. In MPEG-2 data streams, key frames are usually transmitted with a frequency of 2 Hz.

Figure 16:
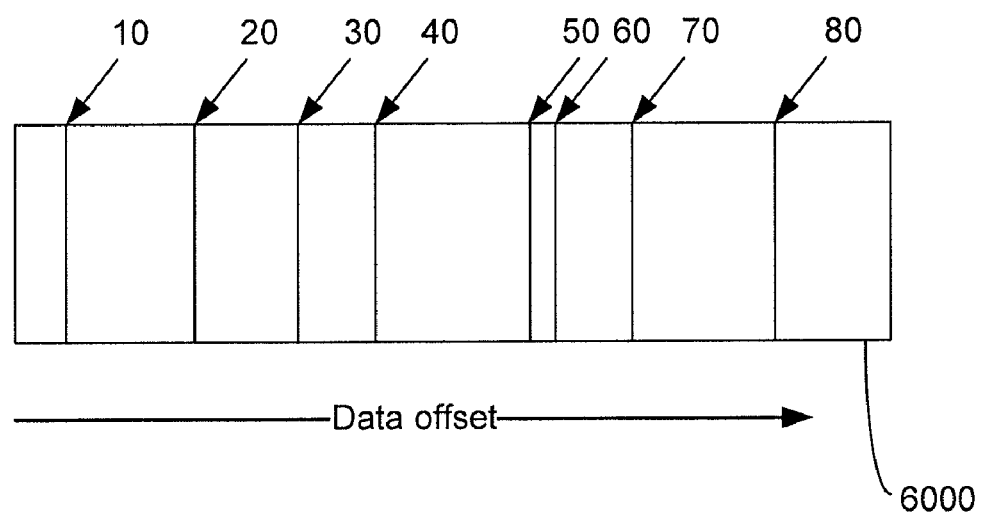
FIG. 16 is a representation of data offsets, with corresponding bitstream time offsets, for a file containing a representation of a variable bitrate bitstream.
Figure 17:
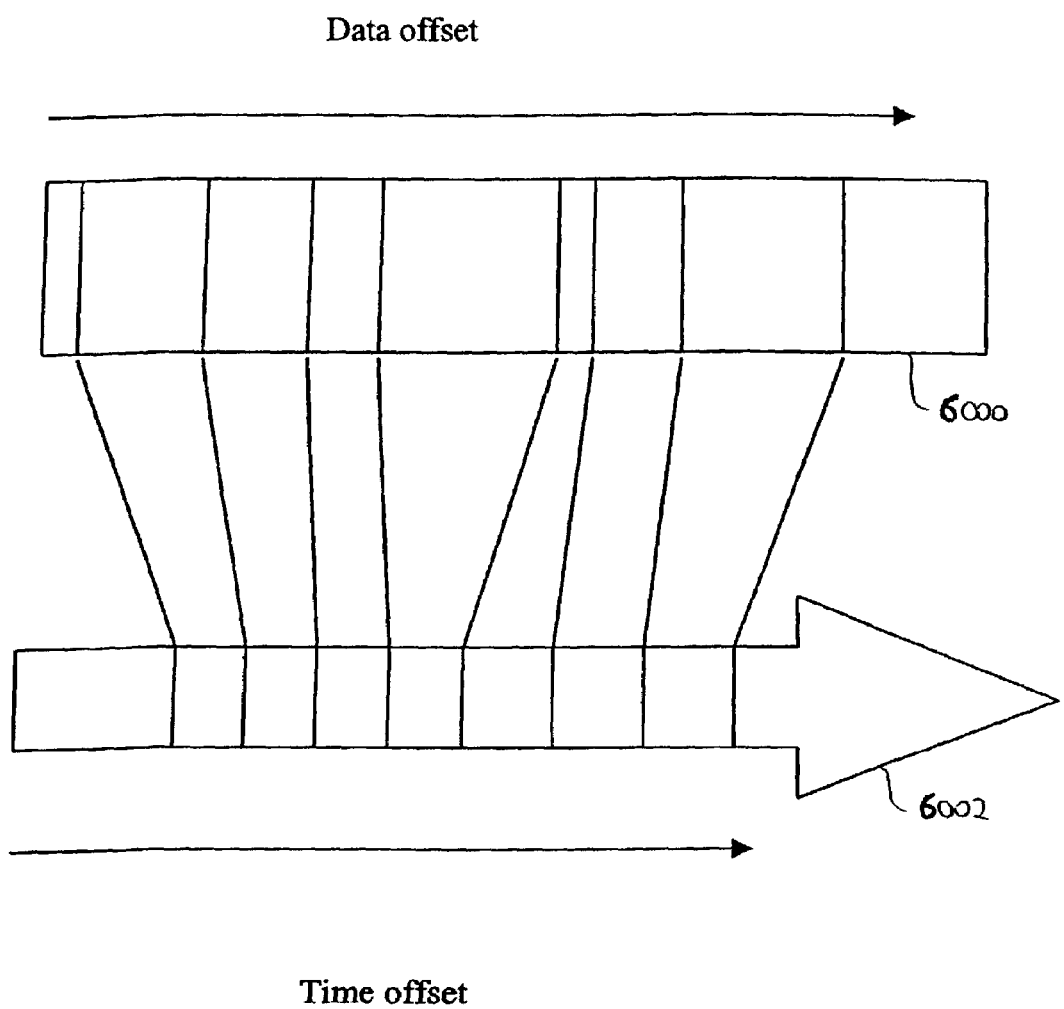
FIG. 17 is a schematic diagram showing the correspondence between points in a bitstream and points in a file comprising a representation of the bitstream.

Upon reception, the bitstream is generally stored as a data file in a data storage device, unless it is played out or retransmitted immediately without being stored. A data file 6000, including the correspondence between time offset in a bitstream 6002 and data offset in the data file is shown in FIGS. 16 and 17.

Further detail is now provided with respect to three general aspects of preferred embodiments:—
 the generation and use of index tables in the retrieval and processing of stored bitstreams
 the estimation of position in a bitstream, and the synchronisation of conditional access information with the bitstream
 command sets for controlling the transfer of a bitstream Beginning with the generation and use of index tables in the retrieval and processing of stored bitstreams, the structure and content of stored bitstreams, in the form of files stored by an HDVR, are first examined.

Structure of HDVR Files

Looking at the structure of stored data in more detail, HDVR files comprise both management data (referred to in the following as hdvr_management_data) and content data (referred to in the following as hdvr_content_data). The management data and the content data are stored at the HDVR either as separate parts of the same file, or as separate files.

The hdvr_content_data comprises a stored transport stream (STS), which is discussed in more detail below. Firstly, however, the hdvr_management_data is examined in more detail.

The hdvr_management_data comprises CMMs as described above (typically in the form of a dedicated two dimensional table), and typically also comprises the following tables:—
 Index table
 Chapter table
 Private PMT table
 Parental Control Data table
 Maximum Values table
 General Information table The Maximum Values table allows the specification of the storage structure of all of the HDVR tables, apart from the Maximum Values table itself and the General Information table.

In preferred embodiments, the HDVR management data always comprises:
 firstly, the General Information table
 secondly, the Maximum Values table
 thirdly, other HDVR tables, such as Private PMT tables, Chapter tables.

For each elementary part of the hdvr_file.management_data, there is a writing function and a playing function which each encapsulate a jump in the file and the operation to be executed.

Each of the above tables is described in more detail below, but firstly the structure and content of the Index table, and its use in performing operations on recorded content is examined in more detail.

HDVR Index Table and Operations Performed by the HDVR on a Recorded Bitstream

Further detail is now provided concerning the HDVR index table, comprising HDVR and USER indices, and operations performed by the HDVR on a recorded bitstream using the HDVR index table.

The HDVR index table allows the mapping between at least one time offset (in seconds, divided into cryptoperiods) in a bitstream and at least one file offset in an STS containing a representation of the bitstream. Typically, the bitstream is a variable bitrate bitstream, as described previously.

The indices in the HDVR index table are separate from the CMM indices and have associated with them a CMM or cryptoperiod number, a time in seconds and a file offset number. Knowing the file offset number, the HDVR index table can be used to look up the file offset position with respect to a time in seconds or cryptoperiods, without the need for potentially time-consuming binary searching using dichotomical algorithms which falls down with a change in bit rate. The change in time is the time between samples.

Processing recorded content, for instance searching for points in a file, or a corresponding bitstream, and "trick mode" operations such as fast forwarding, rewinding, and skipping make use of HDVR and USER indices stored in the HDVR index table. Generally, the HDVR indices are inserted automatically by the HDVR, and the USER indices are inserted upon command of a user.

In preferred embodiments, as described above, the HDVR index table is stored in the hdvr_file_management_data part of a HDVR file. In variants of such preferred embodiments, an HDVR index table is stored in a separate file, or in other locations within an HDVR file.

As described above, various other data is stored in the hdvr_file_management_data part of a HDVR file in preferred embodiments. In particular, the conditional access information is stored as a CMM table in hdvr_file_management_data, and entries in the index table are mapped to entries in the CMM table, so that data at points in an HDVR file indexed by the HDVR or USER indices may be decoded using corresponding entries in the CMM table.

In preferred embodiments an HDVR index table is generated by an HDVR automatically during the recording of a programme. Alternatively, an HDVR index table, or a further such table, is generated upon command after recordal of a programme.

HDVR Indices

The HDVR indices are positioned at regular intervals by the HDVR and are used as play entry points in the recorded file (in the case of internal encryption). They correspond to the granularity of the play positioning. For each CMM family, corresponding to a recorded file or programme, each HDVR index therefore points to at least one applicable CMM, and its position in the file is identified by a block number (file granularity).

In the case of multiple commercial offers relating to multiple recorded content, there may be a plurality of CMM sets for one entry point. For instance, a user can pay for a special language version with related audio data which is stored in the STS but which is ciphered with another CMM set. Therefore, in this instance at least two CMMs would be required for each index entry point.

In preferred embodiments, the HDVR indices are generated and stored in real time during the recordal of a programme. A recording comprises no more than MaxHdvrIndexNumber indices.

The HDVR indices are generally positioned at periodic time offsets-in the bitstream. In preferred embodiments, the bitstream comprises data compressed according to the MPEG-2 protocol and according to this protocol key frames, known as intraframes, are located every 0.5 seconds in the bitstream. As described above, such key frames may be used to regenerate a portion of audiovisual data, for instance a frame in a film, independently of other portions of data in the bitstream. The HDVR indices in such embodiments have time offsets which are distributed with a period of 0.5 seconds, and the indices correspond to the beginning of each key frame.

In variants of the preferred embodiments, the HDVR indices are positioned with time offsets with different periods, and in some variants such periods are varied both upon command of the user, and automatically by the HDVR.

USER Indices

The USER indices are positioned by the client and are also play entry points. As mentioned above, the play granularity is the HDVR index, and in preferred embodiments the user indices are based on these HDVR indices. It is straightforward to recover using the HDVR indices, the CMM applicable to the USER index by CMM family.

The USER indices are set at the time of recording of a programme or playback of a recorded programme. In particular embodiments the number of such USER indices is limited, and a recording comprises no more than MaxUserIndexNumber indices.

In preferred embodiments, the bitstream comprises MPEG-2, MPEG-4 or MP3 data, although in other embodiments the bitstream may comprises data in a variety of other compression formats.

Bitstream Operations Using HDVR and USER Indices

The HDVR and USER indices are used to perform a variety of operations on the STS.

Searching

Figure 18:
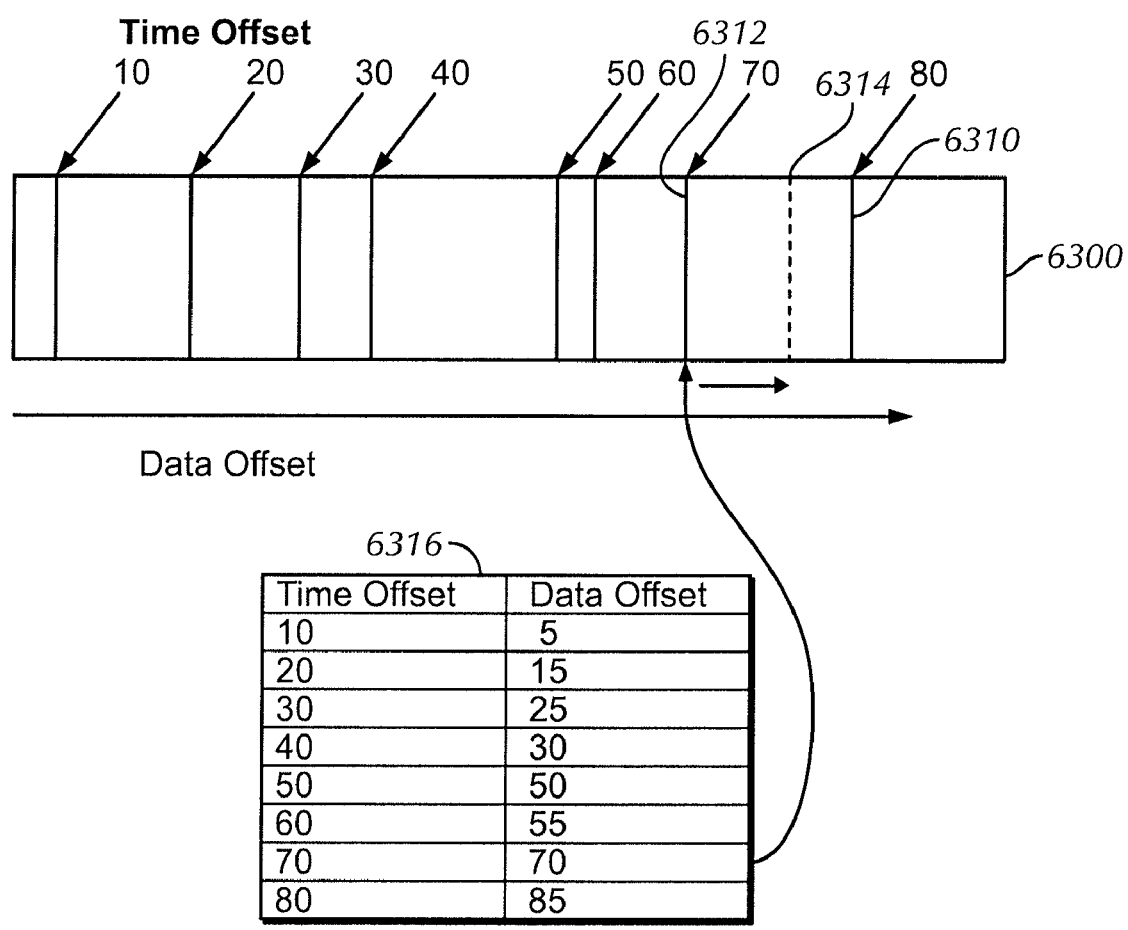
FIG. 18 is a schematic diagram illustrating searching for a point in file using HDVR indices.

For instance, as illustrated in FIG. 18, the HDVR and USER indices are used to find preferred points in an HDVR file 6300, corresponding, for instance, to preferred time offsets in a corresponding bitstream. The closest point 6310, or more usually the closest preceding point 6312, in the file to the preferred point 6314 is located in an Index table 6316 of HDVR and USER indices, by the HDVR, and the file is searched from this point by the HDVR to find the preferred point. Generally, the searching is performed by decoding (for instance using corresponding entries in a CMM table) and reading data from the indexed point onward until the preferred point is found In some variants indexed points correspond to preferred points, and in such variants a search is performed merely by jumping to the appropriate indexed point.

In alternative embodiments, if a preferred point which is the subject of a search falls between points in the file referenced by two HDVR or USER indices, the file is searched from a point intermediate between the two indexed points. This intermediate point is located by linear interpolation between the two indexed points. In variants of such embodiments, the intermediate point is located by using other data interpolation techniques or by fitting indexed points to alternative functions, such as polynomial or exponential functions, or cubic spline functions. In such variants, further indexed points in addition to the two indexed points adjacent to the preferred point are used to locate the intermediate point.

Trick Mode Operations

In preferred embodiments, HDVR indices correspond to periodically spaced points in time in a bitstream. "Trick mode" operations, such as fast forwarding and rewinding, are performed by the HDVR, by locating, using the HDVR indices, decoding, and displaying data in a file corresponding to such periodically spaced points in time in a bitstream.

The speed of, for instance, rewinding or fast forwarding is varied in preferred embodiments by varying the rate at which the stored bitstream is played back. Typically, not all of the bitstream data is played back during a rewinding or fast forwarding operation, but rather selected portions, usually equally spaced in time in the bitstream, are played back. The rate at which data is read from the file can be varied for any particular rewinding or fast forwarding speed by varying the proportion of data in the bitstream which is played back. In preferred embodiments, the speed of rewinding or fast forwarding is varied upon command of a user.

Figure 19:
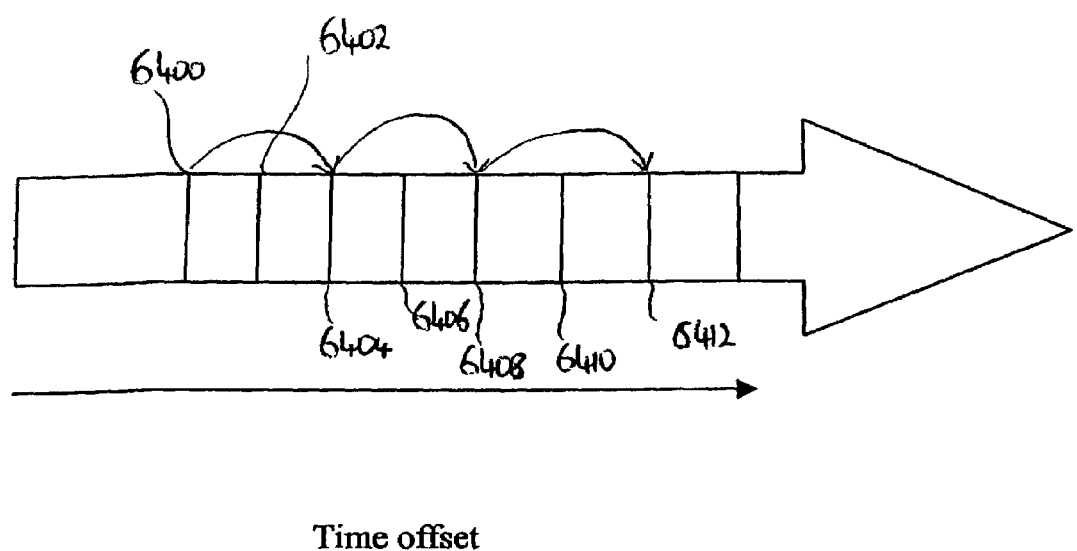
FIG. 19 is a schematic diagram illustrating a fast-forwarding operation comprising skipping between periodically spaced points in a bitstream.

By way of example, a fast forwarding operation is illustrated in FIG. 19. The HDVR locates using HDVR indices, decodes, and displays data at points in a file corresponding to equally spaced points in time 6400, 6404, 6408 and 6412 in a bitstream. Points 6402, 6406, and 6410 which also correspond to HDVR indices are skipped. In variants of the embodiment, the HDVR varies the speed of rewinding or fast-forwarding by varying the rate at which the selected points 6400, 6404, 6408, and 6412 are decoded and displayed, and by varying the points which are selected.

In preferred embodiments, if the bitstream is an MPEG bitstream, the HDVR indices map to the beginning of key frames (I-frames in the case of MPEG-2), which can be used to regenerate portions of, in particular, audio/visual data independently of any other portion of data. Applying FIG. 18 to these variants, the locations of key frames coincide with at least some of the HDVR indices' locations 6312. Fast forwarding and rewinding is performed rapidly by locating key frames in a file located at equally spaced time intervals or offsets in the corresponding bitstream by looking up the HDVR indices.

Figure 20:
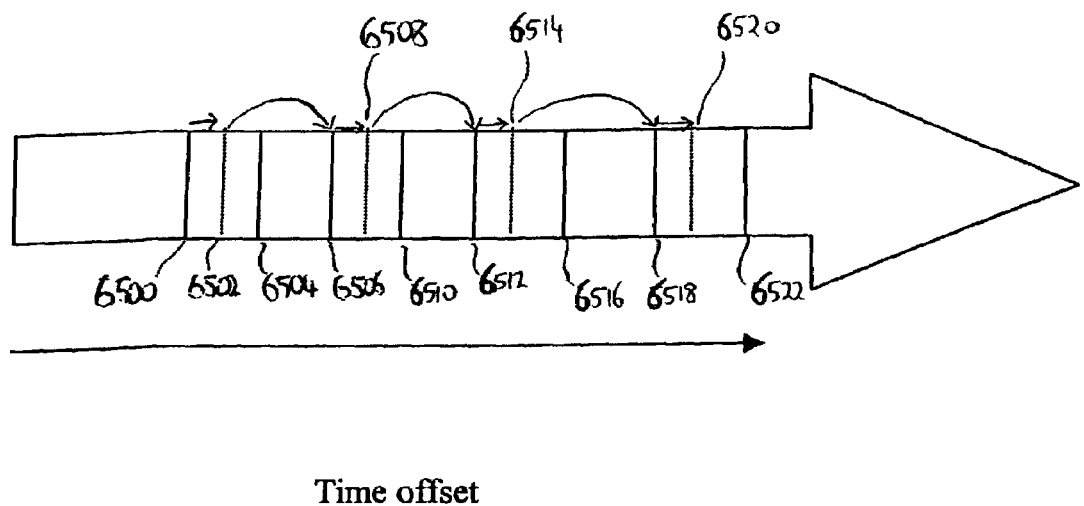
FIG. 20 is a schematic diagram illustrating a fast-forwarding operation comprising skipping between periodically spaced points in a bitstream, and locating the closest following key frames to these periodically spaced points.

In variants of the preferred embodiments, the HDVR indices, or USER indices, do not necessarily map directly to key frames. As illustrated in FIG. 20, indices reference time offsets 6500, 6504, 6506, 6510, 6512, 6516, 6518, and 6522 in the bitstream, and corresponding data offsets in a file containing a representation of the bitstream. Key frames are located at time offsets 6502, 6508, 6514, and 6520 in the bitstream (and representations of these key frames are located at corresponding data offsets in the file), but the indices do not reference these time offsets.

FIG. 20 also illustrates a fast forwarding operation in such an embodiment. The HDVR locates, using the indices, points in the file corresponding to points 6500, 6506, 6512 and 6518 in the bitstream. Points 6504, 6510, 6516, and 6522 which are also referenced by HDVR indices are skipped. Upon location of the point in the file corresponding to 6500, the HDVR decodes the data in the file at this point, using the appropriate CMM from the CMM table, and then proceeds to decode the following data in the file, until it locates data representing the key frame at 6502 in the bitstream. The key frame is then displayed by a display device linked to the HDVR. The HDVR proceeds to locate points in the file corresponding to 6506, 6512 and 6518, and to locate data representing key frame at 6508, 6514, and 6520. These key frame are displayed on the display device in sequence.

In further variants, indices reference points in a bitstream, and corresponding points in a file, which coincide with the start of cryptoperiods.

In a further embodiment, a representation of a bitstream is stored on a DVD with a table of indices mapping data offsets in the bitstream to data offsets in stored representation on the DVD. As with the HDVR embodiment, the indices correspond to periodically spaced points in time in the bitstream. In variants of this embodiment, USER indices are stored in the table of indices. The table of indices is read by a DVD player, or any device adapted to read DVDs.

Performance of Trick Mode Operations in Dependence upon Hardware Characteristics The maximum speed of operation of particular trick mode operations, such as fast forwarding or rewinding, is dependent upon the maximum frame rate supported by system hardware, and is in particular dependent upon read/write hard disk access time, parsing demultiplexer bandwidth, and operating system scheduling accuracy.

In preferred embodiments, the HDVR supports any fast forwarding or rewinding speed in an allowed range, for instance between ×1/128 and ×128, despite any variation in hardware quality, by estimating the maximum frame rate allowable by particular hardware, and selecting points in the index table, and subsequently extracting frames corresponding to these points from the STS, in accordance with such maximum frame rate, and with the requested fast forwarding or rewinding speed. Typically, the maximum frame rate is determined by a read/write hard disk access time, a parsing demultiplexer bandwidth, or an operating system scheduling accuracy.

So, referring back to FIG. 19, for hardware of given characteristics able to support a particular frame rate, and for a given rewinding or fast forwarding speed, the HDVR locates using HDVR indices, decodes, and displays data at points in a file corresponding to equally spaced points in time 6400, 6404, 6408 and 6412 in a bitstream. Points 6402, 6406, and 6410 which also correspond to HDVR indices are skipped. However, in a variant (not shown) in which the hardware can only support a lesser frame rate, only data at points 6400 and 6412 is located, decoded and displayed, and data at points 6404, 6402, 6406, 6408, and 6410 is skipped. The rewinding or fast forwarding speed is the same in both cases, as the time taken to display data between points 6400 and 6412 in the bitstream is the same, although the smoothness of the rewinding or fast forwarding may be degraded in the second case.

In preferred embodiments, a processor assesses the characteristics of the system hardware and calculates the maximum frame rate dynamically. In variants of such embodiments, the processor also assesses the characteristics of a stored bitstream in calculating the maximum frame rate allowable.

Alternatively, characteristics of the system hardware, and the maximum frame rate allowable, are pre-stored at the HDVR. In further variants, the rate at which data is read from a file during a fast forwarding or rewinding operation is not varied, and in some such variants all such data is read.

Automatic Generation of Index Tables in Dependence upon Bitstream Characteristics In preferred embodiments indices, such as USER indices and HDVR indices, are created or deleted automatically in dependence upon analysis of characteristics of bitstream data by a processor. For instance, in one variant such a processor included in an HDVR creates indices corresponding to portions of a bitstream where the bitrate is within a particular range of values. Such values can be set by operation of a user-defined algorithm.

Figure 21:
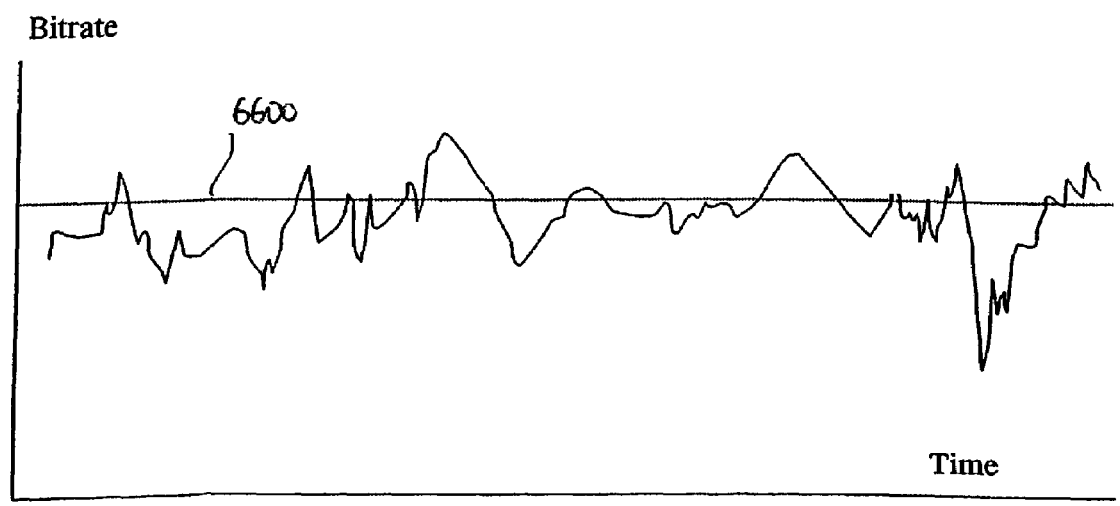
FIG. 21 is a graph of bitrate versus time for a variable bitrate bitstream, showing portions of a bitstream above a selected value.

By way of example, in one variant, as illustrated in FIG. 21, indices are created at points where the bitrate rises above a particular value 6600, set by a user. The portions of the bitstreams commencing at these points may correspond, for instance, to an action sequence in a film. In further variants, the processor is programmable, and the dependency upon analysis of characteristics of bitstream data can be varied.

In further variants, a processor analyses user actions and creates or deletes indices, including USER indices and HDVR indices, in dependence upon this analysis. The processor is programmable and this dependency can be varied. In one example of such dependency, more indices are created corresponding to points in a bitstream upon which a user is performing a large number of actions.

In further variants, data is inserted upon the command of the user into a table, or into an associated table or file, and this data is associated with particular data offsets or associated time offsets referenced by USER indices, or HDVR indices. Such data includes comments to be displayed on a screen, and commands, such as television control commands, and in particular includes data which activates or deactivates a parental control mechanism. Such parental control mechanism is generally directed to particular chapters, but in certain variants it is also directed to cryptoperiods and pluralities of cryptoperiods, and user defined portions of a file. In some such variants a user can select particular scenes within a recorded film to which they wish to control access.

Output Data

Generally, data located in an HDVR file using the HDVR and USER indices is decoded, for instance using a CMM table as described above, and decompressed, if it is subject to a compression protocol such as MPEG, and is output to a display device, generally a TV screen. However, in certain embodiments, such data can also be output to a mass storage device, or to a processor, with or without being decoded or decompressed.

Further detail is now provided concerning the structure and generation of index tables, and the use of index tables in playing back encrypted content.

HDVR and USER indices are stored together in the same table referred to as an index table, Index_Table( ), as discussed above.

The HDVR part of the index table is a one-dimensional array of temporally periodic successive HDVR index descriptors.

Each HDVR index descriptor contains the following information:—
  a file offset (HdvrIndexAddress[1 . . . MaxHdvrIndexNumber]) (in numbers of blocks) in the content part, hdvr_file_content_data, of the HDVR file which defines the HDVR index position. The STS is divided into blocks, and the STS portion pointed to by the file offset corresponds to a time-date (measured from the beginning of the STS) that is proportional to the HDVR index position into the HDVR index descriptor array. The $n^{th}$ index maps to a point which corresponds to n×Hdvr_time_stamp seconds having passed since the start of the STS;
  an array of CMM family indices (HdvrIndexCMM[1 . . . MaxHdvrIndexNumber] [1 . . . ComponentNumber]) that define which CMM descriptors (CMM_Id) are required to decipher the portion of the STS pointed to by the particular HDVR index. For each of the Component-Number components (video, audio, teletext) a reference to the CMM_id of the corresponding CMM_(table is given for each index, facilitating trick modes during subsequent reading;
  the chapter identifier to which the HDVR index belongs; and
  the private PMT identifier (HdvrIndexPMTVersion[1 . . . MaxHdvrIndexNumber) that is used to demultiplex correctly the STS portion pointed to by the HDVR index.

The USER index part of the index table, of maximum size MaxUserIndexNumber, is a one-dimensional array of USER index descriptors. Note that USER indices are not sorted by time. Each USER Index (UserIndex[1 . . . MaxUserIndexNumber) is, as a matter of fact, a reference to a particular HDVR index, which corresponds to a particular STS play entry point. Each USER index contains the following information:
  a status that defines whether the USER index is either enabled or disabled; and
  the HDVR index reference (HdvrIndex_Id) corresponding to the time-date that a user wanted to bookmark (taking the origin as the beginning of the STS). Note that this information is relevant when the relevant status is enabled.

Creation of Index Tables
  The index table is constructed in two stages:
  the HDVR Index table is calculated by the hdvr_recorder upon recording of a file
  the User Index table is empty after the first recording; it is only during reading a command is sent to the hdvr_player to insert the User Index.

Figure 22:
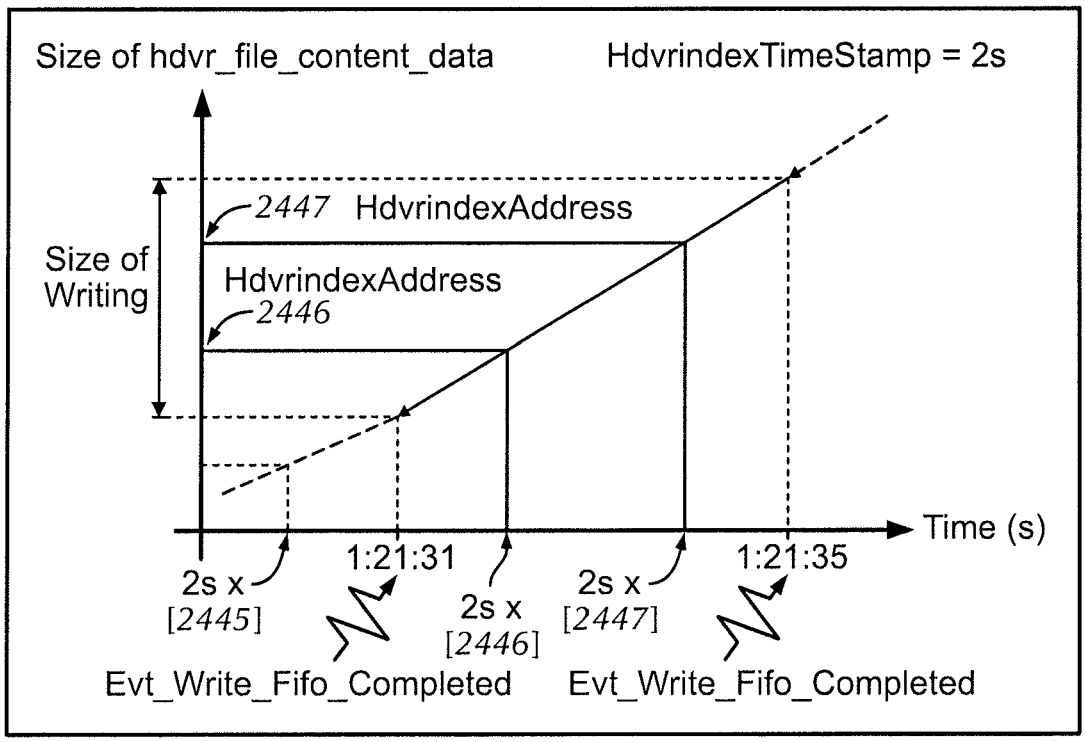
FIG. 22 is an illustration of the interpolation of HDVR index points upon recording.

Creation of an Hdvr Index Table by hdvr_recorder
  The Hdvr Index table is calculated and updated upon each reading of the disc:
  the principle of calculation of the index points, HdvrIndexAddress[n], is based upon a linear interpolation between two readings of index position, as illustrated in FIG. 22.
  The corresponding CMMs, ComponentNumber CMM_Id, are themselves calculated at the end of each reading. In scrutinising each CMM_table, one compares the position, HdvrIndexAddress, of the current index with the position, in BlockNumbers, of the last CMM, identified by CMM_id, of each table. Two cases are possible:—
  either, HdvrIndexAddress>BlockNumber[CMM_number], which signifies that the index is actually that of the last CMM, in which case HdvrIndexCMM=CMM_number
  or, there exists a CMM_id in the CMM_table such that BlockNumber[CMM_id]
    <HdvrIndexAddress<BlockNumber[CMM_Id+1], in which case HdvrIndexCMM=CMM_Id
  Note that the size of the file being a monotonically increasing function, the interpolation of an index will always give a position behind the writing pointer at all times.
  HdvrIndexPMTVersion is a counter which increments its value each time the PMT table is modified. This number refers to a structure that links together all the information linking PIDs/Components. The value is updated for each index.

Creation of the User Index Table by the hdvr_player
  The User Index table is filled upon reading of the file. The user sends an insertion of index command, via an Application, and it falls to the HDVR to place appropriately the associated index point, UserIndex. In taking into account the User to Application to HDVR reaction times, one can simplify the positioning of the index by deciding to calculate it from an entry in the Hdvr Index sub-table; this is justified when the time spacing of index points (HdvrIndexTimeStamp) is sufficiently small (1 s or 1.5 s). Hdvr rounds the time/date of the sending of the insertion of the index to the closest multiple of HdvrIndexTimeStamp and then fills the UserIndex field indicating the identity of the corresponding Hdvr index point, HdvrIndex_Id.

Use of Index Tables

The role of the index table is to provide entry points for reading of a file, HdvrIndexAddress, as well as information relative to the local decryption, HdvrIndexCMM.

Two methods exist:

use of the index table alone use jointly of the index table and sections inserted during recording, ie: Evt_CAS_Ecm(1 . . . ComponentNumber) as discussed in more detail later.

Use of Index Tables Alone

The use of the index table alone upon reading of a file is very simple to implement. This mode of operation is obligatory in Trick-mode; fast forwarding necessitating jumps in the file, or rewinding. In addition, it may be advantageous to test its performance in normal reading mode of speed×1.

To give an example of use, take the following scenario using a file of 15 minutes in length, with 900 Indices, one per second. A command is sent to read forward at speed×1 from the 5$^{th}$ minute. The following functions are then performed by the HDVR:

search for the 300$^{th}$ index, HdvrIndex in hfmd read the address stored at that index, HdvrIndexAddress [300], and updates the current position, cur_pos read the CMM corresponding to that index point, HdvrIndexCMM[300][1 . . . ComponentNumber], and update the current CMM, cur_CMM[1 . . . ComponentNumber]

optionally, construct or update the table in anticipation of loading the subtable HdvrIndexCmm[300−n . . . 300+n][1 . . . ComponentNumber]

HDVR_USER then sends the identifier of the current CMM, cur_CMM[], to the CMPS, recovers the control word and descrambles the components.

There follows a request to read forward in the file. HdvrIndexAddress[301]-HdvrIndexAddress[300] blocks which correspond to a reading of 1 second.

At the time of receipt of Evt_Write_Fifo_Completed, the preceding commands are repeated for the 301$^{st}$ HdvrIndex.

The advantage of this solution resides in the synchronisation of the descrambling processes, and of navigation in the index table; there are no asynchronous modifications of the CWs.

The principal pitfall is the double anticipation of the CMM positions by this operation:

a first overestimation, upon recording, of maximum duration cryptoperiod/security_coefficient seconds in the permanent regime, and of cryptoperiod seconds in the critical transitory regime.

a second overestimation, upon reading, of a maximum duration of HdvrIndexTimeStamp s.

Knowing that a CMM applies to 2 cryptoperiods, this last approximation of approximately one second should not perturb the descrambling of the data in reading mode of speed×1. All the more since in Trick-Mode, this solution becomes unworkable.

Use Jointly of Index Tables and Sections Inserted upon Recording

Upon the recording of a file, for each cryptoperiod and for each component, there is inserted a section that can be filtered by the Mload device upon reading, allowing one to obtain information concerning the change in CWs in the STS, as well as that contained in the hfmd.

Figure 23:
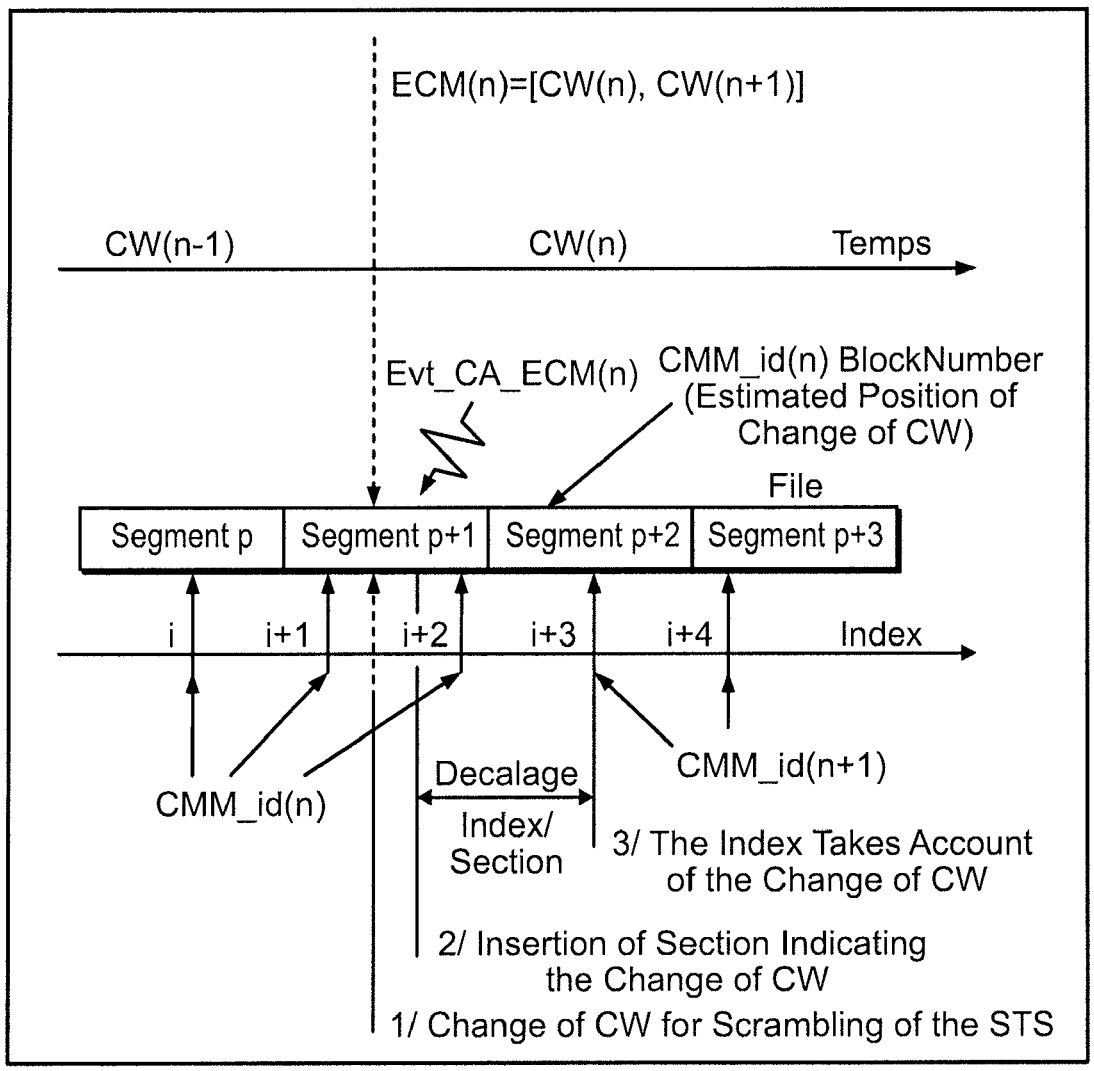
FIG. 23 is an illustration of a discrepancy between HDVR index information and inserted ECM sections.

Unfortunately, because of the approximation of the CMM positions in CMM_table upon recording, there is a variable discrepancy between the CMM information of the STS stream, Evt_CAS Ecm(1 . . . ComponentNumber), and the information contained in the hfmd, HdvrIndexCMM[1 . . . HdvrIndexNumber][1 . . . ComponentNumber]. To understand this discrepancy, consider the n$^{th}$ transition from CW(n−) to CW(n), as illustrated in FIG. 23.

Performing a reading using the inserted section to change the cur_CMM.

From the index i:
— update cur_CMM, ie HdvrIndexCMM[i]=CMM_Id(n)
— read up to index i+1
— no section between i and i+1
— comparison between cur_CMM and HdvrIndexCMM[i+1]
— same value
— read up to index i+2
1/change of CW at the level of the STS
2/ the Mload on the section inserted beforehand generates an Evt_Top_Ecm
3/incrementation of cur_CMM, which becomes $CMM_{13}$ Id(n+1)
— comparison between cur_CMM=CMM_Id(n+1) and HdvrIndexCmm[i+2]=$CMM_{13}$Id(n)
— Attention, the value in hfmd is retarded by one index.
— read up to index i+3
— no section between i+2 and i+3
— comparison between cur_CMM=$CMM_{13}$ Id(n+1) and HdvrIndexCMM[i+3]=CMM_Id(n+1)
— same value
— the retardal of the index is made good The reading occasionally produces a retardal of indices, but this problem can be compensated for.

Conversely, if the Application requests a reading from index i+2, the result of the combined use of sections and the index table can prove to be disastrous:

update cur_CMM, ie HdvrIndexCMM[i+2]=CMM_Id(n)

read up to index i+3 no section between i+2 and i+3

Comparison between cur_CMM_Id(n) and HdvrIndexCMM[i+3]=CMM_Id(n+1)

Strangely, the value in hfmd is to an index in advance. One has therefore missed the inserted section.

Two cases present themselves:

one has confidence in cur_CMM, and one keeps a retarded Ecm (dangerous)

one has confidence in HdvrIndexCMM[i+3], and in this case what is the use of the inserted section To conclude, the use of inserted sections during playback of a recorded file can be problematic because the positions in the file are produced via hfmd for which the positions, in blocks, are overestimated. It is therefore dangerous and a source of error to put together two types of incompatible synchronisation information:

information of position in hfmd (in HdvrIndex or CMM_Table)

sections inserted in the STS

It would be more coherent to choose definitively a unique synchronisation basis for the index table for which the fineness of the synchronisation will be sufficient if:

the process of estimation of the Ecm positions is valid (hybrid filter, as discussed in more detail below)

the HdvrIndexTimeStamp is sufficiently small for the precision of the CW transitions (ie <Cryptoperiod=Ecm recovery time).

More detailed discussion of the synchronisation of CMMs, and estimation of bitstream positions is provided below.

Structure of HDVR Files

Returning to discussion of the structure of HDVR files, as discussed above they comprise management data (for example hdvr_file.management_data) and content data (for example, hdvr_file.content_data).

In preferred embodiments, the hdvr_file_management data( ) is contained in the n first clusters allocated to the HDVR file and the hdvr_File_content_data( ) starts with the following cluster.

In order to simplify the access to the file, there is a first file descriptor for the management data and a second file descriptor for the stored transport stream (STS).

Other Tables Included in the Management Portion of HDVR Files

The various tables which make up the hdvr_file_management_data( ), and which were listed above, are now described in more detail.

CMM Table

CMM information provided by the CMPS is stored by the HDVR Server in a dedicated two dimensional table. Each element of the CMM table is stored according to two coordinates:— firstly, the CMM table identifier, which refers to the particular CMM family the CMM descriptor belongs to; and secondly, the CMM identifier, which refers to the particular CMM index of the CMM descriptor in the particular CMM family.

Each element of the CMM table is classed as a CMM descriptor and contains the following information:

a file offset in blocks of the CMM position related to HDVR file content data that allows the HDVR to decipher the STS from this CMM file offset to the next one the first HDVR Index to reference this particular CMM (this is a cross reference between the HDVR index table and the CMM's)

CMM structure as defined by the CMPS

Chapter Table

The chapter notion is similar to that of DVDs. In particular embodiments, a recording always contains at least one chapter. Chapters are also play entry points and the chapters are linked to the HDVR indices. The chapter beginning markers, as well as their characteristics (see below) are transported by the CMMs provided by the CMPS at the time of the recording phase. A recording comprises a maximum number of MaxChapterNumber chapters.

The chapters are stored together in a single table referred to as Chapter_Table( ) which contains a maximum number of chapters, MaxChapterNumber.

Chapter information arises from two distinct sources:
firstly, from the HDVR chapter table;
secondly, chapter information is provided during recording from a broadcaster and encapsulated into a special CMM that holds what the HDVR defines as the CMM chapter control. In further variants this CMM chapter control holds viewing rights in a similar fashion to existing MPPV.

In order to group into the same structure all information related to a chapter descriptor, a reference to the special CMM is inserted into each chapter descriptor as the CMM chapter control's coordinates.

The chapter table is a one-dimensional array of HDVR chapter descriptors. Each chapter descriptor contains the following information:— the HDVR index reference (HdvrIndex_Id) corresponding to the time-date that is bookmarked by the chapter (taking the origin as the beginning of the STS);

the chapter duration;

a trickmode bitmap that specifies for each trickmode, such as pause, fast-forward, fast-rewind and so on, whether the particular trickmode is enabled or disabled. This trickmode is suitable for the whole chapter;

a control viewing word that is compared with the parental control data structure according to a particular HDVR algorithm and defines whether the chapter is viewable or not; for example, according to a user's PIN code and the moral content of the current chapter.

special CMM coordinates (the so-called CMM chapter control, as discussed above)

Private PMT Table

The Private PMT (programme map table) is a PMT belonging to the HDVR which takes an inventory of the information necessary for the exploitation of the components of the recorded or soon-to-be recorded service. It comprises two pseudo tables, one of which is provided by the client (who knows about the nature of the components), and the other of which is provided by the CMPS (which knows the active conditional access (CA) PID for each component)

During the recording, the recorded service plan can be modified; there can therefore be one or more private PMTs applicable to the recording. One MPEG section inserted into the STS marks each development of the recorded service plan. Furthermore, the HDVR inserts up to three other MPEG sections in the recorded bitstream.

The number of applicable private PMTs is limited to MaxPrivatePMTNumber.

They are grouped together in a table referred to as Private_Pmt_Table( ) which takes inventory of a maximum private PMTs MaxPrivatePmtNumber, which each take an inventory of components MaxComponentNumber.

A Private PMT table is a one-dimensional array of private PMT descriptors. The HDVR private PMT descriptor is an HDVR-defined embodiment of a common MPEG-2 defined PMT (see ISO/IEC 13818 for further information).

The following information is added/removed to an ISO like PMT to create an HDVR private PMT:—

HDVR use's PID information. Indeed the HDVR inserts some of its own PID into the original TS to obtain an STS PID information relating to unrecorded components is removed from the original TS to obtain an STS. For each component, CA_PID information (CA standing for Conditional Access in this context) is removed as the CA aspect is managed by the CMPS and the HDVR does not deal directly with the CA content for each component some CMM information is added to allow the HDVR to playback encrypted STS. So the CMM family which the component depends upon is specified.

for HDVR internal use, the CMM family to which the CMM chapter control belongs is specified a file offset in blocks of the private PMT descriptor position related to the HDVR file content data for which the present private PMT descriptor is suitable the HDVR index reference corresponding to the time-date whose origin is the beginning of STS, from which the present private PMT descriptor is suitable Rights and the Parental Control Data Table The rights group together the information relating to the authorisations associated with the playing of a programme and are all supplied once the programme is recorded.

This information is stored together in a single table referred to as Parental_Control_Data( ).

The Parental Control Data structure provides viewing rights control with a chapter granularity. It is used by the HDVR server to allow or forbid access to a chapter section or the whole file according to two different processes:

- a comparison between a parental control data PIN code and the user's own PIN code level with an external control such as a PVR control (where PVR stands for Personal Video Recorder, the high level end-user API of video recording functionality). The access control is suitable for the whole HDVR track file.
- a comparison between a particular parental control table that associates a parental chapter control word for each chapter of the HDVR chapter table. In particular embodiments, it enables or disables the viewing control mechanism. If viewing control is enable for a particular chapter, then the HDVR server compares the global parental viewing control word with the related chapter viewing control word and fixes the HDVR automaton player state according to an internal HDVR algorithm, such as forcing the automaton to a pause mode before the chapter concerned begins.

In certain embodiments the HDVR provides free read/write access to the parental control data and in such embodiments, the HDVR cannot be responsible for the efficiency of the parental control mechanism.

Maximum Values Table

In order to make the management data structure dynamic, the maximum sizes of each of the tables are provided in the header of the HDVR file. This table is referred to as Max_Values( ).

The role of Maximum Values is to assume the dynamic structure of HDVR file management data. So for each HDVR structure declared above, except the general information basic structure, the Maximum Values structure specifies its offset and length into the HDVR file management data. This provides an easy mechanism to extend the internal format without any compatibility problems. So, for example, an old HDVR server is able to read newer HDVR file tracks in the case of HDVR file tracks exported between two different STBs via a firewire bus.

Generalities and the General Information Table

The generalities group together the general information on the recorded programme. They are stored in a table referred to as General_Information( ).

General information contains the followings at a sight information:—

- a CMPS private information so called CMPS file identifier. Note that this information is CMPS read only mode and do not pass through the HDVR server API.
- the HDVR Server version number which creates the current HDVR file track
- the delta time elapsed from one HDVR index to the next one. It can be also viewed as the HDVR index time sampling period.
- the HDVR file track's total duration
- the total STS size in blocks
- the current allowed time-shifting depth. Note that a null value is considered as an infinite time-shifting depth, for example in the common case of file recording.
- the definition of a client private zone given by its HDVR file management data offset and its length. Note that HDVR Server API does not provide any read/write access to this dedicated zone. Client zone input/output operation is on client's charge.
- the recording mode from the different following allowed states:
  - immediate mode for an user instant recording
  - push mode for a broadcaster's special use, for example to upload commercial offers
  - programmed mode for a one-shot differentiated recording
  - periodic programmed mode for a periodic differentiated recording
  - time shifting mode.
- the HDVR Player Server identifier if there is currently an HDVR Server playing the HDVR file track, in order to avoid concurrent file access
- the HDVR Recorder Server identifier if there is currently an HDVR Server recording the HDVR file track, in order to avoid concurrent file access.

Storage of HDVR Management Data

For the hdvr_file.management_data, the CMM Table (CmmTab) is a large table (several Megabytes) and filling it depends on the broadcast characteristics and the duration of the recorded programme. In order to avoid the CmmTab occupying space unnecessarily on the disk, the table is not created on the disk with the maximum value (CmmMaxNumber), but gradually during the recording. On the other hand, the offsets for achieving the different CmmTabs (in the case of internal encryption) take into account the CmmMaxNumber value.

Figure 24:
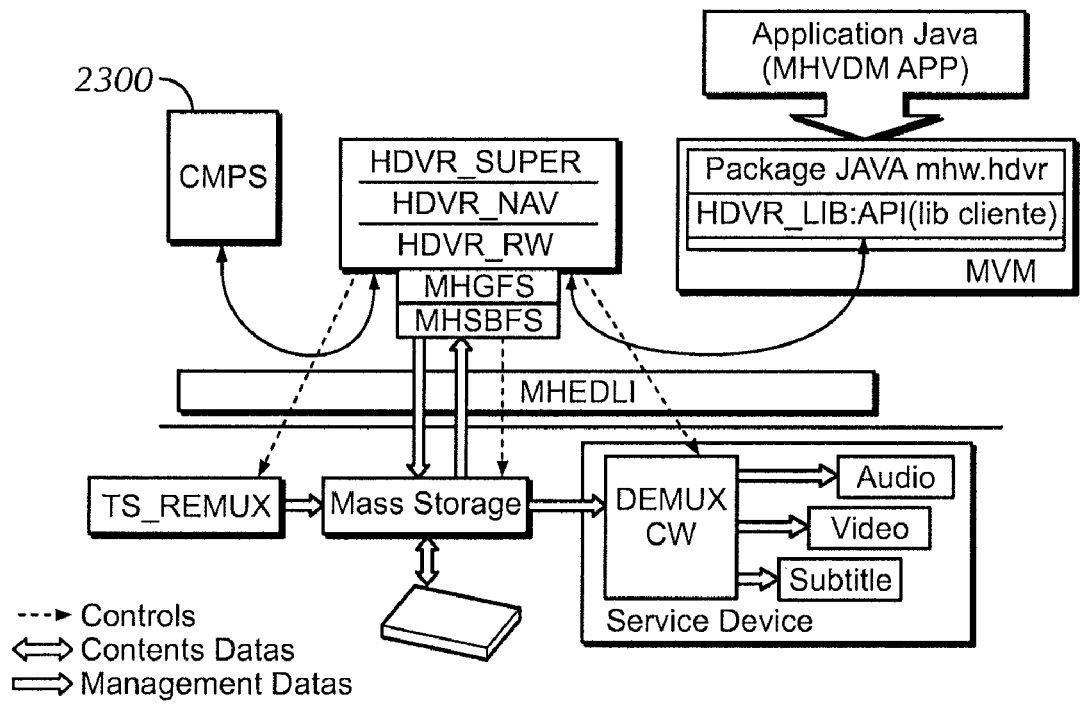
FIG. 24 is a schematic diagram of part of a file, including an Hfmd section.

With reference to FIG. 24, one therefore obtains on the disk an hdvr_file.management_data made up of holes.

FIG. 24 illustrates a special functionality of the GFS library that allows a file to have a virtual size superior to its effective disk allocation size. For example, HDVR File management data has a virtual size that can provide complete management for a total HDVR track duration of 20 hours. However, generally, the HDVR track is only 2 or 3 hours long. According to the GFS library holed-file feature, the virtual size of HDVR file management data is not entirely allocated: some unallocated clusters are present into the hdvr_file management_data offset range.

HDVR Content Data—Stored Transport Stream

Leaving discussion of the management data stored by the HDVR and returning to discussion of the structure of the stored content, the STS (stored transport stream) is now described in more detail.

The STS is the name given to the bitstream recorded by the HDVR and is made up of the following data:

- reproducible data of the service to be recorded (client's choice)
- one or more sets of video data
- one or more sets of audio data
- one or more sets of subtitles
- teletext information
- data inserted by the HDVR The data inserted by the HDVR is in the form of MPEG sections and is referred to as HDVR_<section_name>_SECTION elsewhere.

The HDVR_NEW_PMT_SECTION is inserted in order to mark each recorded service plan change.

There is a maximum of MaxPrivatePmtNumber-1 HDVR_NEW_PMT_SECTION sections in the STS.

The HDVR_TIME_TAG_SECTION section is periodically inserted in order to provide an indication of the time that has passed during the playing of the STS. This section is optional.

The HDVR_CAS_ECM_SECTION section is only used in the case of internal encryption of the reproducible data (DVB-CS) and is inserted to mark the beginnings of the cryptoperiods.

The HDVR_CAS_ECM_SECTION allows, during the playing of an STS, the signalling of a change of CW for the associated reproducible components and to apply therefore a new pair in the descrambler.

There are as many different types of HDVR_CAS_ECM_SECTION sections which distinct ECM PIDs for the recording service. An HDVR_CAS_ECM_SECTION section type is therefore associated with each CMM family.

Recordal of Data

Finally, some further details are provided concerning the process of recordal of content by the HDVR and the cases of internal and external encryption are examined.

Figure 25:
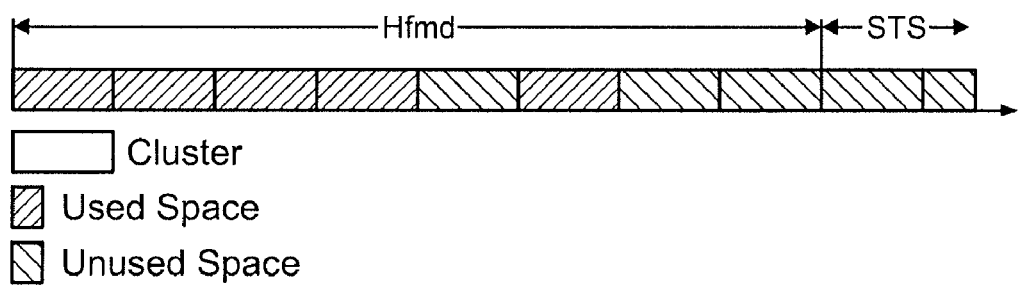
FIG. 25 is an overview of the flow of data between the CMPS and the HDVR in a preferred embodiment.

FIG. 25 illustrates the flow of data between the HDVR controller and the mass storage device. The data going to and coming -from the Mass Storage Device is transmitted via FIFO (first in first out) memories, which may be of different sizes.

A recording comprises a maximum of MaxCmmNumber CMM. The returned CMM contains an encrypted part and another clear part and only the latter is directly exploitable by the HDVR: it provides the navigation and restriction constraints for the STS part associated with the CMM.

Since the granularity of the file is a block, a CMM applies itself to a collection of consecutive blocks. The start point of the application of a CMM in the STS is identified by a block number.

Internal Encryption

For internal encryption, the reproducible data, upon leaving the demultiplexer 230, remains encrypted and is recorded without modification and the decryption of the reproducible data is then done at the time of playing. The decryption keys are broadcast using the ECM transported on one or several ECM PIDs and are valid for one cryptoperiod. The changing of the cryptoperiod is signalled within the broadcast. The decrypting keys are recovered at each new cryptoperiod by the HDVR server by using the services of the CMPS server.

For internal encryption, there are as many CMMs as there are cryptoperiods for the duration of the recording within the MaxCmmNumber limit: the encryption is said to be temporal.

Each CMM transports, among other things, a pair of keys (referred to as CW: control words) which allow the decrypting during playing, for one cryptoperiod, of one or several reproducible components. The CWs are found in the encrypted zone of the CMM and are not directly exploitable by the HDVR: it is necessary to ask the CMPS for an exploitable CW.

For this type of encryption, there can be ECMs as a service which can be applied to one or several or even all of the reproducible components. Consequently, the CMMs are grouped together by CMM family and this number is determined by the number of ECM PID families—that is, the number of distinct ECM PIDs referred to in the programme map table (PMT). To each of these families, there are associated dependent encrypted components, for example:

ECM PID X broadcasts key pairs for the reproducible video component.

ECM PID X broadcasts the key pairs for the reproducible audio component.

ECM PID Y broadcasts the key pairs for the reproducible teletext component.

ECM PID Z broadcasts the key pairs for the reproducible subtitle component.

For this example, there are three CMM families. A correspondence table defines the associations between the reproducible data and the CMM families. In the case of a change in the service plan, a new correspondence table will be defined: for a new ECM PID, a new CMM family will be created. For this encryption, the number of possible CMM families will be equal to the number of reproducible components that can be recorded with the HDVR server.

External Encryption

For external encryption, the reproducible data, upon leaving the demultiplexer 230 is in the clear and the encryption of this data is done at the time of writing on the disc and the decryption is done at the time of playing. The decrypting keys to be applied are determined by the CMPS and recovered by the HDVR server by using the services of the CMPS server.

For external encryption, there can be as many CMMs as there are keys applicable to the recording within the MaxCmmNumber limit. The allocation of these CMMs on the recording is the responsibility of the HDVR: the encryption is said to be spatial.

Each CMM transports the key (hereinafter referred to as CK) which allows the encryption and decryption of all the reproducible components of the recording service. The CK is found in the encrypted zone of the CMM and is not directly exploitable by the HDVR: it would be necessary to ask the CMPS for an exploitable key.

For this type of encryption, there is always only one CMM family.

A CMM family is grouped together in a table called Cmm_Table( ) which contains a maximum of MaxCmmNumber CMMs.

The bit stream recording and playback procedure will now be described in more detail. The recording procedure involves the estimation of positions in the bit stream with which control words will be synchronised for the later playback process. The estimation is required in order to allow this recording technique to afford the advantages of security and minimal processing and storage.

Turning to a second general aspect of preferred embodiments, the estimation of position in a bitstream, and the synchronisation of conditional access information with the bitstream are now described in more detail.

CMM Synchronisation

Bit Stream Synchronisation

Before discussing some problems associated with recording scrambled bit streams and their solutions, the structure of such bit streams will now be described with reference to FIG. 26.

Figure 26:
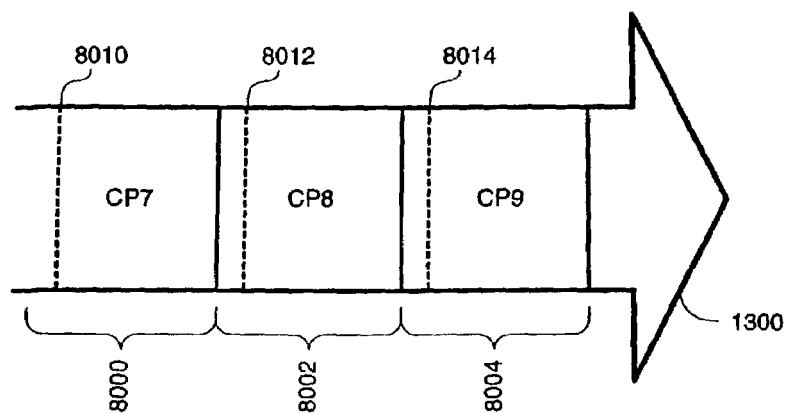
FIG. 26 is an illustration of the structure of a typical bit stream.

In FIG. 26 a scrambled MPEG bit stream 1300 (such as that received at the receiver/decoder from a broadcast centre) is illustrated. The bit stream as shown is divided into successive cryptoperiods 8000, 8002, 8004, each scrambled with a corresponding control word. The bit stream 1300 also contains Encrypted Entitlement Control Messages (ECMs) 8010, 8012, 8014.

To provide the system with some redundancy (and therefore fault-tolerance), each ECM in fact contains two control words: one for the present cryptoperiod, and one for the following cryptoperiod. Thus ECM 8010 contains the control words to descramble both cryptoperiod CP7 8000 and CP8 8002. Similarly, ECM 8012 contains the controls words necessary to descramble both cryptoperiod CP8 8002 and CP9 8004. In fact, the ECMs are periodically retransmitted to ensure the continued smooth operation of the system in the event of the user changing channel ('zapping') or a temporary fault preventing reception of the first set of ECMs. For simplicity, only the first ECM in each such series is shown.

The conditional access smartcard 5500 typically takes several seconds to decrypt each ECM, but each cryptoperiod is relatively long (10 seconds in the preferred embodiment), so there is not generally a problem with timing in the case of receiving and decoding live content (such as that received via satellite from a broadcast centre).

In the case of recording an audio/visual bit stream (such as a received digital television broadcast) to hard disk and the subsequent playback, timing can be more of a problem, since, in general, conditional access data relating to a recording will have to be manipulated before, during or after storage in order to overcome the time-limitation of the recording (in other words, remove the dependence on the time-varying global encryption key $K_G$ used to encrypt the incoming ECMs).

It has been found advantageous to synchronise the scrambled content 800 (in the form of an audio/visual bit stream) with the relevant ECMs, so that the control words 5600 can be fed into the descrambler at the correct time to allow the content 800 to be descrambled. More precisely, it has been found useful to synchronise the audio/visual bit stream and conditional access data (preferably, as noted above, in the form of the original ECMs) at the time of storing the audio/visual bit stream and conditional access data.

The synchronisation process is performed by the HDVR 3850 in preferred embodiments. Alternatively, the synchronisation process is performed by the CMPS system 2300.

During the synchronisation process, a reference is made between the conditional access data and a corresponding position in the bit stream. Typically, this reference takes the form of two pieces of data: the identifier of a CMM corresponding to the conditional access data (ECM) and the corresponding file write pointer (FWP) in the bit stream. In the preferred embodiment, such a reference is stored in a table in the previously-mentioned management data portion 2112 of the file also containing the stored bit stream, so that it can be easily accessed during playback.

The synchronisation can be brought about by, evaluating the position, of each ECM as it arrives, storing such positions, and reloading the stored positions during playback as the basis for timing when the control words should be delivered to the descrambler. The evaluation of such positions exactly to the nearest bit or byte in the bit stream can occasionally be inefficient.

Some issues concerning the exact determination of the position of an ECM in a stored bit stream will now be considered in the context of the present system, where the bit stream is fed from a demultiplexer into a remultiplexer, then into storage in a hard disk via a FIFO.

Data, such as ECMs, is extracted from the output of the demultiplexer by the MLOAD device, operating semi-autonomously of the upper software layers in which the control of the synchronisation process is more easily managed. Due to interrupt latency and other similar considerations, the receipt of the ECM from the MLOAD device cannot be precisely timed. Furthermore, receipt of the ECM is usually only acknowledged by a EVT_CAS_ECM event 8400 (not shown) generated by the conditional access smartcard after certain checks have been made (including a check as to whether or not the ECM is 'new' or merely a retransmission). This event will lag the actual receipt of the ECM itself by a time offset, herein referred to as Δt, and the amount of data corresponding to Δt will vary, depending on the prevailing bit rate of the bit stream. The subject of Δt will be returned to later.

One issue to consider is that the FIFO buffer has a dynamically adjustable size, and may vary between empty and full depending on unpredictable factors. A further issue—returned to later—is that in accordance with the abstracted architecture of the receiver/decoder, data is stored to the hard disk in indivisible segments such that the file write pointer (FWP) is only determinable before and after the writing of each segment (of perhaps, 2 Megabytes of data at a time); the 'current' FWP cannot be read at any arbitrary time (when, for example, an EVT_CAS_ECM arrives).

The net result is that an exact determination of the ECM position can require additional analysis of the bit stream as it arrives and/or an intimate knowledge of the state of various buffers and file pointers in the system (which can be relatively inefficient).

Estimation of Positions in the Bit Stream

As explained briefly above, each ECM relates to a particular 10 second cryptoperiod and also contains the control word for the next cryptoperiod, which offers some scope for a different solution for evaluating the position of the ECM, namely estimation (rather than determination) of the position.

Various means have been found of estimating the position, and some of these will be described later. One of the more efficient means involves manipulating the bit stream in such a way that the worst-case estimate—relatively quickly computed—will always yield a 'safe' answer, and can always be used in preference to more involved estimation methods. By 'safe', it is implied that, during the reconstruction of the stored bit stream using the above estimated positions to control the timing, the control words will each be delivered to the descrambler during the appropriate two cryptoperiod time-window, and the descrambling operation will thus operate correctly. If, by contrast, a control word is delivered during the wrong cryptoperiod, the descrambler will fail to descramble the stored bit stream, resulting in a loss of picture and/or sound for the user.

This above-mentioned means for estimating the position of the conditional access data (or any other appropriate data, for that matter, such as particular subtitle, audio, video, application or other data) in the bit stream will now be described with reference to FIG. 27.

Figure 27:
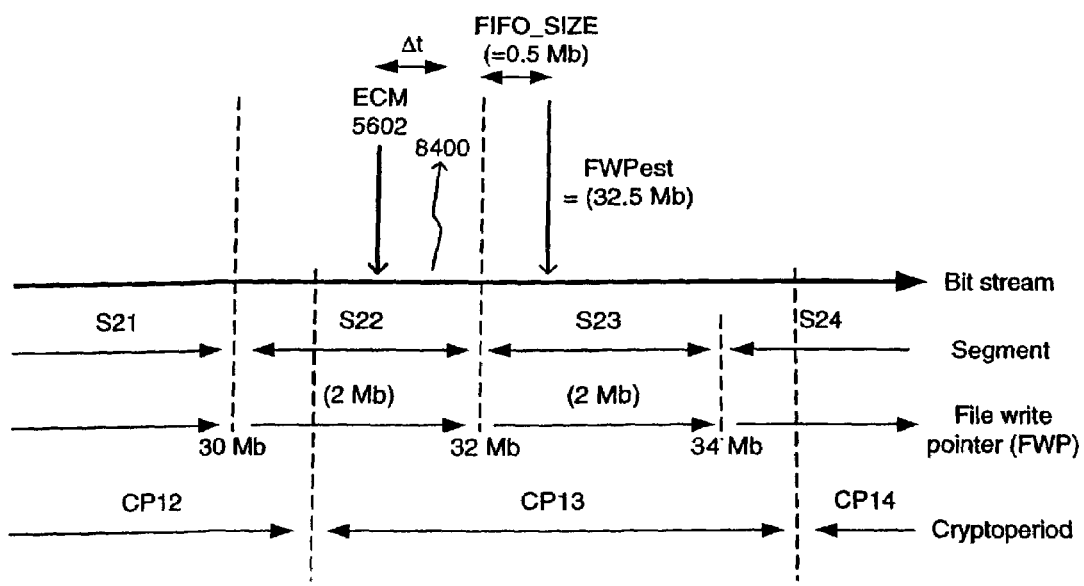
FIG. 27 is a diagram showing an estimation process as described herein.

In FIG. 27, the segments S21, S22, S23 and so on are shown in relation to the bit stream (which is shown having a data offset scale—due to varying bit rates, as discussed later, the segment sizes would be distorted and uneven if a time scale were used). Also shown is the equivalent file write pointer (FWP) values, and the prevailing cryptoperiods CP12, CP13, CP14. The actual position of an ECM 5602 in the bit stream is shown, as is the EVT_CAS_ECM event 8400 which occurs at a time Δt later. The boundaries of the segment are shown as dashed lines either side of the ECM 5602 and EVT_CAS_ECM event 8400. Lastly, the corresponding estimated position of the ECM (FWPest) is shown to the right of the end of the segment containing the ECM 5602.

The end of a particular segment (and therefore the beginning of the next segment) is signalled to the CMPS system (which is largely responsible for the estimation) near-instantaneously by the reception of an EVT_FIFO_WRITE_COMPLETED event, generated by the mass storage device to indicate that the current segment write operation has completed. At this point, the current FWP can be assumed to be equal to the previous FWP plus the segment size just used.

The estimation comprises determining the segment in which the ECT_CAS_ECM event 8400 falls (since the reception of the ECM 5602 is not itself globally notified, not least because most received ECMs are mere retransmissions which are then subsequently discarded by the conditional access system), and then taking the estimate of the position according to the following formula:

$$FWPest = E\left(\sum_{i=1}^{n} \text{size\_segment}(i) + \text{size\_fifo}\right) + k$$

where E( ) is an expectation operator, size_segment(n) is the size of each segment (in the present illustration, size_segment(22)=2 Mb, for example, and the sum of all previous segment sizes is 30 Mb), size_fifo is the amount of data in the FIFO (which, as noted, can vary), and k is a "security parameter" (typically between 0 and 1 Mb) which adjusts for further latencies and timing problems in the system so as to ensure the estimate is an overestimate (see below).

The expectation term E( ) in the above equation addresses the fact that the size_fifo parameter at least cannot be determined exactly. Typically, for a given maximum allocated FIFO size fs (say), E(size_fifo) is taken as ½ fs (which, in the above example implies a maximum FIFO size of 0.2 Mb). As will be described in more detail later, the choice of size_segment can be fine-tuned to keep the resulting estimate 'safe' yet efficient.

In the example given in FIG. 27, E(fifo_size) is taken as 0.5 Mb, k is equal to 0, and the Σsize_segment(i) term is equal to 32 Mb, yielding a FWPest of 32.5 Mb when the above formula is applied.

Underlying the above formula is the realisation that, because of the double control word redundancy of ECMs, it does not matter if the estimated position of the ECM falls within the cryptoperiod immediately after that with which it is associated. The estimation will fail, however, if the estimated position falls within cryptoperiods beyond that, or in the cryptoperiod immediately preceding the correct cryptoperiod.

In FIG. 27, for example, during the writing of segment S22, it is impossible to distinguish between EVT_CAS_ECM events 8400 caused by ECMs sent in respect of cryptoperiod CP12 and EVT_CAS_ECM events 8400 caused by ECMs sent in respect of cryptoperiod CP13. Since to incorrectly label a CP12 ECM as a CP13 ECM is not critical, and incorrectly labelling a CP13 ECM as a CP12 ECM is fatal, the need for an overestimate can therefore be appreciated.

It should also be considered that the maximum segment size can not exceed the size as a cryptoperiod (less the size of the FIFO size parameter), since with larger segment sizes there exists the possibility of receiving two EVT_CAS_ECM events 8400 within the same segment write operation, and two sets of control words. This too is fatal, since, owing to various system constraints described above (and others, including the asynchronous nature of inter-device communication), there is ambiguity about the order in which the corresponding ECMs were received, which can lead to the wrong control words being applied to the wrong cryptoperiods.

Figure 28:
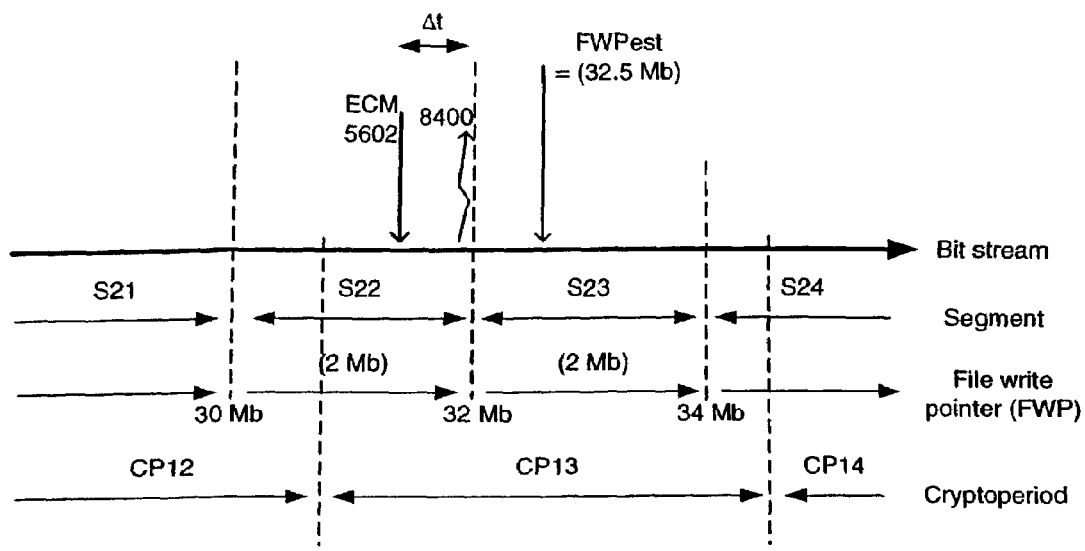
FIG. 28 is a further diagram showing the estimation process.
Figure 29:
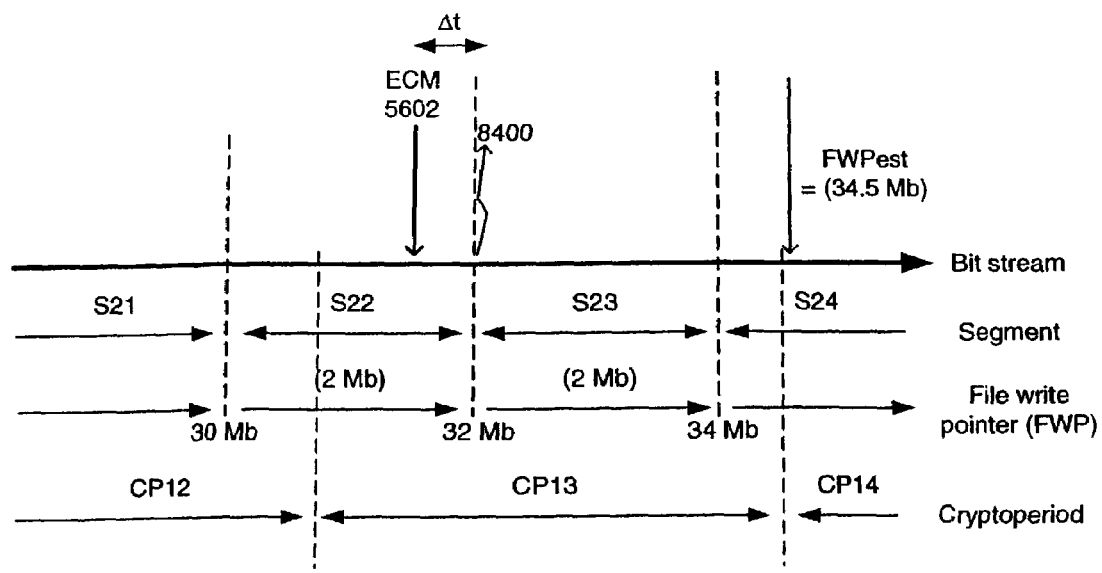
FIG. 29 is a yet further diagram showing the estimation process.

Bearing the above in mind, the robustness of the estimation routine in extreme cases will now be illustrated further with respect to FIGS. 28 and 29.

In FIG. 28, an incoming ECM 5602, resulting EVT_CAS_ECM 8400 and estimated position of the ECM (FWPest) are shown. This represents one extreme case where the EVT_CAS_ECM event 8400 is received just before the EVT_FIFO_WRITE_COMPLETED event, at the end of the segment S22. The resulting estimate (32.5 Mb, in fact) here is at its closest to the ECM 5602 (at a distance of 0.5 Mb plus the data size equivalent to Δt), and in this case falls within the correct cryptoperiod (CP13).

In FIG. 29, the ECM 5602 and resulting EVT_CAS_ECM 8400 are shown fractionally further forward in the bit stream, with the EVT_CAS_ECM 8400 occurring within the next segment S23. The resulting estimate (34.5 Mb, in fact) here is at its furthest from the ECM 5602 (at a distance of 2.5 Mb plus the data size equivalent to Δt), and falls within the cryptoperiod (CP14) after the correct cryptoperiod (CP13).

Other examples can be constructed with different relative positions of cryptoperiods and segments, but it can be observed that with the above formula (and with a combined segment and FIFO size no greater than the size of a cryptoperiod), the estimated position always falls within the correct cryptoperiod, or the following cryptoperiod (in both cases, with acceptable results).

Structure Underlying the Synchronisation and Estimation

The various structures underlying the methods of synchronising and estimation described earlier (particularly with reference to FIGS. 12 and 13) will be described in more detail, with reference to FIGS. 30 and 31.

Figure 30:
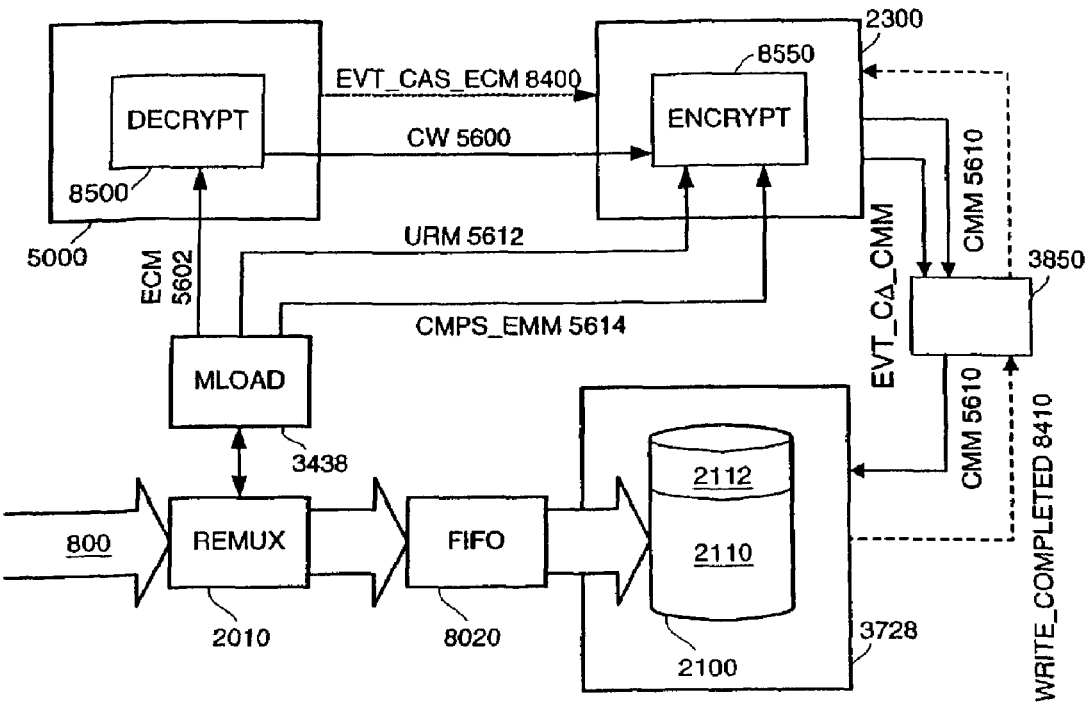
FIG. 30 is a schematic of the bit stream recording process.

In FIG. 30, the scrambled bit stream 800 is shown passing through the demultiplexer/remultiplexer/descrambler 2010 (here shown in its remultiplexing capacity) and FIFO 8020 (operated by the FIFO device 3744—not shown) on its way to being stored in the file portion 2110 in the hard disk 2100 (operated by the mass storage device 3728). The MLOAD device 3438 extracts ECMs 5602, and URMs 5612 and CMPS_EMMs 5614, and forwards these to the conditional access system 5000 and CMPS 2300 respectively. Control words 5600 decrypted by the conditional access decryption engine 8500 in the conditional access system 5000 are sent to the CMPS 2300, accompanied by the broadcast of an EVT_CAS_ECM event 8400. As described earlier, the control words (two per CMM for redundancy), URMs 5612 and CMPS_EMMs 5614 are combined and encrypted by the CMPS decryption engine 8550, and then sent, via the HDVR 3850, and the mass storage device 3728, to the hard disk 2100 for storage in the management data portion 2112 of the relevant file. EVT_FIFO_WRITE_COMPLETED events 8410 are broadcast periodically (and received by the HDVR 3850 in preferred embodiments, or alternatively by the CMPS 2300 directly) when a segment write operation has completed. EVT_CΔ_CMM events 8552 are sent from the CMPS 2300 to the HDVR 3850.

Figure 31:
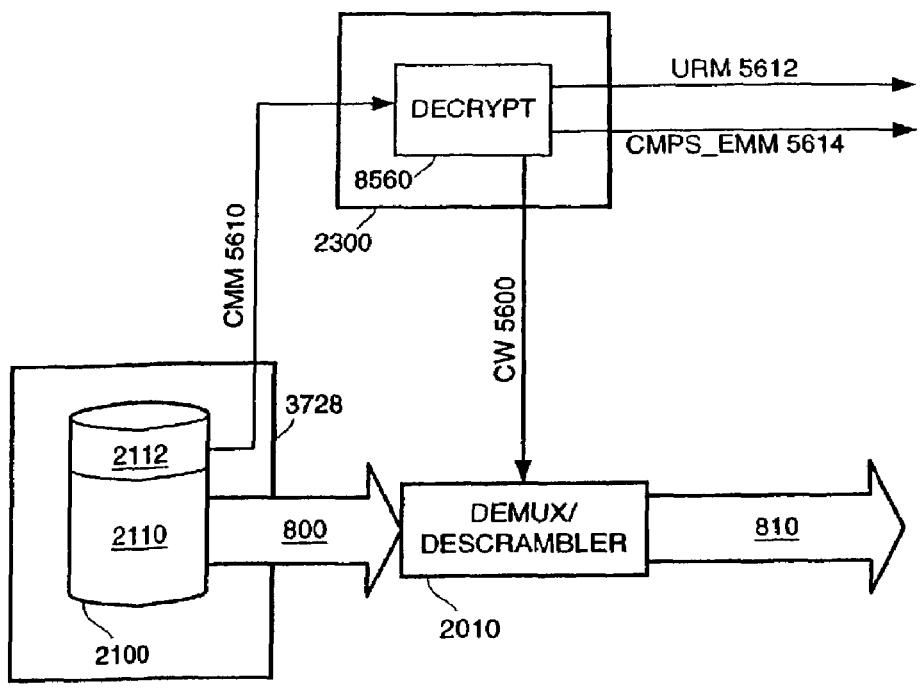
FIG. 31 is a schematic of the bit stream playback process.

In FIG. 31, the demultiplexer/remultiplexer/descrambler 2010 produces the desired unscrambled bit stream 810 by descrambling the scrambled bit stream 800 from the portion 2110 with control words 5600 generated by the CMPS decryption engine 8560 in the CMPS 2300. The above-mentioned decryption engine 8560 is fed by CMMs retrieved from the management data portion 2112 of the relevant file in the hard disk 2100 via the mass storage device 3728, and also produces URMs 5612 and CMPS_EMM 5614 for further processing by the CMPS 2300.

Segment Size

Returning to other considerations, it is noted that cryptoperiods have a predetermined size in the time domain only, their corresponding data size varying with the bit rate of the bit stream. A further consideration is that particularly 'safe' (in other words, small) segment sizes relative to the expected sizes of cryptoperiods are inefficient, since the more EVT_FIFO_WRITE_COMPLETED events which are generated per second, the more processing power is unnecessarily used up.

The optimal segment size is now considered in more detail:

a small amount of data in a segment allows many segments to be created per cryptoperiod. This may allow more precise measurements, but creates the risk of having too many events per cryptoperiod, which can lead to a degradation of computational efficiency;

a medium amount of data in a segment provides a compromise between large and small segments. This includes a range of possible segment sizes and the optimum size must be chosen from this range; and a large amount of data in a segment creates fewer, larger segments per cryptoperiod. This has the advantage of requiring less processing because of fewer segment end events, but too large a segment can (potentially fatally) cause more than one EVT_CAS_ECM event to be received during the writing of the segment.

To recap, although the smallest segments create the most accurate estimates, using small segments requires more processing and is therefore slow. The bit stream is divided into segments that are as large as possible to keep processing to a minimum, while keeping the estimates as accurate as possible. To this end, various medium-sized segments are generally preferred as a useful compromise between speed and accuracy.

In view of the above consideration of segment size, a further important aspect of the system relates to the determination of appropriate segment size so as to maximise efficiency (or, in other words, maximise the segment size) whilst retaining 'safe' estimates of ECM position.

This determination of appropriate segment size is done by applying filters to observed characteristics of the bit stream, such as bit rate. This filtering, as with the estimation, is performed by the CMPS 2300. The filtering in most cases serves to reduce the susceptibility of the estimation procedure to large fluctuations in bit rate.

The use of filters and other means to optimise the segment size used to store portions of the bit stream to hard disk will now be described in more detail.

Optimising Segment Size

Numerous methods can be used to optimise the segment size, typically utilising at least one characteristic of the bit stream to help determine the segment size.

In the preferred embodiment, a dynamic filter is used whose inputs are measurements of the average bit rate of the bit stream, and whose output is the segment size. In general, however, two main types of filter are considered here: static and dynamic filters. Implementations of these filters will now be described, as well as a discussion of their relative merits.

First of all, static filters will be described.

The principal characteristic of the static filter is that the size of the segments is as close to constant as possible. Static filters are more easily employed than dynamic filters because no processing of the bit stream is required to determine optimum segment size as in the case of dynamic filters, but they deal less well with large variations in bit rate. However, static filters have a tendency to create too many events per cryptoperiod, causing the manipulation of the bit stream to degenerate and the theoretical accuracy to quickly diminish.

Constraints affecting the choice of this constant segment size include the following:

The size of the segment must not exceed a cryptoperiod in length (also taking into account buffered data)

$$\text{Size\_Segment (Mb)} < \text{bit rate (Mb/s)} \times \text{cryptoperiod (s)} - \text{FIFOSize (Mb)}$$

The maximum size of transfer (segment size) is limited $$\text{Size\_Segment (Mb)} < 32 \text{ (Mb)}$$

The following assumptions regarding the above parameters are not unreasonable:

One cryptoperiod is at least 6 s

The bit rate is at least 1 Mb per second

FIFOSize is less than or equal to 32 Mb (and typically 2 Mb)

These above assumptions give the result that:

$$\text{Size\_Segment (Mb)} < 6 \text{ (Mb)} - \text{FIFOSize (Mb)}$$

(and consequently that FIFOSize<<6).

With the typical FIFOSize of 2 Mb, the segment size is therefore 4 Mb.

Dynamic filters will now be described.

A dynamic filter adjusts the size of the segment to accommodate the bit rate. High bit rates have short duration segments and vice versa. The dynamic filter must, however, compromise between few large segments and many small segments. If the bit rate is low or constant, the segments can be large, creating fewer events per cryptoperiod while still affording the resolution necessary for the recording and synchronisation of the bit stream. If the bit rate is high or varies greatly, the smallest segments are required to afford the most accurate measurement, but create many events per cryptoperiod, thus degrading the bit stream manipulation. The aim of the dynamic filter is to create the largest segments possible for the bit stream.

The dynamic filter attempts to limit the segment size to the equivalent of a time expressed as a fraction of the cryptoperiod (referred to below as the 'segment writing time'). The factor defining the segment writing time is an integer called the 'security coefficient', such that:

$$\text{segment\_writing\_time} = \frac{cryptoperiod}{security\_coefficient}$$

There are 3 different types of dynamic filter discussed below; rapid, inertial and hybrid filters. In the preferred embodiment, a hybrid dynamic filter is used, but in variants of the preferred embodiment other types of static and dynamic filter are used.

The rapid dynamic filter takes into account the writing time of the preceding segment in order to determine the size of the subsequent segment. First the rapid filter calculates the time taken to write the previous segment (time_segment(n−1)−time_segment(n−2)), and then calculates the corresponding average bit rate (equal to the size of the segment divided by the time taken). The size of the segment (n), size_segment(n) is then given by the formula:

$$\text{size\_segment} = \frac{\text{size\_segment}(n-1)}{\text{time\_segment}(n-1) - \text{time\_segment}(n-2)} \times \frac{cryptoperiod}{security\_coefficient}$$

Time_segment(n) is the absolute time of the reception of the event of that segment (n) (rather than the duration of the segment).

In equilibrium (that is, with a constant bit rate), the filter gives security_coefficient number of writes per cryptoperiod, regardless of the actual bit rate. In the case of a low bit rate, the limit value of the size of the segment is the same as that of the static filter case, that is, size_segment=4 Mb.

As an example of the use of a rapid dynamic filter with a constant bit rate, using the above formula, if the value of the cryptoperiod is fixed at 10 seconds and a security coefficient of 4 is chosen, a segment event takes place every 2.5 seconds. In the case of a constant bit rate, the system converges towards the limit as defined above.

The principal constraint on the dynamic filter is as follows:

time_segment(*n*)−time_segment(*n*−1)<1 cryptoperiod

It can be deduced that at the segment border, the average bit stream (averaged over one cryptoperiod/security_coefficient) does not exceed the security coefficient relationship given earlier. The stability of the filter is guaranteed in this case if:

average_bit_rate (*t*+cryptoperiod)>average bit_rate (*t*)×security_coefficient

From this example it can be seen that the bit rate dynamic is linked to the security coefficient by the following relationship:

$$Dyn\left(\frac{\int_t^{t+cryptoperiod} bitrate \cdot dt}{cryptoperiod}\right) < \left(\frac{20 \times \log(\text{security\_coefficient})}{crptoperiod}\right) dB/s$$

The security coefficient value which defines the "robustness" parameter of the filter during bit stream variation is determined by real MPEG-2 flow examinations under test conditions. This is to obtain control values for the filters so that security parameters and limits may be established.

The second type of dynamic filter is an inertial multilevel filter.

The principle of this filter is the same as that of the rapid dynamic filter, in that it estimates the bit rate of a variable bit rate bit stream using the bit rates of previous segments; however, the estimation process is given a larger memory (that is, effectively it has more filter coefficients). Here, the average bit rate is taken as the overall average of the average bit rates for the previous security_coefficient number of segment write operations. The estimation of this filter has a higher inertia than the first level filter, which allows it to be more stable, though it may be less sensitive to the peaks of the bit streams. The inertial filter is similar to the rapid filter in that it uses the writing time values from the segment(n-security_coefficient) to the segment(n−1) in order to obtain the size of the segment (n).

The formula of the filter is as follows (geometric form):

(in arithmetic form):

$$\text{size\_segment} = \frac{1}{cryptoperiod} \sum_{i=1}^{i=cryptoperiod} \left(\frac{\text{size\_segment}(n-i)}{\text{time\_segment}(n-i-1) - \text{time\_segment}(n-i)}\right) \times \frac{cryptoperiod}{\text{security\_coefficient}}$$

The limit values for a constant bit rate in the dynamic filter are identical to those of the static filter, and those with dynamic limits are equivalent in terms of performance to those of a rapid filter, the only difference being the response time of the inertial filter (at the security_coefficient level) which has a memory of one cryptoperiod rather than a memory of a cryptoperiod/security_coefficient as for the rapid filter.

This inertia of the inertial filter particularly allows the reduction of very high peaks (and thus the possibility of the decreased sensitivity to those peaks), that is, peaks of a higher dynamic than the security_coefficient allows. The static filter achieves an optimum value if peaks are extinguished although the inertia of the memory filter may eliminate other values along with this artefact.

The third type of dynamic filter is a hybrid hysteresis filter.

The two dynamic filters described above (rapid and inertial multilevel dynamic filters) are combined to give a better performing filter. The resultant hybrid filter combines the best characteristics of the two filters. The rapid filter has the good response time necessary in case of a sudden bit rate drop, but when it identifies a localised peak in a segment, it can overestimate the size of the subsequent segment because of the large value being included in the averaging process. On the other hand, the inertial filter can dampen bit rate peaks, but its response time limits effectiveness when there are successive drops.

The hybrid filter accommodates for the hysteresis effect (that is, the difference in its reaction to rising and descending fronts in the bit rate) by combining the rapid and inertial filters and keeping the flexibility of an inertial filter on a rising bit stream front in order to dampen any localised peaks; and the reactivity of the rapid filter on a descending bit stream front in order to compensate for the transitions of the high bit rate bit streams towards low bit rate bit streams.

The behaviour of the filters has been investigated using simulations of typical bit streams, which will now be described.

Bit Rate Simulations

Different bit rate patterns are investigated in FIGS. 32 to 39 using the four filters described above: static, rapid dynamic, inertial dynamic and hybrid dynamic filters.

Figure 32B:
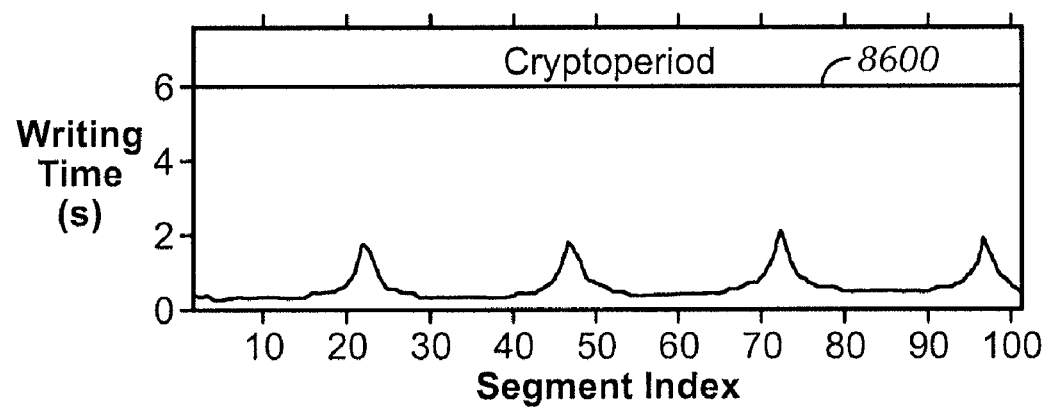
Figure 33B:
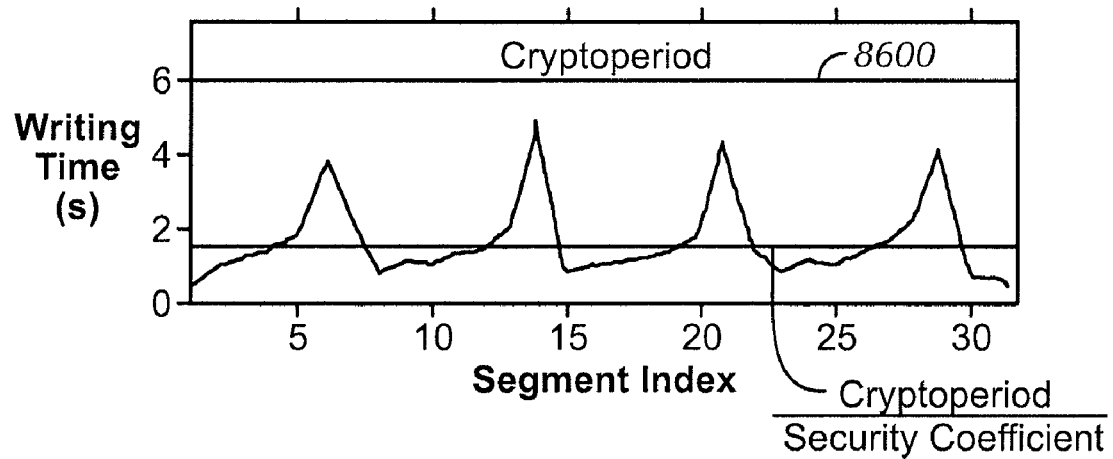
Figure 34B:
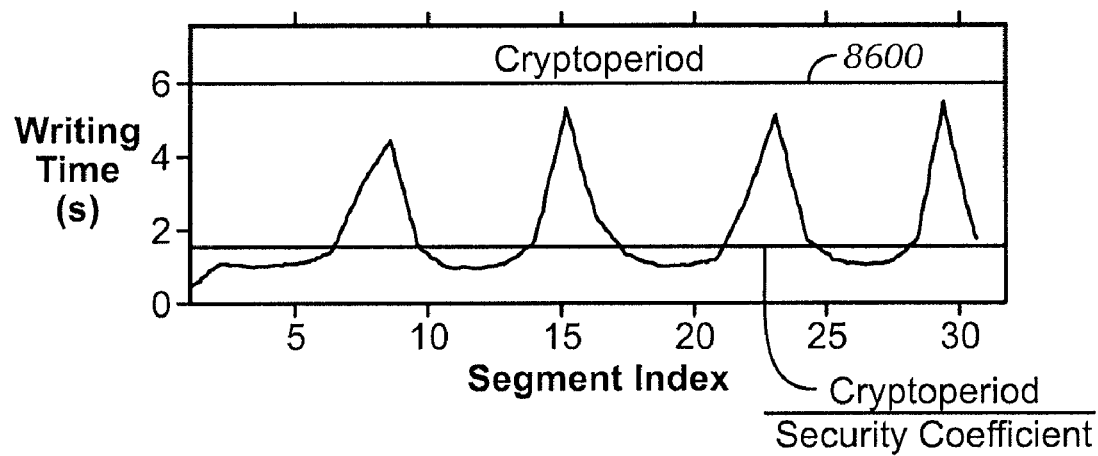
Figure 39B:
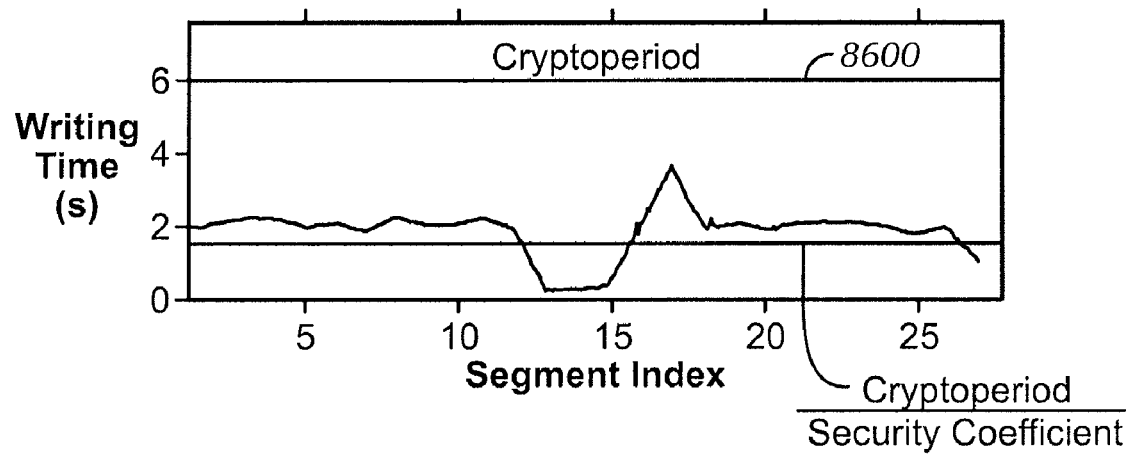

The objective of the simulation is to observe the behaviour of the filters out of their stable behaviour zone (that is, not at $$\text{size\_segment} = \frac{1}{cryptoperiod} \sqrt{\prod_{i=1}^{i=cryptoperiod} \left(\frac{\text{size\_segment}(n-i)}{\text{time\_segment}(n-i-1) - \text{time\_segment}(n-i)}\right) \times \frac{cryptoperiod}{\text{security\_coefficient}}}$$

a constant bit rate). To achieve this, different input bit rate functions are investigated, including a sinusoidally varying bit rate (FIG. 32 showing the results of the static filter; FIG. 33 for the rapid filter; FIG. 34 for the inertial filter; and FIG. 35 for the hybrid filter), a step function bit rate (FIG. 36 for the hybrid filter only), a triangular function bit rate (FIG. 37 for the hybrid filter only), a top hat function bit rate (FIG. 38 for the hybrid filter only), and a single peak bit rate (FIG. 39 for the hybrid filter only).

In each set of figures, the figure denoted "a" shows the bit stream over time and the figure denoted "b" shows the resulting writing time over the number of segments.

The figures denoted "a" in each set of FIGS. 32 to 39 have vertical lines showing the transition between segments. As can be seen from FIG. 32a (the static filter case), for example, a constant segment size takes a short time at high bit rates—reflected in the bunching together of segment transitions at approximately 3, 16, 28 and 41 seconds—and a relatively longer time at lower bit rates—reflected by the large (temporal) segment widths at approximately 9, 22, 35 and 47 seconds. As described above, the aim is to avoid such bunching of segments (which results in an unnecessary degree of accuracy at the expense of computational efficiency)—in other words, aiming for larger segment sizes at high bit rates.

The figures denoted "b" in each set of figures each indicate the 'crash line' 8600, which is equivalent to the cryptoperiod duration (in this case, 6 seconds). As noted previously, a writing time in excess of this duration can cause the estimation to fail (because more than one ECM may arrive during the writing of the segment). For the dynamic filters (FIGS. 33 to 39), there is a second horizontal line which shows the writing time to which the dynamic filter converges.

As mentioned previously, FIGS. 32 to 35 relate to a sinusoidally varying bit rate simulation lasting 50 seconds; in this case, each cryptoperiod lasts 6 seconds, and a security coefficient of 4 is chosen.

The static filter, rapid filter and dynamic filter create 100, 33 and 28 segments respectively (the fewer the segments, the better the filter, in general). The segment writing times are all observed to be below the crash line (that is, less than the cryptoperiod in length), and there is no observed instability in the behaviour of the filter.

Figure 35B:
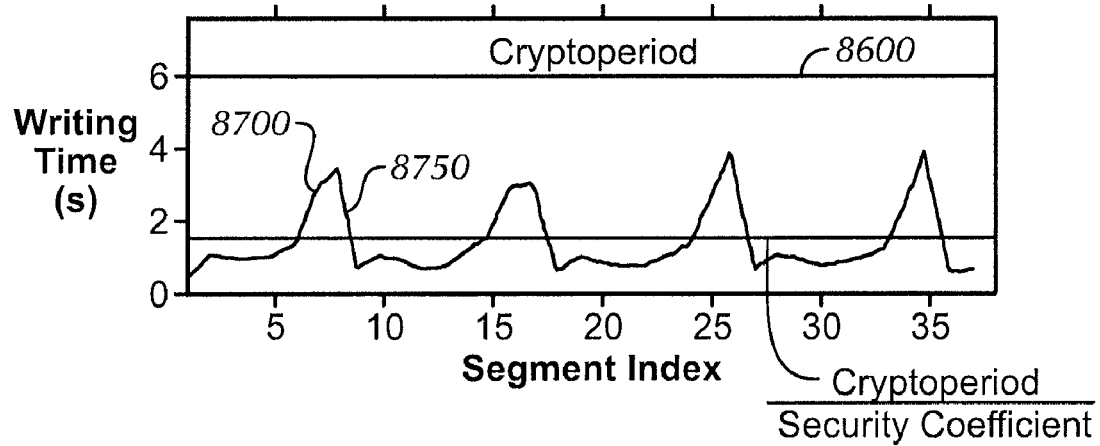

In this test, the hybrid filter offers the best correction of the three dynamic filters and so the other bit rate simulation results focus only on this filter. The tendency towards instability is corrected by the hysteresis phenomenon between the increase and decrease, which is illustrated by the damping 8700 on the increasing front and increased reactivity 8750 on the decreasing front as shown in FIG. 35b.

As mentioned previously, FIG. 36 relate to a step function bit rate simulation lasting 50 seconds; in this case, each cryptoperiod lasts 6 seconds; and a security coefficient of 4 is chosen. The bit rate of the bit stream is 1 Mb/s for 25 seconds and then 8 Mb/s for the subsequent 25 seconds, creating a step between two different constant bit rates. The object of this simulation is to investigate the behaviour of the filter around the typical minimum bit rate.

The dynamic filters (rapid, inertial and hybrid) have the same characteristics at minimal flow as the static filter. However, they converge towards the limit of cryptoperiod/security_coefficient. A maximum bit rate limit of 8 Mb/s is determined.

As mentioned previously, FIG. 37 relate to a triangular bit rate simulation lasting 50 seconds; in this case, each cryptoperiod lasts 6 seconds; and a security coefficient of 4 is chosen. The objective of this simulation is to observe the behaviour of each of the filters when faced with a bit rate which increases then decreases.

The hybrid filter combines the elevated response time of the inertial filter on the rising portion 8850 of the triangular bit rate function, with the strong reactivity of the rapid filter during the decreasing portion 8900 of the triangular bit rate function.

As mentioned previously, FIG. 38 relate to a top hat function bit rate simulation lasting 50 seconds; in this case, each cryptoperiod lasts 6 seconds; and a security coefficient of 4 is chosen. The bit rate consists of a 'top hat' at 8 Mb/s on a base of 2 Mb/s The maximum limit allows the hybrid filter to be at an established bit rate on the bit rate plateau at 8 Mb/s.

As mentioned previously, FIG. 39 relate to a single peak bit rate simulation lasting 50 seconds which also incorporates an element of noise; in this case, as before, each cryptoperiod lasts 6 seconds; and a security coefficient of 4 is chosen. The bit rate has a weak average noise value around 2 Mb/s, and it presents a very localised bit rate peak for 2 seconds with a height of 18 Mb/s. The objective is to show the hybrid filter's capacity for damping a strong bit rate peak which is greater than its correction capacity, in order to compensate for anomalous bit rate measurements when estimating the bit rate.

The hybrid filter compensates for the large data peak by underestimating the number of segments required for that amount of data, thus damping the effect of the data peak in the bit rate estimation procedure.

Further Methods of Estimation

As mentioned earlier, further methods of estimating the position of ECMs in the stored bit stream are envisaged. One set of methods can be implemented, for example, which form the estimate in dependence on a characteristic of the bit stream (as opposed to forming the estimate as an offset from the end of a particular segment, for example, as described above), such as the average bit rate, or time elapsed between points in the bit stream.

One such method will now be described.

The following method further assumes that, in contrast to the foregoing, the file write pointer (FWP) can be established at the time when the EVT_CAS_ECM is received (but not at the time when the ECM itself is received).

The position of the ECM in the bit stream can then be estimated in four steps:

1. An estimation is made regarding the time offset between the reception of the ECM in the bit stream and the event signalling the arrival of the corresponding control word ("$\Delta t$");
2. An average bit rate during this time period is estimated;
3. The amount of data "$\Delta d$" corresponding to this time period is calculated as the product of $\Delta t$ and the bit rate; and
4. The position ("d") of the ECM in the bit stream is then calculated as the present position (FWP) less the data offset ("$\Delta d$") found above.

These steps will be described in more detail below, beginning with the first step (estimating $\Delta t$).

Typically, the value of $\Delta t$ is assumed, rather than estimated per se, since the time taken to decrypt a control word is approximately constant (of the order of a couple of seconds). If possible, however, the error in at least one previous estimate can be measured, and used to correct future estimates. Other means may of course be provided for estimating $\Delta t$.

The second step (estimating the average bit rate) will now be described in more detail.

For simplicity, the average bit rate may be calculated in respect of the entire period between successive EVT- _CAS_ECM events (approximately a cryptoperiod in duration) or preferably in respect of a shorter period, such as the length of a segment. In each case, the bit rate is calculated as total data offset divided by total time.

The third step (calculating the data offset) will now be described in more detail.

The product of the bit rate estimate and the $\Delta t$ estimate gives $\Delta d$, the estimated amount of data elapsed since the reception of the ECM:

$$\Delta d \text{ (Mb)} = \text{Bit rate (Mb/s)} \times \Delta t \text{ (s)}$$

The fourth step (estimating the position of the ECM) will now be described in more detail.

Knowing the estimated data offset from the receipt of the ECM, the position of the ECM d can then be estimated by subtracting $\Delta d$ from the current file write position (FWP):

$$d = FWP - \Delta d$$

As mentioned above, other methods of estimating the position of the ECM in the bit stream can of course be implemented, and the methods of estimating described above may of course be subject to minor variations, not least to take into account different information which may be available at any particular time.

The precise details of the implementation of the various functions described above, and their distribution between hardware and software, are a matter of choice for the implementor and will not be described in detail. It is, however, noted that dedicated integrated circuits capable of performing the operations required in the receiver/decoder are commercially available or can be readily designed, and these can be used as the basis for a hardware accelerator, or more preferably modified to produce a dedicated hardware accelerator, to implement various of the operations required, thereby reducing the processing power required to run the software. However, the operations required may be implemented in software if sufficient processing power is available.

The modules and other components have been described in terms of the features and functions provided by each component, together with optional and preferable features. With the information given and specifications provided, actual implementation of these features and the precise details are left to the implementor. As an example, certain modules could be implemented in software, preferably written in the C programming language and preferably compiled to run on the processor used to run the application; however, some components may be run on a separate processor, and some or all components may be implemented by dedicated hardware.

The above modules and components are merely illustrative, and the invention may be implemented in a variety of ways, and, in particular, some components may be combined with others which perform similar functions, or some may be omitted in simplified implementations. Hardware and software implementations of each of the functions may be freely mixed, both between components and within a single component.

It will be readily understood that the functions performed by the hardware, the computer software, and such like are performed on or using electrical and like signals. Software implementations may be stored in ROM, or may be patched in FLASH.

Turning to a third general aspect of preferred embodiments, command sets for controlling the transfer of a bitstream are now described in more detail.

Command Set

Command Set

The Personal Video Recorder application (henceforth referred to as the 'PVR') 3154 mentioned above is part of a Personal Video Recorder system ('PVR system') which allows the user to record audio and/or visual data (principally programmes broadcast to the receiver/decoder) to a mass storage device, such as the hard disk 2100, and also to play back such audio/visual data. The data is stored as sequentially-ordered data (in MPEG-2 format in the preferred embodiment) and in essence the PVR provides the user with different ways to access this or similar data (indeed, a corresponding application for recording and playing back purely audio content is also provided, using fundamentally the same principles as will now be described).

With reference to FIG. 40, the PVR system will now be described in more detail. The hard disk 2100 (or other mass storage device) is connected via FIFOs and memory buses (not shown) to both the demultiplexer/descrambler/remultiplexer 2010 and MPEG decoder 2028, such that audio/visual data can be routed freely between the live broadcast signal input (outputted by the tuners and demodulators, not shown), receiver/decoder memory (not shown), MPEG 2 decoder (for display on the connected television, not shown) and hard disk 2100.

The hardware components mentioned are controlled by software devices (not shown), and in particular by the mass storage device 3728 and (indirectly) the service device 3736. In turn, the mass storage device and service device are controlled by the hard disk video recorder (HDVR) module 3850, comprising two recording threads 3854, 3856, a playback thread 3858, and shared filing system library ('FS library') 3852. Finally, the PVR application 3154 issues commands to the HDVR module via the program interface 7000.

As can be seen in FIG. 40, the PVR system is broken down into several layers, with the effect that the PVR application, essentially residing at the top of the chain of command, can entirely ignore lower-level considerations such as allocating space on the hard disk for recording and managing file pointers, and so on. By the careful design of the interfaces within the PVR system, as will be described in more detail below, the instructions which the PVR application 3154 sends to the underlying HDVR module 3850 correspond closely to the sort of axiomatic operations which are performed by the PVR, such as commencing playback at a given position in a stored programme, and stepping through the programme frame-by-frame.

Whilst the interface 7000 between the PVR 3154 and the HDVR module 3850 can allow simpler applications to be developed, providing as it does several different commands each corresponding to a typical user operation, the interface 7002 between the recording and playback threads 3854, 3856, 3858 by contrast implements a minimal command set, in particular providing only two commands for reproduction of data (one to set the reproduction speed, and one to set the reproduction position) which can allow the efficiency of the underlying FS library to be increased. The further interfaces between the FS library and devices, and between the devices and hardware, allow further levels of abstraction.

Four principal levels of command that are provided will be described later, including a first top-most layer 7010 of commands (comprising the PVR routines), a second mid-range layer 7012 of commands (comprising the routines in the recording and playback threads 3854, 3856, 3858), a third layer 7014 of commands (comprising the FS library routines), and a fourth bottom-most layer of commands, comprising automata 7016. As mentioned above, of course, further layers of commands exist below and possibly above these four layers, but these are as earlier described.

Underlying the playback aspects of the PVR system are the concepts of 'current reproduction position' and 'current reproduction speed' (referred to elsewhere simply as 'current position' and 'current speed' respectively). These two values are interpreted by the hardware (hard disk, demultiplexers, remultiplexers, MPEG-2 decoder and/or FIFO systems) to control the playback of programmes and/or other data stored on the hard disk 2100, and can be altered by various parts of the controlling software, as will be described in more detail later. In terms of the recording aspect of the PVR system, the concept of 'current recording position' is known, but by contrast a 'current recording speed' is meaningless.

It should be noted that only the aspects of the interface relating to the HDVR playback thread 3858 will be considered here, but the reader will understand that the general principles described here can also be applied to the recording threads 3854, 3856 and their respective interfaces.

With reference to FIG. 41, in overview, the six commands in the HDVR playback thread 3858 (the second command layer 7012) which are available to the PVR application 3154 (the 'HDVR playback routines') are shown: a seek_single_play( ) 7010, seek_slow_play( ) 7012, seek_normal_play( ) 7014, seek_fast_play( ) 7016, single_play( ) 7018 and pause ( ) 7020 routine. In turn, the FS library 3152 (third command layer 7014) provides two commands (the 'FS library routines'): a set_pos( ) 7030 and a set_speed( ) 7032 routine. The PVR application 3154 is also shown (first command layer 7010), its constituent functions being described later, and below the FS library 3852 various devices are shown (such as the service device and mass storage device) with which the set_speed( ) and set_pos( ) routines communicate. The arrows in the figure indicate function calls which are typically made by each object or routine.

The third command layer 7014, comprising the set_pos( ) 7030 and set_speed( ) 7032 routines, will first be described.

The set_pos( ) and set_speed( ) routines have been provided following the discovery that any combination of typical playback operations, including the six routines 7010, 7012, 7014, 7016, 7018, 7020 provided by the HDVR playback thread 3858, could be distilled to a sequence of axiomatic commands setting either the current reproduction speed or current reproduction position.

The set_pos( ) routine sets the current position of reproduction within a stream to a position specified as a parameter. In the preferred embodiment the parameter is a time offset in centiseconds from the beginning of the stored stream, but in variants of the preferred embodiment, different units are used. In further variants, the parameter specifies a byte-offset (or other spatial offset) from the beginning of the stored stream. As noted below, this latter variant is more efficient, but presents certain difficulties.

The set_pos( ) command in turn sends a command containing the relevant byte-offset to the lower level device(s), such as the mass storage device 3728. It is important at this stage to recognise that a byte-offset from an origin in many types of encoded video or audio stream (and in MPEG 2, in particular) does not have a constant linear relation to the time offset from that origin. Therefore, in the preferred embodiment, a translation is required internally between the time offset and the spatial offset. This can be achieved to a given temporal resolution by using tables which map time offsets to byte-offsets, and refined by subsequently scanning and decoding a short length of the MPEG 2 data to find the desired frame. In a further variant, the parameter of the set_pos( ) command is an index into the above-mentioned table of byte-offsets.

For performance reasons, whenever the set_pos( ) command is invoked, it jumps to the specified position and then scans forward to find and display the first I-frame (or equivalent independent—as opposed to dependent—frame in formats other than MPEG) after that position. Since I-frames may typically occur every half second, this behaviour can result in slight 'jerkiness' in some applications (described below). In variants of the preferred embodiment, however, the set_pos( ) command causes the MPEG decoder to scan backwards until it finds the previous I-frame, and then forward again to the desired position (which can be a non-I-frame, such as an interpolated frame). Whilst slower, this latter behaviour can result in generally smoother playback (if the decoder is sufficiently advanced).

The set_speed( ) routine sets the speed at which the stream is processed to the speed specified as a parameter. Again bearing in mind the non-linear relationship between byte-offset and time, the speed is specified as a multiple of normal playback speed (that is, a parameter of greater than 1 is equivalent to fast-forwarding, and a parameter of less than 1 is equivalent to slow-play. Passing a parameter of 0 has the effect of pausing reproduction, and a negative parameter is equivalent to rewinding the stream. In variants of the preferred embodiment, the parameter is specified in different units, such as the number of frames per second (for example, 30 for normal playback), or the time in seconds between frames (the inverse of the number of frames per second, for example, 1/30 for normal playback). For video sources with a constant bit rate, or in situations where the variation in bit rate is for the given purpose possible to ignore (at high speeds of fast forwarding or rewinding, for example), the speed may also be specified in terms of bitrate.

The nature of some encoding methods used for audiovisual and/or other types of data (such as MPEG 2, for example) is such that it cannot be read other than by starting from a given point, and advancing forward through the signal in one direction, whereby a time point in the video signal advances as decoding proceeds. In other words, it cannot be decoded backwards. This is, in particular, the case for a video programme encoded in MPEG 2 format in the form of a collection of transport packets. This is independent of the transfer speed. In order to reproduce the data in a time-reversed manner, multiple short read operations are performed at successively earlier points in the stream, each time obtaining and then outputting a single frame, giving the impression of a time-reversed video signal.

Automata

The fourth layer 7016 of commands implements an automaton which validates navigation functions, and transitions between navigation states.

The automaton implemented by the fourth layer 7016 in preferred embodiments validates the linking of navigation functions as shown in the table.

| State of the automation | Action for the automaton | | | | | | | | | |
|---|---|---|---|---|---|---|---|---|---|---|
| | ▶ | ♦♦$_b$ | ♦♦b | >b | <b | ▶▶| | |◀◀ | C+ | C− | ⏸ |
| ▶ | ▶ | ♦♦$_b$ | ♦♦b | >b | <b | ▶ | ▶ | ▶ | ▶ | ⏸ |
| ♦♦$_a$ | ▶ | ♦♦$_b$ | ♦♦b | >b | <b | ▶ | ▶ | ▶ | ▶ | ⏸ |
| ♦♦$_a$ | ▶ | ♦♦$_b$ | ♦♦b | >b | <b | ▶ | ▶ | ▶ | ▶ | ⏸ |
| >a | ▶ | ♦♦$_b$ | ♦♦b | >b | <b | >a | >a | >a | >a | ⏸ |
| <a | ▶ | ♦♦$_b$ | ♦♦b | >b | <b | <a | <a | <a | <a | ⏸ |
| ⏸ | ▶ | ♦♦$_b$ | ♦♦b | >b | <b | ⏸ | ⏸ | ⏸ | ⏸ | ⏸ |

The letters a and b used in the table represent speeds of either playing, slow forwarding or rewinding, or fast forwarding or rewinding.

The symbols in the lefthand column represent the state of the automaton upon receipt of a command, the symbols in the top row represent commands sent to the automaton, and the entries in the table represent the corresponding states of the automaton after execution of the commands.

So for instance, if the initial automaton state is fast forwarding at speed a, and a jump chapter forward command is received, the system will jump forward one chapter and then play out at normal speed, rather than continuing to fast forward through the new chapter.

The fourth command layer receives set_position and set_speed commands from the third command layer and, given the current state of the system, validates that the commands would produce a transition to an allowed state. If the commands would produce a transition to an allowed state then the commands are passed for execution.

If the commands received by the fourth command layer would produce a transition to a state which is not allowed by the automaton, then in the simplest case the fourth command layer would cause the command to be ignored.

However, in preferred embodiments, and for certain commands, and states of the system, if the commands received by the fourth command layer would produce a transition to a state which is not allowed by the automaton, then rather than causing the command to be ignored, the fourth command layer alters either the set_position or set_speed command and then checks whether this new command would produce a transition to a valid state. If so, the new command is passed for execution, and if not the command is again altered. This recursive attempt to validate a command, followed by amendment of the command proceeds until a command is produced which would cause a transition to a valid state.

So, for instance in particular embodiments it is not allowed to jump to a new position in a file during a fast forwarding operation.

Initially, during a fast forwarding operation the state of the system may be expressed by the following table, which records the state of the current set_position, X, and set_speed, V, commands, and flags whether these states have changed (flag value=1) or remain the same (flag value=0).

| X | 0 | 0 |
|---|---|---|
| V | 3 | 0 |

Upon receipt of a command to jump to a new position, the table changes:

| X | 1 | 1 |
|---|---|---|
| V | 3 | 0 |

The fourth command layer checks whether this transition is allowed, and then as the transition is not allowed in this case, causes the set_speed state to be altered, until a valid transition is found:—

| X | 1 | 0 |
|---|---|---|
| V | 1 | 0 |

The flags are reset to zero as shown in the above table, the commands are executed, and the system plays out content at normal speed from the new position.

The fourth command layer is linked to parental control and conditional access mechanisms in preferred embodiments. States are allowed or disallowed by the automaton in dependence, in part, upon parental control or conditional access parameters.

So, for instance, it is not allowed to fast forward or rewind through particular chapters in a file containing advertisements, or to jump to particular chapters containing adult content, if the user does not have permission to view such content.

An example of the operation of an embodiment in which the fourth command layer is linked to a parental control mechanism is described below.

The state of the system is again expressed by a table, which records the state of the current set_position, X, and set_speed, V, commands, and flags whether these states have changed (flag value=1) or remain the same (flag value=0):—

| X | 1 | 0 |
|---|---|---|
| V | 1 | 0 |

A set_pos command is then received:

| X | 2 | 1 |
|---|---|---|
| V | 1 | 0 |

This command corresponds to a jump in position to a chapter which the user does not have permission to view. The fourth command layer thus causes the set_position to be amended, and checks whether the transition represented by these commands is allowed:

| X | 3 | 1 |
|---|---|---|
| V | 1 | 0 |

The command corresponds to a jump in position to a later chapter, which again the user does not have permission to view. The fourth command layer thus causes the set_position to be amended again, and again checks whether the transition represented by these commands is allowed. In this case the transition is allowed, the flags are reset to zero, the commands are passed for execution and the system plays content from a later chapter than that which was originally requested:

| X | 4 | 0 |
| V | 1 | 0 |

Before commencing a description of the second layer 7012 of commands, the high-level PVR routines which embody the functionality of the PVR application (in the upper-most command layer 7010) will now be described briefly. For the sake of clarity, to avoid confusion with lower-level routines, each routine in the PVR (the 'PVR routines') is given a symbol which is closely related to those typically encountered in respect of a conventional video recorder, and the symbols are listed below in the table:

| PVR symbols | |
|---|---|
| Symbol | Function |
| ▶ | Play |
| ♦♦ | Fast forward |
| ♦♦ | Fast rewind |
| > | Slow forward |
| < | Slow rewind |
| ▶▎ | Next Index |
| ▎◀ | Previous index |
| C+ | Next Chapter |
| C− | Previous chapter |
| ▯ | Pause (freeze frame on an image) |
| ▪ | Stop |

Typically, each of the above PVR application functions is invoked by the user pressing a single button on the remote control, or selecting a single option in an on-screen menu. Thus, they correspond to axiomatic commands from the point of view of the user (distinct to axiomatic commands from the point of view of the software (such as the set_speed( ) and set_pos( ) commands described earlier). Further or alternative functions to those listed above can, of course, be envisaged; in particular, the above could be adapted for use as an audio player, for example, with indices corresponding to music tracks, say. Still referring to FIG. 41, the six commands provided by the HDVR playback thread 3858, in the second command layer 7012, will now be described.

As mentioned above, the six commands in the HDVR thread 3858 comprise four 'seek-play' operations: seek_single_play( ) 7010; seek_slow_play( ) 7012, seek_normal_play( ) 7014 and seek_fast_play( ) 7016. In addition to these basic operations, there are two other elementary operations: single_play( ) 7018 and pause( ) 7020. These operations together encapsulate the functionality of the above-mentioned set_pos( ) 7030 and set_speed( ) 7032 routines in higher-level routines which are of more use to the PVR application 3154 and similar applications. These routines will now be described in more detail.

Each of the seek-play operation sets the positions of a current read pointer in the data stream and then continues to reproduce the stream forward of that pointer in one of several modes, in the process making use of both the set_pos 7030 and set_speed 7032 routines to achieve the desired effect. In the preferred embodiment, the parameters of the six routines are equivalent to the parameters of the underlying set_pos( ) and set_speed( ) routines (that is, centisecond time offsets and multiples of normal play speed respectively). However, in variants of the preferred embodiment, different parameters (such as, for example, byte-offsets and inter-frame delay, respectively) may be specified for the six routines 7010, 7012, 7014, 7016, 7018, 7020, with the necessary translation of parameters taking place within the routines before the set_pos( ) and/or set_speed( ) routines are called.

The operation of each of these routines will now be described.

seek_single_play( ) sets the current reproduction offset to the offset specified as a parameter of the routine, and then reproduces a single frame from (or as near as possible to) that offset, whilst the playback remains paused. It is used by PVR routines which alter the position in the stream (▶▎, ▎◀, C−, C+) when the playback has been paused (▯).

seek_normal_play( ) sets the current reproduction offset to the offset specified as a parameter of the routine, and then reproduces the content of the data stream from that point forward, proceeding through the stream at normal speed. It is used during normal playback (as activated by the PVR play routine [▶]) by PVR routines which alter the position in the stream (▶▎, ▎◀, C−, C+).

seek_fast_play( ) sets the current reproduction offset to the offset specified as a parameter of the routine, and then reproduces the content of the data stream from that point forward, proceeding through the stream at greater than normal speed.

It is used during fast forward play (♦♦) by PVR routines which alter the position in the stream (▶▎, ▎◀, C−, C+).

seek_slow_play( ) sets the current reproduction offset to the offset specified as a parameter of the routine, and then reproduces the content of the data stream from that point forward, proceeding through the stream at less than normal speed. It is used during slow forward play (>) by PVR routines which alter the position in the stream (▶▎, ▎◀, C−, C+).

single_play( ) is used by routines that advance frame-by-frame in the stream, when the routine pause (▯) has already been invoked. It is also used in some derived routines, as will be described below.

pause( ) is used by the PVR pause routine (▯). It causes the stream to be halted at the current frame. There is no stop ( ) routine as such, because the HDVR module does not itself directly control the display devices; mechanisms outside the HDVR module 3850 such as the service device 3736, video device 3734 and FIFO device 3744 are used to actually control the video output, as described in more detail above.

In variants of the preferred embodiment, at least two of the seek_fast_play( ), seek_slow_play( ) and seek_normal_play ( ) routines are replaced by a single seek_play( ) routine taking both an offset and a speed as a parameter. The possible permutations of these parameters are as described above in respect of the set_pos( ) and set_speed( ) routines.

In the preferred embodiment, as noted above, different HDVR playback routines are called by the PVR routines depending on the current playback state (paused, normal, slow- or fast-forward). This can advantageously allow the HDVR playback routines to be simplified, so that they only need to cope with one mode of playback (such as paused or playing, fast-forwarding, rewinding, slow-playing and so on). In variants of the preferred embodiment, however, the HDVR playback routines are capable of operating in any play mode.

At the same time, the underlying set_pos( ) and set_speed ( ) routines are, like the PVR routines, independent of the play mode. In contrast to the HDVR playback routines, the FS library routines are simpler in structure, but potentially require more complex coding in order to cope with all eventualities of playback mode.

Derived Functions

A wide range of derived functions can be implemented using any combination of the three layers 7010, 7012, 7014 of commands described above. The following represents an examples of such functions. In these examples, the current reproduction position mentioned above is referred to as 'cur_pos'.

As has been discussed above, reproducing in a truly time-reversed direction through the data stream is generally not possible for MPEG-2 data, and difficult at best otherwise. Therefore, as mentioned above, time-reversed play is emulated by jumping backwards through the data stream, at each jump decoding a short segment of the data stream to obtain a single frame, and displaying each such frame.

All such operations involving a movement backwards (in a 'rewind' direction) in the stream are derived from standard play operations. Description of these operations is illustrated in FIGS. 42 to 47, in which the data stream is represented by a horizontal line, and each vertical arrow represents reproduction of a particular point in the stream. During normal play, the stream is played in a left-to-right direction in the figures.

Furthermore, as can be seen from the following, many routines using the 'seek_play' routines can alternatively be derived from only the single_play( ) routine.

High Speed Reproduction in the Forward Direction ♦♦

This operation may be embodied in the following sequence:
  pause ( )
  seek_fast_play (cur_pos)

FIG. 42 illustrates the operation of the seek_fast_play( ) routine on MPEG data (comprising periodic I-frames, as shown). As can be seen, the audio/visual data is scanned forward at a high rate (limited by the decoding hardware to a maximum of between 8 to 12 times normal playback speed, for example), and images are periodically displayed at the refresh rate. The displayed frames are a mixture of I-frames and non-I-frames, depending on where the MPEG decoder had reached at the time for the screen refresh.

As noted above, one of the more compact embodiments of the seek_single_play( ) and related functions takes a parameter of the actual data offset in the audio/visual file, instead of the time offset.

In the case where a very rapid advance is required, and in all additional cases where the MPEG-2 decoder is capable of doing so, a short routine can be constructed to effect a fast-forwarding function using the above-mentioned data-offset version of the seek_single_play( ) routine. This short routine is shown below, with reference to FIG. 43.

This method uses a technique of spaced forward jumps in the stream. The value of play_time corresponds to the duration for which the command ♦♦ remains active. It is also possible to adjust the value pause_time to modify the video rendition.

The offset for each jump ('offset' in the code above) can be calculated as a multiple of the average bit rate of the audio/visual data, such that an offset of, for example, three times the average bit rate will result in a reproduction speed of approximately three times the normal play speed. As can be seen from FIG. 43, however, the bit rate of the audio/visual data is typically not constant with respect to time (certainly for MPEG data), and so a constant data increment results in an uneven playback of frames.

Nevertheless, using this latter method, the time taken to fast-forward is approximately constant regardless of the reproduction speed, so that the reproduction speed can be made arbitrarily high (such as 128 times normal playback speed) and otherwise easily varied during the fast-forwarding operation. It can also be observed that less time is spent scanning through the data in this example, as not all the data needs to be scanned.

A more advanced fast-forwarding operation can be achieved using the following code, similar to the last but using the 'time offset' version of the seek_single_play( ) routine (whereby the current reproduction position is specified as a time offset into the audio/visual data).

```
pause( )
Loop during play_time
        cur_pos += constant_time_offset
        seek single_play (cur_pos)
        pause during pause_time
EndLoop
```

The operation of this code is illustrated in FIG. 44. In the present example, the constant_time_offset (and the granularity of the above-mentioned table mapping time offsets to data offsets and vice versa) are chosen to be a multiple of the period between I-frames. It can be seen that the time taken to decode is more uniform, and the frames displayed are equally spaced in terms of time, resulting in a smoother fast-forwarding action. With the modification (described previously) to the set_pos( ) routine to allow it to jump to frames other than I-frames which has previously been described so that non-I-frames can be decoded, a fast-forward speed of other than a multiple of the I-frame period can effectively be used.

An example of pseudocode required to perform the conversion between a time offset ('time_offset') and the appropriate data offset ('data_offset') using an index table ('index_table') containing both time offset and data offset fields is as follows:

```
pause ( )
Loop during play_time
        cur_pos += constant_data_offset
              seek_single_play (cur_pos)//    display the frame at the cur_pos data offset
                                              in the audio/visual file
              pause during pause_time    //   wait for next refresh
EndLoop
```

```
index = 0
while (index_table[index].time_offset < time_offset)
{      index ++      }
data_offset = index_table[index].data_offset
```

The above code can of course be implemented in any of the appropriate routines which are detailed here. A slight variation of the above fast-forward routines, adapted to use the index table, is as follows:

```
pause( )
cur_index = GetCurIndex(cur_pos)   // find current index using methods
                                      detailed above
Loop during play_time
        cur_pos = index_table[cur_index].data_offset
        seek_single_play (cur_pos)
        cur_index+=n        //  higher values of n give faster effective
                                reproduction speeds
        pause during pause_time
EndLoop
```

High Speed Reproduction in the Reverse Direction ♦♦:

A basic (and fast) rewind function using data (not time) offsets is as follows (based on the simlar example above for fast-forwarding, and illustrated in FIG. 45):

```
pause( )
Loop during play_time
        cur_pos -= constant_data_offset
        seek_single_play (cur_pos) //   version of the seek_single_play routine
                                        using data offsets as parameters
        pause during pause_time
EndLoop
```

As before, the speed of the reproduced video can be controlled by adjusting the duration of the delay (by varying the parameter pause_time), and varying the displacement within the stream, by adjusting the parameter constant_data_offset.

Again, it can be seen that the distance between frames is erratic, and the progress backwards uneven. In this and the following example, care has to be taken that the jump backwards is sufficiently large to span at least one I-frame (otherwise, a loop could be entered which displayed the same I-frame endlessly).

A more sophisticated version is shown in FIG. 46, using time rather than data offsets: This may be done as follows, and is illustrated in FIG. 45:

```
pause( )
Loop during play_time
        cur_pos -= constant_time_offset
        seek_single_play (cur_pos) //   version of the seek_single_play( ) routine
                                        using time offsets
        pause during pause_time
EndLoop
```

As before, it may be appropriate to allow variation of the reproduction speed within, for example, 1 to 128 times normal playing speed.

Slow Speed Reproduction in the Forward Direction>

As illustrated in FIG. 47, this feature can be embodied by the following code:

pause( )
seek_slow_play(cur_pos)

As shown in FIG. 47, the effect of the seek_slow_play( ) command is to scan through the audio/visual data at a slower-than-normal rate and display all of the frames as per usual (except displaying certain or all of them for more than one screen refresh period, depending on the playback speed).

An alternative embodiment of the slow-forward command, using the single_play( ) command is as follows, with reference to FIG. 48:

```
pause
Loop during play_time
        single_play ( )
        pause during pause_time
EndLoop
```

As noted above, the single_play( ) routine (as opposed to the seek_single_play( ) routine) advances the audio/visual data stream by one frame (including non-I-frames). The routine differs from the seek_slow_play( ) variant given above in that the speed of reproduction (or more generally, the transfer speed, as described elsewhere) can easily be customised by altering the pause_time variable.

A further routine for achieving slow-forward capability, but using the seek_single_play( ) command is as follows:

```
pause
Loop during play_time
        cur_pos += constant_time_offset
        seek_single_play (cur_pos)
        pause during pause_time
EndLoop
```

This code is the same as one of the routines used to fast-forward, except that the pause_time and constant_time_offset are chosen so as to effect fast-forwarding at a speed less than the normal playback speed. This routine is more useful when the seek_single_play( ) routine is adapted to jump to non-I-frames as well as I-frames (reducing the time granularity from, for example, half a second to the normal refresh rate, such as $1/30$ seconds)

Slow Speed Reproduction in the Reverse Direction <

To effect a slow speed reproduction, the procedure is as for the rewind function (♦♦), but with values of pause_time and current_time_offset chosen such that the (negative) reproduction speed is less than the magnitude of the normal playback speed. A typical code fragment is as follows:

```
pause( )
Loop during play_time
    cur_pos -= current_time_offset
    seek_single_play (cur_pos)
    pause during pause.time
EndLoop
```

Again, the current_time_offset and pause time parameters may be varied, and better results will be achieved with the version of the seek_single_play( ) routine capable of jumping to non-I-frames as well as I-frames.

Complex Functions

The three layers 7010, 7012, 7014 of commands (and more particularly the lower layers 7012, 7014) can be used to construct further commands that perform functions of arbitrary complexity. The following examples illustrate the power of the command layers (the 'basic commands') described above.

EXAMPLE 1

Sequence of Actions—▶, C+, ▣, ▣, >, ▶

Expressed in terms of basic functions, this function can be implemented by the following sequence:
```
seek_normal_play (cur_pos)
cur_pos=chapter_table [next_chapter].time_offset
seek_normal_play (cur_pos)
pause( )
single_play (cur_pos)
seek_slow_play (cur_pos)
seek_normal_play (cur_pos)
```

EXAMPLE 2

Sequence of Actions—▶, ▣, ▣, ▶C−

Expressed in terms of basic commands, this function can be implemented by the following sequence:
```
seek_normal_play (cur_pos)
cur_pos=user_table [next_user_index].time_offset
seek_normal_play (cur_pos)
pause( )
seek_normal_play (cur_pos)
cur_pos=chapter_table [previous_chapter].time_offset
seek_normal_play (cur_pos)
```

EXAMPLE 3

Sequence of Actions—▶, C+, ▶, ♦♦, >, ▣

Expressed in terms of basic commands, this function can be implemented by the following sequence:

```
seek_normal_play (cur_pos)
cur_pos = chapter_table [next_chapter].time_offset
seek_normal_play (cur_pos)
pause( )
Loop during play_time
    cur_pos -= current_time_offset
    seek_single_play (cur_pos)
    pause during pause_time
EndLoop
seek_slow_play (cur_pos)
pause( )
```

As can be observed from the above, the three layers 7010, 7012, 7014 of command sets each provide a flexible yet simple interface to higher and lower software layers, and can easily be incorporated into other routines to provide higher levels of functionality.

The system described above can also be adapted to control general transfers, such as a recording, rather than a reproduction, process. Accordingly, for the recording example, the set_pos( ) command sets the position from which recording is to take place, and the set_speed( ) command sets the recording speed (which in some embodiments can be set to other than normal recording speeds, to enable recording at lower frame-rates or generally lower quality, for example). Furthermore, the recording and reproduction processes can be combined to provide time-shifting functionality.

The precise details of the implementation of the various functions described above, and their distribution between hardware and software, are a matter of choice for the implementor and will not be described in detail. It is, however, noted that dedicated integrated circuits capable of performing the operations required in the receiver/decoder are commercially available or can be readily designed, and these can be used as the basis for a hardware accelerator, or more preferably modified to produce a dedicated hardware accelerator, to implement various of the operations required, thereby reducing the processing power required to run the software. However, the operations required may be implemented in software if sufficient processing power is available.

The modules and other components have been described in terms of the features and functions provided by each component, together with optional and preferable features. With the information given and specifications provided, actual implementation of these features and the precise details are left to the implementor. As an example, certain modules could be implemented in software, preferably written in the C programming language and preferably compiled to run on the processor used to run the application; however, some components may be run on a separate processor, and some or all components may be implemented by dedicated hardware.

The above modules and components are merely illustrative, and the invention may be implemented in a variety of ways, and, in particular, some components may be combined with others which perform similar functions, or some may be omitted in simplified implementations. Hardware and software implementations of each of the functions may be freely mixed, both between components and within a single component.

It will be readily understood that the functions performed by the hardware, the computer software, and such like are performed on or using electrical and like signals. Software implementations may be stored in ROM, or may be patched in FLASH.

It will be understood that the present invention has been described above purely by way of example, and modification of detail can be made within the scope of the invention.

Each feature disclosed in the description, and (where appropriate) the claims, the appendix (containing text and figures from International Patent Application No. PCT/IB01/01845 in the name of Canal+ Technologies Societe Anonyme, and whose content is intended as part of this patent application) and the drawings may be provided independently or in any appropriate combination.

Reference numerals appearing in the claims are by way of illustration only and shall have no limiting effect on the scope of the claims.

The invention claimed is:

1. A table comprising:
   at least one record mapping a respective data offset in a file containing a representation of a bitstream to a corresponding time offset in the bitstream,
   wherein the at least one record stored on a storage medium in the table is used to search and retrieve data from the bitstream,
   wherein at least one record in the table is mapped to at least one further record, wherein the at least one further record comprises conditional access information used to decode a desired portion of data in the bitstream upon location of the desired portion of data using the table and at least one television control command used to control access to at least one audio visual program included in the bitstream, and wherein the bitstream and the conditional access information are synchronized at the time of storing the conditional access information and the bitstream, and
   wherein the bitstream comprises:
      at least one key frame used to regenerate a portion of audiovisual data independently of other portions of bitstream data, and
      at least one delta frame configured to map changes from the portion of audiovisual data represented by the key frame to the bitstream data.

2. A table according to claim 1, wherein the bitstream is a variable bitrate bitstream.

3. A table according to claim 1, wherein the table comprises at least three records, and the time offsets are periodic.

4. A table according to claim 3, wherein the period of the time offsets is varied.

5. A table according to claim 3, wherein the period of the time offsets is chosen to match a characteristic of the bitstream, and is one selected from the group consisting of 0.5, 1, 2, and 10 seconds.

6. A table according to claim 1, wherein the bitstream comprises MPEG data, and the at least one portion of bitstream data comprises an intra-frame.

7. A table according to claim 1, wherein the table is generated automatically during recordal of the representation of the bitstream in the file.

8. A table according to claim 1, wherein the said at least one further record is stored in a further table.

9. A table according to claim 8, wherein the said at least one further record is inserted upon command of a user.

10. A table according to claim 1, wherein the said at least one record in the table is mapped to the respective at least one further record upon command of a user.

11. A table according to claim 1, wherein the file is encoded and the at least one record maps a data offset in the encoded file to a corresponding time offset in the bitstream.

12. A table according to claim 1, wherein records are inserted in dependence upon characteristics of the bitstream.

13. A table according to claim 1, wherein at least one record is inserted upon command of a user.

14. A table according to claim 1, wherein at least one record is inserted automatically.

15. A table according to claim 1, adapted for storage in a file with the representation of the bitstream.

16. A table according to claim 1, wherein a period of the corresponding time offset is chosen based on a size of a cryptoperiod.

17. A method of facilitating the searching of a file containing a representation of a bitstream, comprising:
   generating a table comprising at least one record mapping a respective data offset in a file containing a representation of a bitstream to a corresponding time offset in the bitstream;
   wherein the at least one record is used to search and retrieve data from the bitstream,
   locating a desired portion of data in the representation of the bitstream using the table, wherein at least one record in the table is mapped to a respective at least one further record, and the said at least one further record comprises conditional access information and at least one television control command used to control access to at least one audio visual program included in the bitstream, and wherein the bitstream and the conditional access information are synchronized at the time of storing the conditional access information and the bitstream; and
   decoding the desired portion of data in the representation of the bitstream using the conditional access information from the at least one further record,
   wherein the bitstream comprises:
      at least one key frame used to regenerate a portion of audiovisual data independently of other portions of bitstream data, and
      at least one delta frame configured to map changes from the portion of audiovisual data represented by the key frame to the bitstream data.

18. A method according to claim 17, wherein the bitstream is a variable bitrate bitstream.

19. A method according to claim 17, wherein the table comprises at least three records, and the time offsets are periodic.

20. A method according to claim 19, wherein the period of the time offsets is chosen to match a characteristic of the bitstream, and is one selected from the group consisting of 0.5, 1, 2, or 10 seconds.

21. A method according to claim 17, wherein:
   the time offset of the at least one record corresponds to the respective at least one portion of a bitstream data.

22. A method according to claim 17, wherein the bitstream comprises MPEG data, and the at least one portion of bitstream data comprises an intra-frame.

23. A method according to claim 17, wherein the table is generated automatically during recordal of the representation of the bitstream in the file.

24. A method according to claim 17, wherein the said at least one further record is stored in a further table.

25. A method according to claim 24, wherein the said at least one further record is inserted upon command of a user.

26. A method according to claim 17, wherein the at least one record in the table is mapped to the respective at least one further record upon command of a user.

27. A method according to claim 17, wherein the file is encoded and the at least one record maps a data offset in the encoded file to a corresponding time offset in the bitstream.

28. A method according to claim 17, wherein at least one record is inserted in dependence upon characteristics of the bitstream.

29. A method according to claim 17, wherein at least one record is inserted upon the command of a user.

30. A method according to claim 17, wherein at least one record is inserted automatically.

31. A method according to claim 17, further comprising storing the table in a file containing the representation of the bitstream.

32. A method according to claim 17, wherein a period of the corresponding time offset is chosen based on a size of a cryptoperiod.

* * * * *

UNITED STATES PATENT AND TRADEMARK OFFICE
CERTIFICATE OF CORRECTION

PATENT NO. : 7,593,620 B2
APPLICATION NO. : 10/225433
DATED : September 22, 2009
INVENTOR(S) : Surcouf et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1298 days.

Signed and Sealed this

Fourteenth Day of December, 2010

David J. Kappos
*Director of the United States Patent and Trademark Office*